(12) United States Patent
Lee et al.

(10) Patent No.: US 12,537,891 B2
(45) Date of Patent: Jan. 27, 2026

(54) ELECTRONIC DEVICE INCLUDING FLEXIBLE CIRCUIT BOARD

(71) Applicant: SAMSUNG ELECTRONICS CO., LTD., Suwon-si (KR)

(72) Inventors: Seunghoon Lee, Suwon-si (KR); Heecheul Moon, Suwon-si (KR); Kwonho Son, Suwon-si (KR); Byounguk Yoon, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 189 days.

(21) Appl. No.: 18/458,283

(22) Filed: Aug. 30, 2023

(65) Prior Publication Data

US 2024/0106925 A1    Mar. 28, 2024

Related U.S. Application Data

(63) Continuation of application No. PCT/KR2023/012585, filed on Aug. 24, 2023.

(30) Foreign Application Priority Data

Sep. 23, 2022  (KR) .................. 10-2022-0120817
Nov. 18, 2022  (KR) .................. 10-2022-0154969

(51) Int. Cl.
*H04M 1/02* (2006.01)

(52) U.S. Cl.
CPC ....... *H04M 1/0277* (2013.01); *H04M 1/0216* (2013.01); *H04M 1/0262* (2013.01); *H04M 1/0268* (2013.01)

(58) Field of Classification Search
None
See application file for complete search history.

(56) References Cited

U.S. PATENT DOCUMENTS

| | | | |
|---|---|---|---|
| 10,433,438 | B2 | 10/2019 | Moon et al. |
| 10,827,633 | B2 | 11/2020 | Yoo et al. |
| 11,243,566 | B2 | 2/2022 | Moon et al. |

(Continued)

FOREIGN PATENT DOCUMENTS

| | | |
|---|---|---|
| CN | 214960624 U | 11/2021 |
| KR | 102108151 B1 | 5/2020 |

(Continued)

OTHER PUBLICATIONS

International Search Report for PCT/KR2023/012585 dated Nov. 22, 2023.

*Primary Examiner* — Xanthia C Relford
(74) *Attorney, Agent, or Firm* — CANTOR COLBURN LLP

(57) ABSTRACT

An electronic device includes a hinge, a first housing and a second housing rotatably connected to each other by the hinge, a flexible display disposed in the first housing and the second housing, a first circuit board disposed in the first housing, a flexible circuit board which is electrically connected to the first circuit board and extends from the first housing and across the hinge, and a slide structure which is connected to the flexible circuit board and is slidably connected with the first housing, wherein the slide structure slides together with a portion of the flexible circuit board in the first housing while the electronic device is being folded or unfolded via the hinge.

20 Claims, 41 Drawing Sheets

(56) References Cited

U.S. PATENT DOCUMENTS

| | | | |
|---|---|---|---|
| 11,576,272 B2 | 2/2023 | Yoo et al. | |
| 11,907,026 B2 | 2/2024 | Deng | |
| 2011/0075383 A1* | 3/2011 | Ho | H05K 1/028 |
| | | | 361/748 |
| 2019/0196548 A1 | 6/2019 | Kim et al. | |
| 2020/0162596 A1* | 5/2020 | Kim | G06F 1/1656 |
| 2020/0214156 A1* | 7/2020 | Zhong | G06F 1/1616 |
| 2021/0195777 A1* | 6/2021 | Moon | H04M 1/0268 |
| 2021/0263558 A1 | 8/2021 | Bie et al. | |
| 2021/0360799 A1* | 11/2021 | Jia | G06F 1/1641 |
| 2022/0035410 A1 | 2/2022 | Lee et al. | |
| 2022/0129046 A1 | 4/2022 | Baek et al. | |
| 2022/0171434 A1* | 6/2022 | Park | G06F 1/1698 |
| 2022/0192041 A1* | 6/2022 | Jeon | G06F 1/1681 |
| 2022/0225523 A1* | 7/2022 | Nguyen | H10K 77/111 |
| 2022/0346232 A1 | 10/2022 | Jun et al. | |
| 2022/0359955 A1 | 11/2022 | Baek et al. | |

FOREIGN PATENT DOCUMENTS

| | | |
|---|---|---|
| KR | 20200100490 A | 8/2020 |
| KR | 20210019095 A | 2/2021 |
| KR | 20210070774 A | 6/2021 |
| KR | 20220016591 A | 2/2022 |
| KR | 20220017324 A | 2/2022 |

\* cited by examiner

ELECTRONIC DEVICE INCLUDING FLEXIBLE CIRCUIT BOARD

CROSS-REFERENCE TO RELATED APPLICATION

This application is a continuation application of International Application No. PCT/KR2023/012585 designating the United States, filed on Aug. 24, 2023, in the Korean Intellectual Property Receiving Office and claiming priority to Korean Patent Application No. 10-2022-0120817 filed on Sep. 23, 2022 in the Korean Intellectual Property Office and Korean Patent Application No. 2022-0154969 filed on Nov. 18, 2022 in the Korean Intellectual Property Office, the disclosure of which is incorporated by reference herein in its entirety.

BACKGROUND

(1) Field

Various embodiments of the present disclosure are related to an electronic device including a flexible printed circuit board.

(2) Description of the Related Art

Electronic devices are becoming increasingly slimmer to meet consumer demand as the functional gap between different manufacturers is significantly reduced, and are being improved to increase rigidity, enhance design aspects, and differentiate functional elements. These electronic devices are evolving from a uniform rectangular shape to a variety of shapes. For example, an electronic device may have a transformable structure that is conveniently portable and, when in use, provides access to a large-screen display. As part of these electronic devices, a foldable type of electronic device may be included. As foldable electronics become thinner, it may be necessary to design an efficient layout of internal electronic components and ensure operational reliability thereof.

SUMMARY

An electronic device may include a foldable electronic device including a first housing, a second housing foldably connected to the first housing by means of a hinge device (e.g., a hinge module, hinge or hinge assembly). The first housing and the second housing are structurally coupled with the hinge device, so that operational reliability for a folded and/or unfolded state may be ensured. The foldable electronic device may be operated in an in-folding manner and/or an out-folding manner by rotating the first housing relative to the second housing by means of the hinge device in a range from 0 to 360 degrees. In a state that the foldable electronic device is open to 180 degrees, the foldable electronic device may include a flexible display disposed across the first housing and the second housing.

To meet the trend of increasingly slimmer foldable electronic devices, improved layout design of the electronic components disposed in an internal space of the foldable electronic device may be required. The foldable electronic device may include a flexible printed circuit board (FPCB) that electrically connects the first housing and the second housing to each other. The flexible printed circuit board may be formed in a bent shape (e.g., bendable to bent more than once) that is at least partially elastic (e.g., resilient) to accommodate a deformed length of the flexible printed circuit board in an inner space of the hinge housing that accommodates the hinge device according to the folding motion.

However, as electronics become slimmer (e.g., thinner), the space available to accommodate a bent portion of the flexible printed circuit board becomes smaller, resulting in less curvature, and stress concentration from frequent folding motion may lead to breakage.

The electronic device may also include a waterproof structure for the flexible printed circuit board that connects the two housings across the hinge device. The aforementioned waterproof structure may be deformed or misaligned because the flexible printed circuit board moves with frequent folding motion, thereby reducing the waterproofing function.

Various embodiments of the present disclosure may provide the electronic device including a layout design of electronic components for slimming.

Various embodiments may provide the electronic device including a slide structure for the flexible printed circuit board that may contribute to operational reliability as the electronic device is slimmed down.

Various embodiments may provide the electronic device including the flexible printed circuit board that provides a reliable waterproofing function, even with frequent folding motion.

However, the object to be achieved by the present disclosure is not limited to the above-mentioned objects but may be variously expanded without departing from the spirit and scope of the present disclosure.

According an aspect of the disclosure, an electronic device includes: a hinge; a first housing and a second housing rotatably connected to each other by the hinge; a flexible display corresponding to the first housing and the second housing; a first circuit board which is in the first housing; a flexible circuit board which is electrically connected to the first circuit board and extends from the first housing and across the hinge; and a slide structure which is connected to the flexible circuit board and is slidably connected with the first housing, wherein a portion of the flexible circuit board is slid together with the slide structure in the first housing while the electronic device is folded or unfolded via the hinge.

The electronic device further comprises a first battery and a second battery in the first housing, wherein the first battery, the first circuit board and the second battery are arranged in the first housing and in order along the hinge. The electronic device further comprises: a third battery, a second circuit board and a fourth battery in the second housing, and the flexible circuit board further connected to the second circuit board and extending from the first housing, across the hinge, and into the second housing, wherein the third battery, the second circuit board and the fourth battery are arranged in the second housing and in order along the hinge.

The first battery and the second battery have different sizes from each other. The electronic device further comprises an electronic component in the first housing, wherein in a direction along the first housing, the hinge is extended along a first direction, each of the first battery and the second battery has a size in a direction crossing the first direction, one battery having a smaller size among the first battery and the second battery, and along the direction crossing the first direction, the electronic component is adjacent to the one battery having the smaller size.

The electronic component comprises a camera module, a speaker, a receiver or a socket module.

The electric device comprises a first battery in the first housing and overlapped with the first circuit board, wherein each of the first circuit board and the first battery has a thickness, the first battery comprises arranged along the hinge, a first battery portion, a second battery portion and a third battery portion which is overlapped with the first circuit board and connects the first battery portion to the second battery portion, and a sum of the thickness of the first circuit board and the third battery portion is equal to or smaller than the thickness of the first battery portion or the thickness of the second battery portion.

The first battery portion and the second battery portion have different sizes from each other.

The first housing and the second housing are rotatable with respect to a folding axis, the slide structure comprises a slide bracket slidably connected with the first housing, the slide bracket slidable along a direction crossing the folding axis, the flexible circuit board comprises a terminal portion at which the flexible circuit board is both fixed to the slide bracket and electrically connected to a connector of the first circuit board, and sliding of the slide bracket along the first housing slides the terminal portion of the flexible circuit board together with maintaining electric connection with the connector of the first circuit board.

The slide structure further comprises a spring which biases the slide bracket in a first direction along the direction crossing the folding axis, the first direction being toward the first circuit board.

The folding of the electronic device includes movement of the terminal portion of the flexible circuit board in a second direction opposite to the first direction, and the unfolding of the electronic device includes movement of the terminal portion of the flexible circuit board in the first direction.

The first housing comprises a pair of bosses, and the slide bracket comprises: a circuit board fixing portion to which the terminal portion of the flexible circuit board is fixed; and a pair of extending portions respectively extending from opposing ends of the circuit board fixing portion, wherein the slide bracket is slidably connected to the bosses of the first housing, at the pair of extending portions.

According an aspect of the disclosure, an electronic device comprising: a hinge; a first housing and a second housing rotatably connected to each other by the hinge; a flexible display corresponding to the first housing and the second housing; a first circuit board which is in the first housing; a flexible circuit board which is connected to the first circuit board and extends from the first housing and across the hinge, the flexible circuit board comprising a terminal portion at which the flexible circuit board is electrically connected to the first circuit board; and a fixing bracket which fixes the flexible circuit board at the terminal portion, to the first circuit board, and maintains electric connection between the terminal portion and the first circuit board.

The first circuit board includes a pair of catching protrusions; the fixing bracket comprises: a support portion facing the terminal portion; and a pair of first extending portions respectively bent from opposing ends of the support portion toward the first circuit board, and each first extending portion among the pair of first extending portions defines a catching groove of the each first extending portion with which a respective catching protrusion engages to couple the first circuit board to the fixing bracket and maintain the electric connection between the terminal portion of the flexible circuit board and the first circuit board.

The fixing bracket further comprises a pair of second extending portions respectively bent from the opposing ends of the support portion, at a side of the support portion different from the side at which the first extending portions are bent, and toward the first circuit board, wherein the second extending portions of the fixing bracket are fastened to the first circuit board by fastening members respectively penetrating the second extending portions and engaging with the first circuit board.

According an aspect of the disclosure, an electronic device comprising: a hinge; a first housing and a second housing rotatably connected to each other by the hinge; a housing among the first housing and the second housing which includes a support member and defines a through-hole of the housing which extends through the support member from a front side of the support member to a rear side of the support member; a flexible display corresponding to the first housing and the second housing, the flexible display extended along the front side of the support member; a first circuit board which extends along the rear side of the support member; and a flexible circuit board which is electrically connected to the first circuit board, at the rear side of the support member, and extends across the hinge.

The electronic device further comprises a waterproof member which surrounds the flexible circuit board at the through-hole and seals the through-hole.

The electronic device further comprises a magnetic fixing member which fixes the flexible circuit board at a position in the through-hole, wherein the housing further includes a sidewall which defines the through-hole, the sidewall defining an opening connecting the through-hole to the rear side of the support member, and the magnetic fixing member comprises: a magnetic bracket which extends through the opening of the sidewall, from the rear side of the support member, and into the through-hole, a first magnet in the through-hole, and a second magnet which is in the magnetic bracket, faces the first magnet with the flexible circuit board therebetween, and fixes the position of the flexible circuit board in the through-hole by magnetic force between the first magnet and the second magnet.

The flexible circuit board is between the magnetic bracket and the first magnet.

The magnet bracket comprises: an insertion portion which extends through the opening of the sidewall and defines a space in which the second magnet is accommodated; a flange extending along a rim of the insertion portion and coupled to the sidewall of the housing, and the flange further defining a disassembly guiding groove recessed inwardly.

According to various embodiments, an electronic device may include: a first housing including a first printed circuit board disposed in a first space; a second housing including a second printed circuit board rotatably connected with the first housing with respect to a folding axis by means of a hinge device and disposed in a second space; a flexible display disposed to be supported by the first housing and the second housing; a flexible printed circuit board (FPCB) electrically connected from the first printed circuit board to the second printed circuit board across the hinge device; and a slide structure configured to slidably connect one end and/or both ends of the flexible printed circuit board in the first space and/or in the second space in response to folding and unfolding motions of the electronic device.

According to various embodiments, the electronic device may include: a first housing including a first printed circuit board disposed in a first space; a second housing including a second printed circuit board rotatably connected with the first housing by means of a hinge device and disposed in a second space; a flexible display disposed to be supported by the first housing and the second housing; a flexible printed circuit board electrically connected from the first printed circuit board to the second printed circuit board across the hinge device; and a fixing bracket disposed to maintain an electric connection of the first printed circuit board with a terminal portion of the flexible printed circuit board.

According to various embodiments, the electronic device may include: a first housing including a first space formed by a first lateral member and a first support member extending from the first lateral member, and a first printed circuit board disposed in the first space; a second housing including a second printed circuit board rotatably connected to the first housing by means of a hinge device and disposed in a second space; a flexible display disposed to be supported by the first housing and the second housing; and a flexible printed circuit board electrically connected from the first printed circuit board to the second printed circuit board across the hinge device, in which one end of the flexible printed circuit board is electrically connected to the first printed circuit board in a manner such that one end of the flexible printed circuit board penetrates a through-hole formed to connect the outside of the electronic device to the first space through the first support member.

The electronic device according to embodiments of the present disclosure may help slim down the electronic device by efficiently disposing a printed circuit board and battery. In addition, by disposing one or the other end of the flexible printed circuit board slidably depending on the folding motion of the electronic device, it is possible to actively change a curvature of a bending portion of the flexible printed circuit board to help prevent breakage of the flexible printed circuit board. In addition, a magnetic coupling structure between the flexible printed circuit board and the housing may help to maintain the waterproof function even with frequent folding motion.

In addition, various effects that can be directly or indirectly identified through the present document may be provided.

The effects obtained by the present disclosure are not limited to the aforementioned effects, and other effects, which are not mentioned above, will be clearly understood by those skilled in the art from the following description.

BRIEF DESCRIPTION OF THE DRAWINGS

In connection with the description of the drawings, the same or similar reference numerals may be used for the same or similar components.

DETAILED DESCRIPTION

Figure 1A:
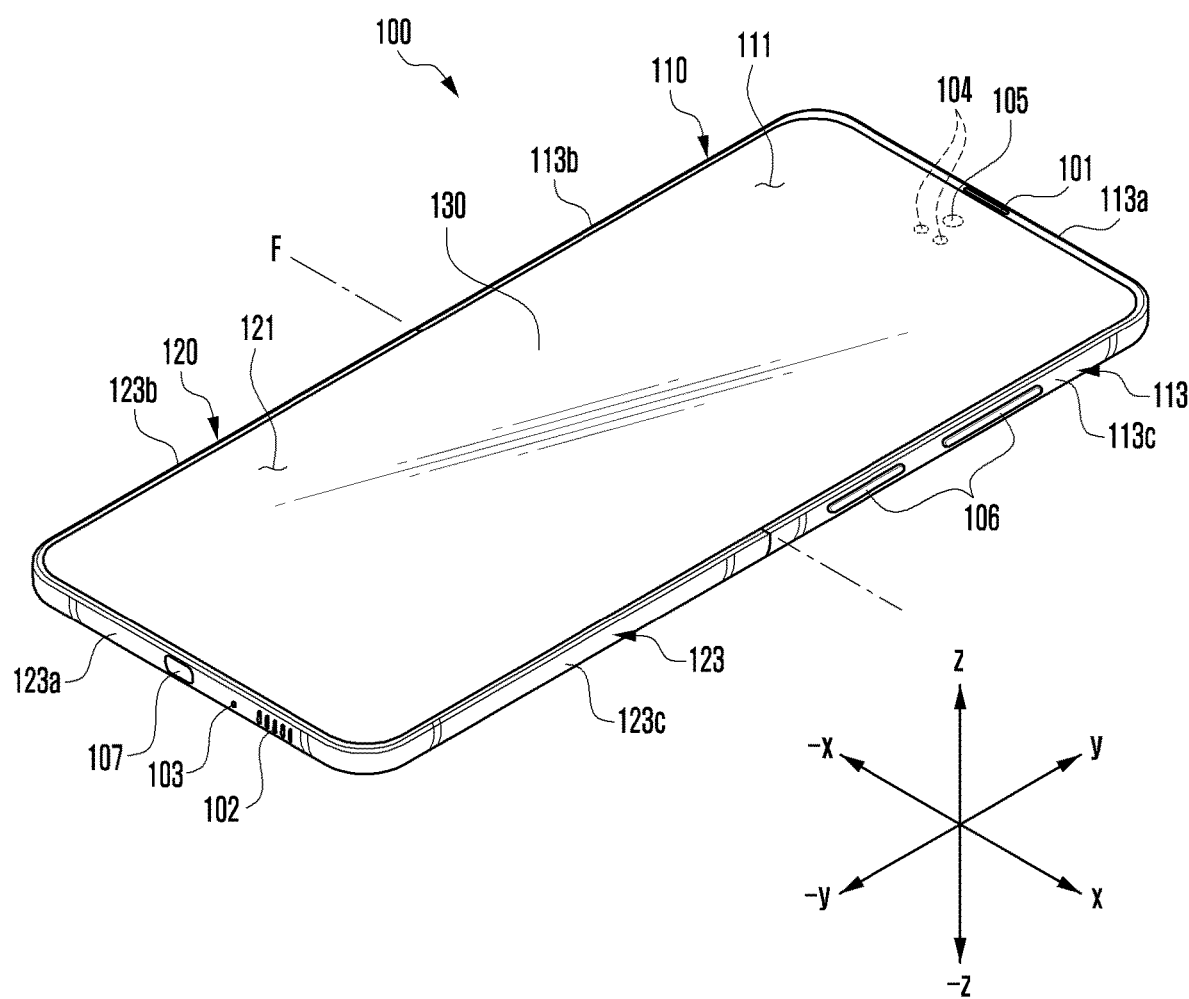
FIG. 1A is a perspective view of a front surface of an electronic device illustrating a flat state or an unfolded state according to various embodiments of the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1B:
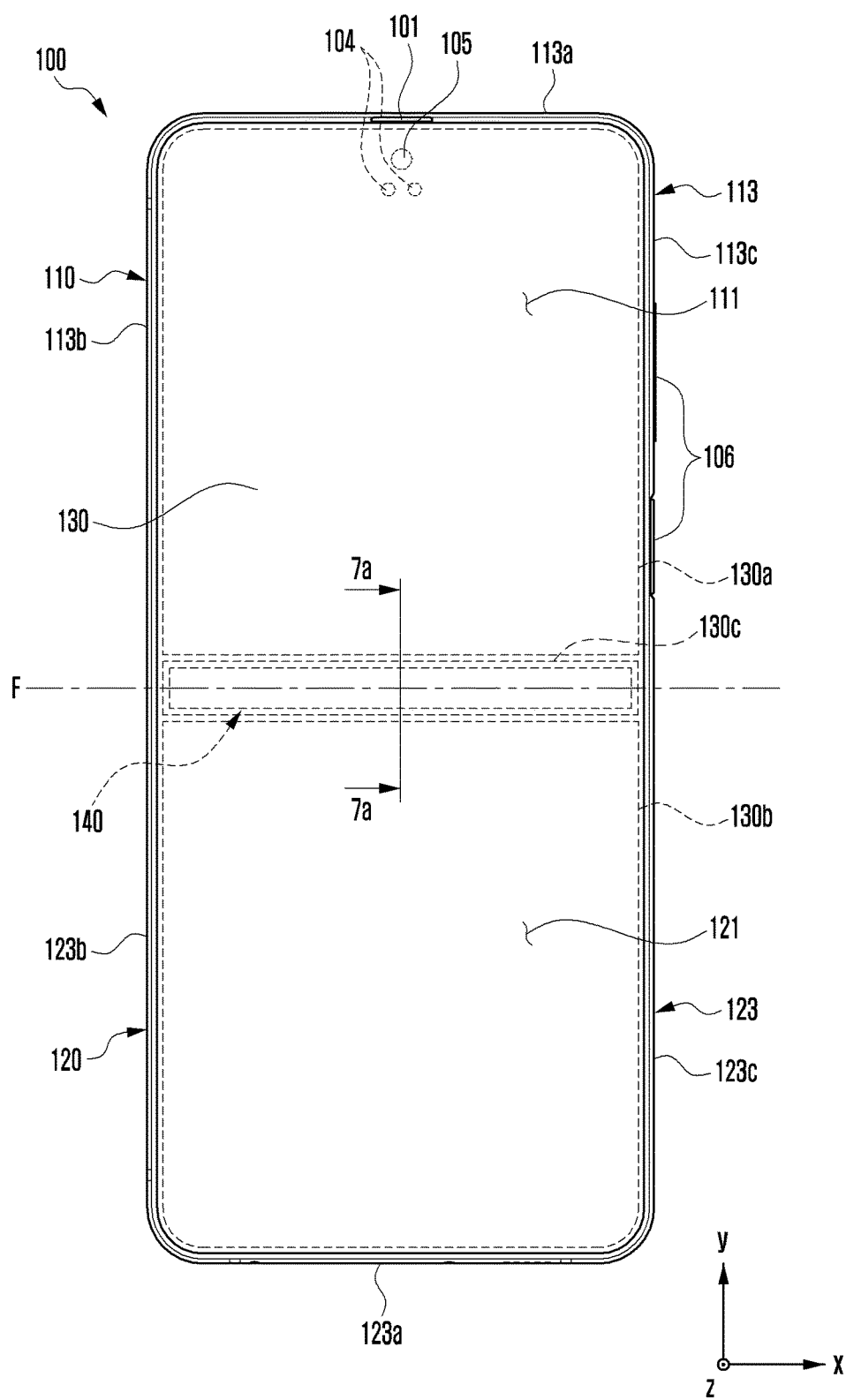
FIG. 1B is a top view illustrating the front surface of the electronic device in the unfolded state according to various embodiments of the present disclosure.
Figure 1C:
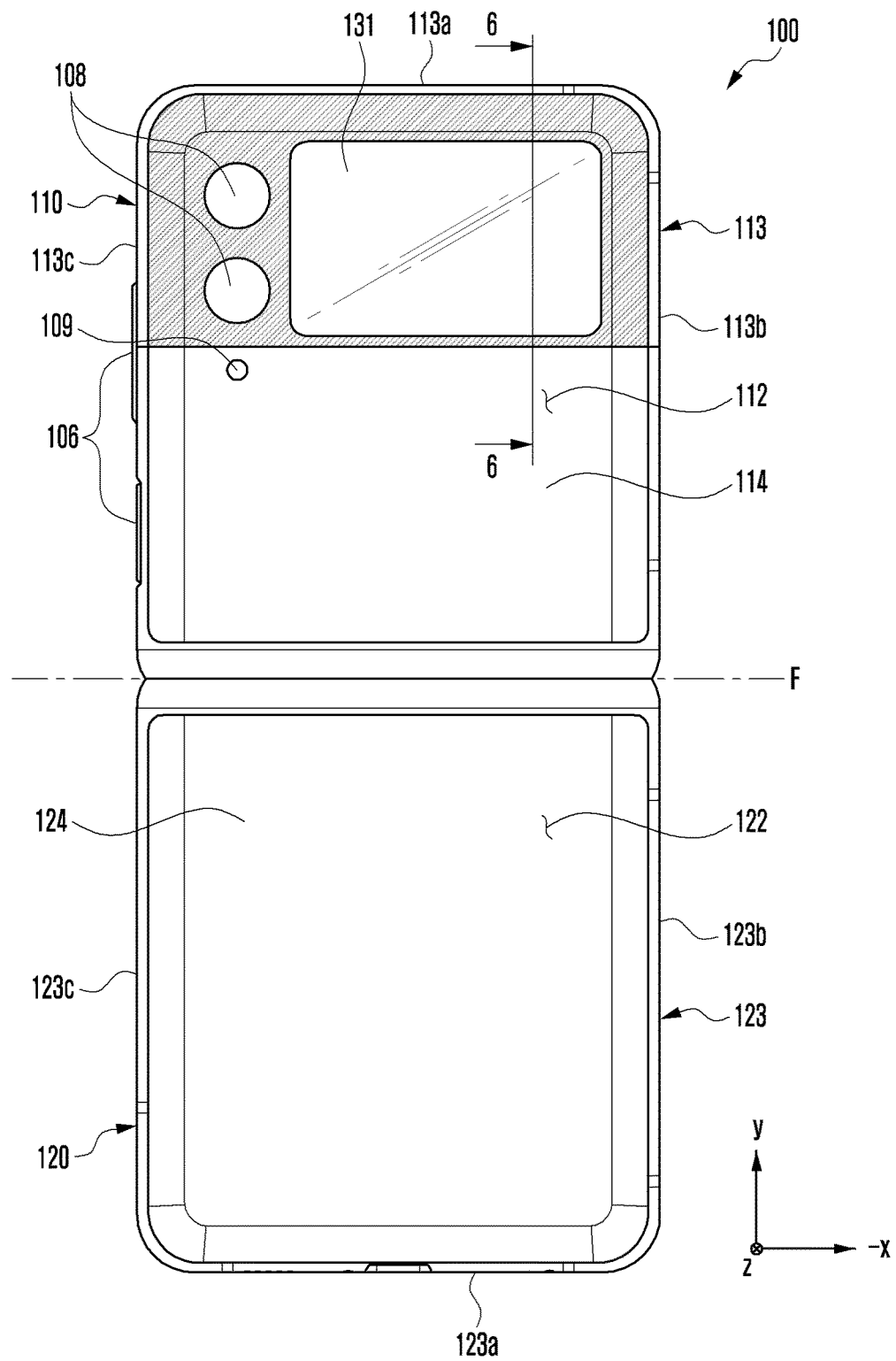
FIG. 1C is a top view illustrating a rear surface of the electronic device in the unfolded state, according to various embodiments of the present disclosure.

FIG. 1A is a perspective view of an electronic device illustrating an unfolded state (or flat state) of the electronic device according to various embodiments of the disclosure. FIG. 1B is a plan view illustrating a front surface of an electronic device in an unfolded state of the electronic device according to various embodiments of the disclosure. FIG. 1C is a plan view illustrating a rear surface of an electronic device in an unfolded state according to various embodiments of the disclosure.

Figure 2A:
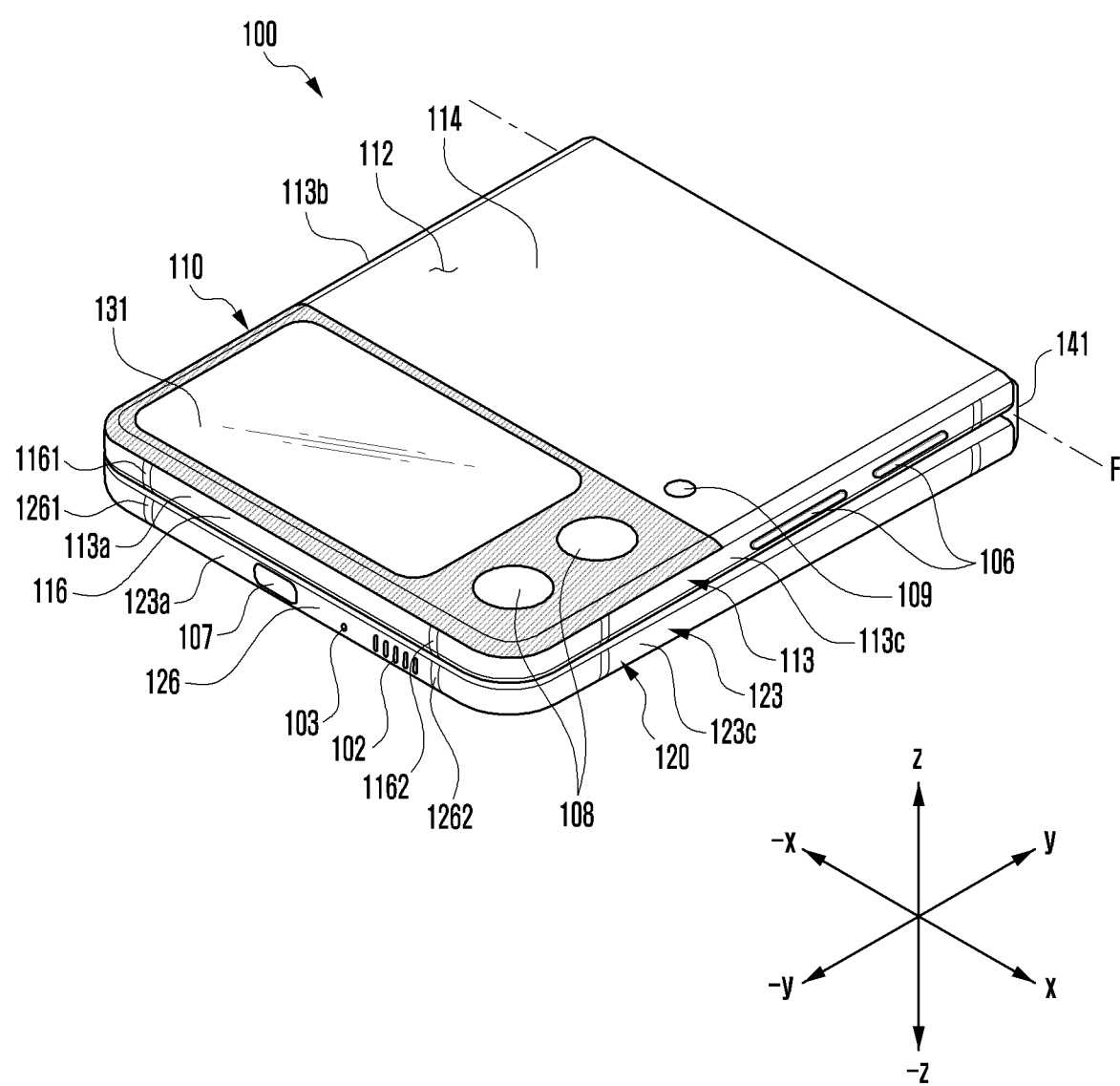
FIG. 2A is a perspective view of the electronic device illustrating a folded state according to various embodiments of the present disclosure.
Figure 2B:
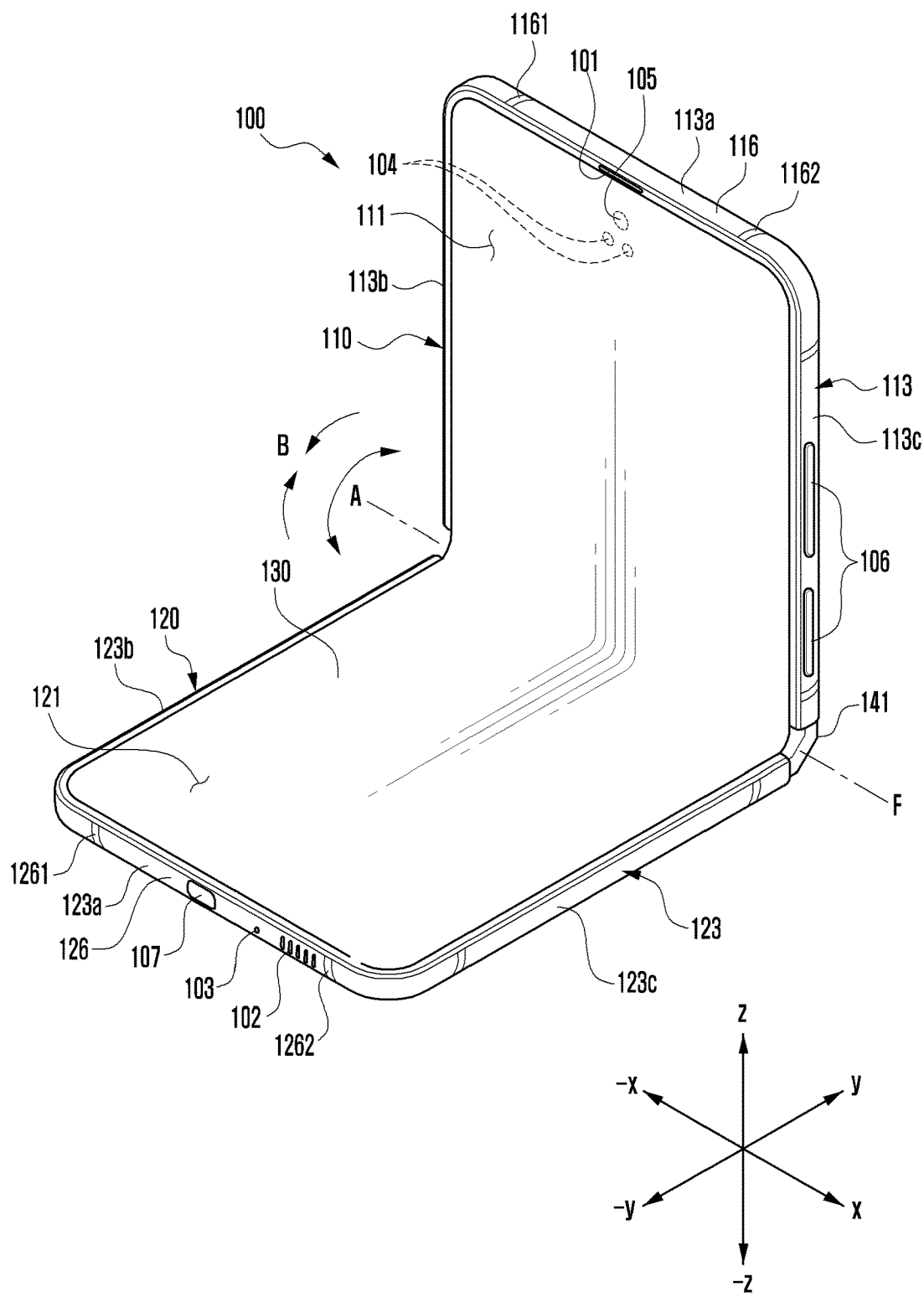
FIG. 2B is a perspective view of the electronic device illustrating an intermediate state according to various embodiments of the present disclosure.

FIG. 2A is a perspective view of an electronic device illustrating a folded state of the electronic device according to various embodiments of the disclosure. FIG. 2B is a perspective view of an electronic device illustrating an intermediate state of the electronic device according to various embodiments of the disclosure.

With reference to FIGS. 1A to 2B, an electronic device 100 may include first and second housings 110 and 120 (e.g., foldable housing structure) combined with each other in a foldable manner based on a hinge device (e.g., hinge device 140 of FIG. 1B) (e.g., hinge or hinge module). In an embodiment, the hinge device (e.g., hinge device 140 of FIG. 1B) may be disposed in an X-axis direction or in a Y-axis direction. According to an embodiment, the electronic device 100 may include a first display 130 (e.g., flexible display, foldable display, or main display) disposed in an area (e.g., recess) formed by the first and second housings 110 and 120. According to an embodiment, the first housing 110 and the second housing 120 may be disposed on both sides around a folding axis F, and may have a substantially symmetrical shape about the folding axis F. According to an embodiment, an angle or a distance between the first housing 110 and the second housing 120 may differ depending on the state of the electronic device 100. For example, depending on whether the electronic device is in an unfolded state (or flat state), in a folded state, or in an intermediate state, the angle or the distance between the first housing 110 and the second housing 120 may differ.

According to an embodiment, in the unfolded state of the electronic device 100, the first housing 110 may include a first surface 111 directed in a first direction (e.g., front direction) (z-axis direction), and a second surface 112 directed in a second direction (e.g., rear direction) (−z-axis direction) opposite to the first surface 111. According to an embodiment, in the unfolded state of the electronic device 100, the second housing 120 may include a third surface 121 directed in the first direction (z-axis direction), and a fourth surface 122 directed in the second direction (−z-axis direction). According to an embodiment, in the unfolded state of the electronic device 100, the first surface 111 of the first housing 110 and the third surface 121 of the second housing 120 may be directed in substantially the same first direction (z-axis direction). In an embodiment, in the folded state of the electronic device 100, the first surface 111 of the first housing 110 and the third surface 121 of the second housing 120 may face each other. According to an embodiment, in the unfolded state of the electronic device 100, the second surface 112 of the first housing 110 and the fourth surface 122 of the second housing 120 may be directed in substantially the same second direction (−z-axis direction). In an embodiment, in the folded state of the electronic device 100, the second surface 112 of the first housing and the fourth surface 122 of the second housing 120 may be directed in opposite directions. For example, in the folded state of the electronic device 100, the second surface 112 may be directed in the first direction (z-axis direction), and the fourth surface 122 may be directed in the second direction (−z-axis direction). In this case, the first display 130 may not be viewed from outside (in-folding manner). In an embodiment, the electronic device 100 may be folded so that the second surface 112 of the first housing 110 and the fourth surface 122 of the second housing 120 face each other. In this case, the first display 130 may be disposed to be viewed from the outside (out-folding manner).

According to various embodiments, the first housing 110 (e.g., first housing structure) may include a first lateral member 113 forming the appearance of the electronic device 100, and a first rear cover 114 combined with the first lateral member 113, and forming at least a part of the second surface 112 of the electronic device 100. According to an embodiment, the first lateral member 113 may include a first side surface 113*a*, a second side surface 113*b* extending from one end of the first side surface 113*a*, and a third side surface 113*c* extending from the other end of the first side surface 113*a*. According to an embodiment, the first lateral member 113 may be formed in a quadrangular (e.g., square or rectangular) shape through the first side surface 113*a*, the second side surface 113*b*, and the third side surface 113*c*.

According to various embodiments, the second housing 120 (e.g., second housing structure) may include a second lateral member 123 forming the appearance of the electronic device 100 at least partly, and a second lateral cover 124 combined with the second lateral member 123, and forming at least a part of the fourth surface 122 of the electronic device 100. According to an embodiment, the second lateral member 123 may include a fourth side surface 123*a*, a fifth side surface 123*b* extending from one end of the fourth side surface 123*a*, and a sixth side surface 123*c* extending from the other end of the fourth side surface 123*a*. According to an embodiment, the second lateral member 123 may be formed in a quadrangular shape through the fourth side surface 123*a*, the fifth side surface 123*b*, and the sixth side surface 123*c*.

According to various embodiments, the first and second housings 110 and 120 are not limited to the illustrated shapes and combinations, but may be implemented by combinations and/or compositions of other shapes or components. In an embodiment, the first lateral member 113 may be integrally formed with the first rear cover 114, and the second lateral member 123 may be integrally formed with the second rear cover 124.

According to various embodiments, in the unfolded state of the electronic device 100, the second side surface 113*b* of the first lateral member 113 and the fifth side surface 123*b* of the second lateral member 123 may be connected to each other without a gap. According to an embodiment, in the unfolded state of the electronic device 100, the third side surface 113*c* of the first lateral member 113 and the sixth side surface 123*c* of the second lateral member 123 may be connected to each other without a gap. According to an embodiment, in the unfolded state of the electronic device 100, the sum of the lengths of the second side surface 113*b* and the fifth side surface 123*b* may be configured to be longer than the length of the first side surface 113*a* and/or the fourth side surface 123*a*. According to an embodiment, in the unfolded state of the electronic device 100, the sum of the lengths of the third side surface 113*c* and the sixth side surface 123*c* may be configured to be longer than the length of the first side surface 113*a* and/or the fourth side surface 123*a*.

With reference to FIGS. 2A and 2B, the first lateral member 113 and/or the second lateral member 123 may be formed of metal, or may further include polymer that is injected into metal. According to an embodiment, the first lateral member 113 and/or the second lateral member 123 may include at least one conductive part 116 and/or 126 electrically segmented through at least one segment part 1161, 1162 and/or 1261, 1262 formed of polymer. In this case, the at least one conductive part 116 and/or 126 may be electrically connected to a wireless communication circuit included in the electronic device 100, and thus may be used as at least a part of an antenna that operates in at least one designated band (e.g., legacy band).

According to various embodiments, the first rear cover 114 and/or the second rear cover 124 may be formed of, for example, at least one of coated or colored glass, ceramic, polymer, or metal (e.g., aluminum, stainless steel (STS), or magnesium) or a combination of at least two thereof.

According to various embodiments, the first display 130 may be disposed to extend from the first surface 111 of the first housing 110 to at least a part of the third surface 121 of the second housing 120 across the hinge device (e.g., hinge device 140 of FIG. 1B). In an embodiment, the first display 130 may include a first area 130a substantially corresponding to the first surface 111, a second area 130b corresponding to the second surface 121, and a third area 130c (e.g., flexible area or folding area) connecting the first area 130a and the second area 130b to each other. According to an embodiment, the third area 130c may be a part of the first area 120a and/or the second area 130b, and may be disposed at a location corresponding to the hinge device (e.g., hinge device 140 of FIG. 1B). According to an embodiment, the electronic device 100 may include a hinge housing 141 (e.g., hinge cover) supporting the hinge device (e.g., hinge device 140 of FIG. 1B). In an embodiment, the hinge housing 141 may be disposed to be exposed to outside when the electronic device 100 is in a folded state, and not to be viewed from the outside as being drawn into an inner space of the first housing 110 and an inner space of the second housing 120 when the electronic device 100 is in an unfolded state.

According to various embodiments, the electronic device 100 may include a second display 131 (e.g., sub-display) disposed separately from the first display 130. According to an embodiment, the second display 131 may be disposed to be exposed at least partly on the second surface 112 of the first housing 110. In an embodiment, when the electronic device 100 is in the folded state, the second display 131 may display at least a part of state information of the electronic device 100 in replacement of at least a part of a display function of the first display 130. According to an embodiment, the second display 131 may be disposed to be viewed from the outside through at least a partial area of the first rear cover 114. In an embodiment, the second display 131 may be disposed on the fourth surface 122 of the second housing 120. In this case, the second display 131 may be disposed to be viewed from the outside through at least a partial area of the second rear cover 124.

According to various embodiments, the electronic device 100 may include at least one of an input device 103 (e.g., microphone), sound output devices 101 and 102, a sensor module 104, camera devices 105 and 108, a key input device 106, or a connector port 107. In an illustrated embodiment, although the input device 103 (e.g., microphone), the sound output devices 101 and 102, the sensor module 104, the camera devices 105 and 108, the key input device 106, or the connector port 107 are illustrated as hole or circular shaped elements formed on the first housing 110 or the second housing 120, they are exemplarily illustrated for explanation, but are not limited thereto. According to various embodiments, the input device 103 may include at least one microphone 103 disposed on the second housing 120. In an embodiment, the input device 103 may include a plurality of microphones 103 disposed to sense the sound direction. In an embodiment, the plurality of microphone 103 may be disposed at proper locations on the first housing 110 and/or the second housing 120. According to an embodiment, the sound output devices 101 and 102 may include at least one speaker 101 and 102. According to an embodiment, the at least one speaker 101 and 102 may include a receiver 101 for call disposed on the first housing 110, and the speaker 102 disposed on the second housing 120. In an embodiment, the input device 103, the sound output devices 101 and 102, and the connector port 107 may be disposed in a space provided in the first housing 110 and/or the second housing 120 of the electronic device 100, and may be exposed to an external environment through at least one hole formed on the first housing 110 and/or the second housing 120. According to an embodiment, the at least one connector port 107 may be used to transmit and receive power and/or data to and from an external electronic device. In an embodiment, the at least one connector port (e.g., ear jack hole) may accommodate a connector (e.g., ear jack) for transmitting and receiving an audio signal to and from the external electronic device. In an embodiment, the hole formed on the first housing 110 and/or the second housing 120 may be commonly used for the input device 103 and the sound output devices 101 and 102. In an embodiment, the sound output devices 101 and 102 may include a speaker (e.g., piezo-electric speaker) that is not exposed through the hole formed on the first housing 110 and/or the second housing 120.

According to various embodiments, the sensor module 104 may generate an electrical signal or a data value corresponding to an internal operation state of the electronic device 100 or an external environment state. According to an embodiment, the sensor module 104 may detect the external environment through the first surface 111 of the first housing 110. In an embodiment, the electronic device 100 may further include at least one sensor module disposed to detect the external environment through the second surface 112 of the first housing 110. According to an embodiment, the sensor module 104 (e.g., illumination sensor) may be disposed to detect the external environment through the first display 130 under the first display 130. According to an embodiment, the sensor module 104 may include at least one of a gesture sensor, a gyro sensor, a barometric pressure sensor, a magnetic sensor, an acceleration sensor, a grip sensor, a color sensor, an infrared (IR) sensor, a biosensor, a temperature sensor, a humidity sensor, an illumination sensor, a proximity sensor, a biosensor, an ultrasonic sensor, or an illumination sensor 104.

According to various embodiments, the camera devices 105 and 108 may include the first camera device 105 (e.g., front camera device) disposed on the first surface 111 of the first housing 110, and the second camera device 108 disposed on the second surface 112 of the first housing 110. In an embodiment, the electronic device 100 may further include a flash 109 disposed near the second camera device 108. According to an embodiment, the camera devices 105 and 108 may include at least one lens, an image sensor, and/or an image signal processor. According to an embodiment, the camera devices 105 and 108 may be disposed so that two or more lenses (e.g., wide angle lens, ultra wide angle lens, or telephoto lens) and two or more image sensors are located on one surface (e.g., first surface 111, second surface 112, third surface 121, or fourth surface 122) of the electronic device 100. In an embodiment, the camera devices 105 and 108 may include lenses for time of flight (TOF) and/or image sensors.

According to various embodiments, the key input device 106 (e.g., key buttons) may be disposed on the third side surface 113c of the first lateral member 113 of the first housing 110. In an embodiment, the key input device 106 may be disposed on at least one side surface of other side surfaces 113a and 113b of the first housing 110 and/or side surfaces 123a, 123b, and 123c of the second housing 120. In an embodiment, the electronic device 100 may not include some or all of the key input devices 106, and the non-included key input device 106 may be implemented in another form, such as a soft key, on the first display 130. In an embodiment, the key input device 106 may be implemented by using the pressure sensor included in the first display 130.

According to various embodiments, one of the camera devices 105 and 108 (e.g., first camera device 105) or the sensor module 104 may be disposed to be exposed through the first display 130. According to an embodiment, the first camera device 105 or the sensor module 104 may be optically exposed to the outside through an opening (e.g., through-hole) formed at least partly on the first display 130 in the inner space of the electronic device 100. According to an embodiment, at least a part of the sensor module 104 may be disposed not to be visually exposed through the first display 130 in the inner space of the electronic device 100. With reference to FIG. 2B, the electronic device 100 may operate to maintain at least one designated folding angle in an intermediate state through the hinge device (e.g., hinge device 140 of FIG. 1B). In this case, the electronic device 100 may control the first display 130 so that different kinds of content are displayed on the display area corresponding to the first surface 111 and the display area corresponding to the third surface 121. According to an embodiment, the electronic device 100 may operate in substantially the unfolded state (e.g., unfolded state of FIG. 1A) and/or in substantially the folded state (e.g., folded state of FIG. 2A) based on a specific folding angle (e.g., angle between the first housing 110 and the second housing 120 when the electronic device 100 is in the intermediate state) through the hinge device (e.g., hinge device 140 of FIG. 1B). In an embodiment, if a pressing force is provided in an unfolding direction (direction A) in a state where the electronic device 100 is unfolded at the specific folding angle through the hinge device (e.g., hinge device 140 of FIG. 1B), the electronic device 100 may operate to be transitioned to the unfolded state (e.g., unfolded state of FIG. 1A). In an embodiment, if the pressing force is provided in a folding direction (direction B) in a state where the electronic device 100 is unfolded at the specific folding angle through the hinge device (e.g., hinge device 140 of FIG. 1B), the electronic device 100 may operate to be transitioned to the folded state (e.g., folded state of FIG. 2A). In an embodiment, the electronic device 100 may operate to maintain the unfolded state (not illustrated) at various angles through the hinge device (e.g., hinge device 140 of FIG. 1B) (free-stop function).

Figure 3:
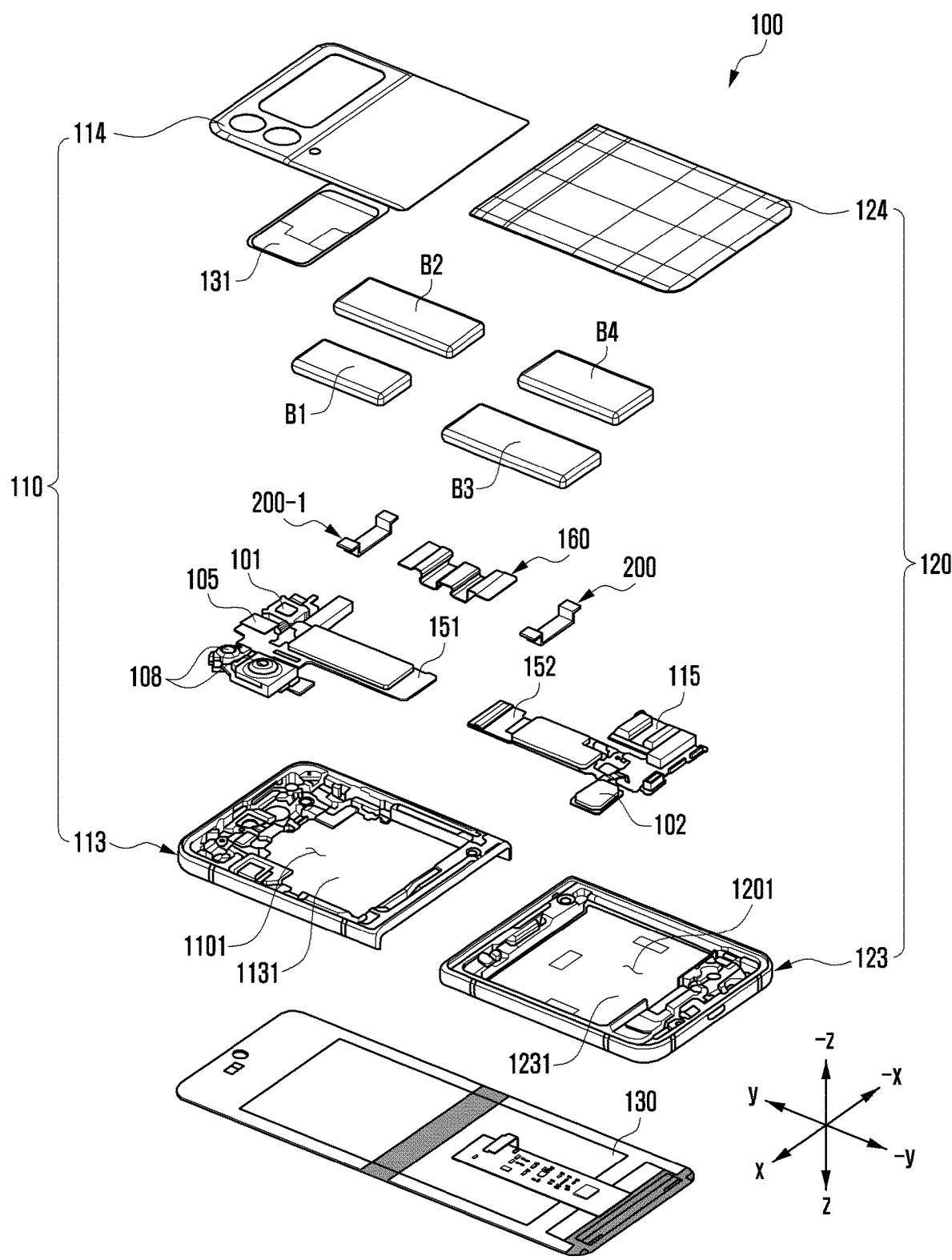
FIG. 3 is an exploded perspective view of the electronic device according to various embodiments of the present disclosure.

FIG. 3 is an exploded perspective view of the electronic device according to various embodiments of the present disclosure.

With reference to FIG. 3, the electronic device 100 may include: a first housing 110 including a first lateral member 113 (e.g., a first side surface frame or a first side surface bezel); a second housing 120 that is foldably connected to the first housing 110 by means of a hinge device (e.g., hinge device 140 in FIG. 1B) and includes a second lateral member 123 (e.g., a second side surface frame or a second side surface bezel); and a first display 130 (e.g., a flexible display) disposed to be supported by the first housing 110 and the second housing 120.

In an embodiment, the electronic device 100 may include a first support member 1131 (e.g., a first support plate) extending at least partially from the first lateral member 113 into a first space 1101, and a second support member 1231 (e.g., a second support plate) extending at least partially from the second lateral member 123 into a second space 1201. In an embodiment, the first support member 1131 may be integrally formed with the first lateral member 113 or structurally coupled to the first lateral member 113. In an embodiment, the second support member 1231 may be integrally formed with the second lateral member 123 or structurally coupled to the second lateral member 123. In an embodiment, the first display 130 may be disposed to be supported by the first support member 1131 and the second support member 1231.

In an embodiment, the electronic device 100 may include the first rear surface cover 114 coupled with the first lateral member 113. In an embodiment, the first space 1101 may be formed (or defined) by the first support member 1131 together with the first rear surface cover 114. In an embodiment, the electronic device 100 may include the second rear surface cover 124 coupled with the second lateral member 123. In an embodiment, the second space 1201 may be formed by the second support member 1231 and the second rear surface cover 124. In an embodiment, the first lateral member 113 together with the first rear surface cover 114 may be integrally formed. In an embodiment, the second lateral member 123 and the second rear surface cover 124 may be integrally formed.

In an embodiment, the first housing 110 may include the first lateral member 113, the first support member 1131, and the first rear surface cover 114 together with each other. In an embodiment, the second housing 120 may include the second lateral member 123, the second support member 1231, and the second rear surface cover 124 together with each other. In an embodiment, the electronic device 100 may include the second display 131 disposed in the first space 1101 and externally visible through at least some area (e.g., planar area) of the first rear surface cover 114.

According to various embodiments, the electronic device 100 may include a first printed circuit board 151 (e.g., a first printed circuit board assembly or main printed circuit board) disposed in the first space 1101 and at least one electronic component (e.g., a camera module 105 and 108, receiver 101, or batteries B1 and B2) disposed on the first printed circuit board 151. In an embodiment, the electronic device 100 may include a second printed circuit board 152 (e.g., a second printed circuit board assembly or sub printed circuit board) disposed in the second space 1201 and at least one electronic component (e.g., a socket module 115, speaker 102, or batteries B3 and B4) disposed on the second printed circuit board 151. In an embodiment, the electronic device may include a flexible printed circuit board 160 (e.g., a flexible printed circuit board or wiring member) that electrically connects the first printed circuit board 151 and the second printed circuit board 152 by means of a hinge device (e.g., the hinge device 140 in FIG. 1B).

According to an embodiment of the present disclosure, the electronic device 100 may include a first battery B1 and a second battery B2 disposed side by side with the first printed circuit board 151 interposed therebetween. In an embodiment, the electronic device 100 may include third battery B3 and the fourth battery B4 disposed side-by-side with the second printed circuit board 152 interposed therebetween. In an embodiment, the first printed circuit board 151 may be disposed between the first and second batteries B1 and B2, to be near the hinge device (e.g., the hinge device 140 in FIG. 1B), and the second printed circuit board 152 may be disposed between the third and fourth batteries B3 and B4, to be near the hinge device 140. In an embodiment, the first printed circuit board 151 is disposed side by side with the first and second batteries B1 and B2 so as not to be overlapped therewith, and the second printed circuit board 152 is disposed side by side with the third and fourth batteries B3 and B4 so as not to be overlapped therewith.

In an embodiment, the flexible printed circuit board 160 is disposed to electrically connect the first printed circuit board 151 and the second printed circuit board 152 to each other by means of the hinge device (e.g., the hinge device 140 in FIG. 1B) with the shortest length (e.g., to have the shortest length) between the printed circuit boards, which may help to slim down the electronic device 100. In an embodiment, the first printed circuit board 151 is disposed or extends near the hinge device between the first and second batteries B1 and B2 (e.g., the hinge device 140 in FIG. 1B), which may include a meaning that the first printed circuit board 151 extends between the first and second batteries B1 and B2 to a length such that the first printed circuit board 151 is not overlapped with the hinge device (e.g., the hinge device 140 in FIG. 1B) when the first display 130 is viewed from above. As being near, elements may be adjacent to each other.

According to an embodiment of the present disclosure, the flexible printed circuit board 160 may include bending portions (e.g., bending portions R1 and R2 in FIG. 7A) that are bent at least once in different directions from each other to define one or more inflection in an area corresponding to the hinge device (e.g., the hinge device 140 in FIG. 1B). In an embodiment, the bending portion may be configured to receive a change in length of the flexible printed circuit board 160 that increases or decreases (e.g., a variable length of the flexible printed circuit board 160), depending on the folding motion of the electronic device 100. In an embodiment, as the electronic device becomes slimmer, a space or volume in which the flexible printed circuit board 160 is accommodated in the electronic device 100 becomes smaller. Accordingly, the bending portions have less curvature and may be subject to breakage due to stress concentration under folding motion.

The electronic device 100 may include at least one slide structure 200 and 200-1 that supports the flexible printed circuit board 160 to reduce the likelihood of such breakage. In an embodiment, the flexible printed circuit board 160 may be slidably supported in the first space 1101 of the first housing 110 and/or the second space 1201 of the second housing 120, over a designated reciprocating distance, by means of at least one slide structure 200 and 200-1 in response to the folding motion of the electronic device 100, thereby varying the curvature of the bending portions (e.g., the bending portions R1 and R2 in FIG. 7A) to reduce the likelihood of breakage.

According to an embodiment of the present disclosure, the electronic device 100 may include a waterproof structure (e.g., a waterproof member 270 of FIG. 15) for the flexible printed circuit board 160. In an embodiment, the electronic device 100 may include a support structure for the waterproof structure (e.g., a support structure by means of first and second magnets M1 and M2 in FIG. 15). In an embodiment, the support structure may reduce the likelihood of waterproofing failure, such as dislocation or distortion of the waterproofing structure, thereby helping to maintain waterproofing even with frequent folding motion of the electronic device 100.

Figure 4:
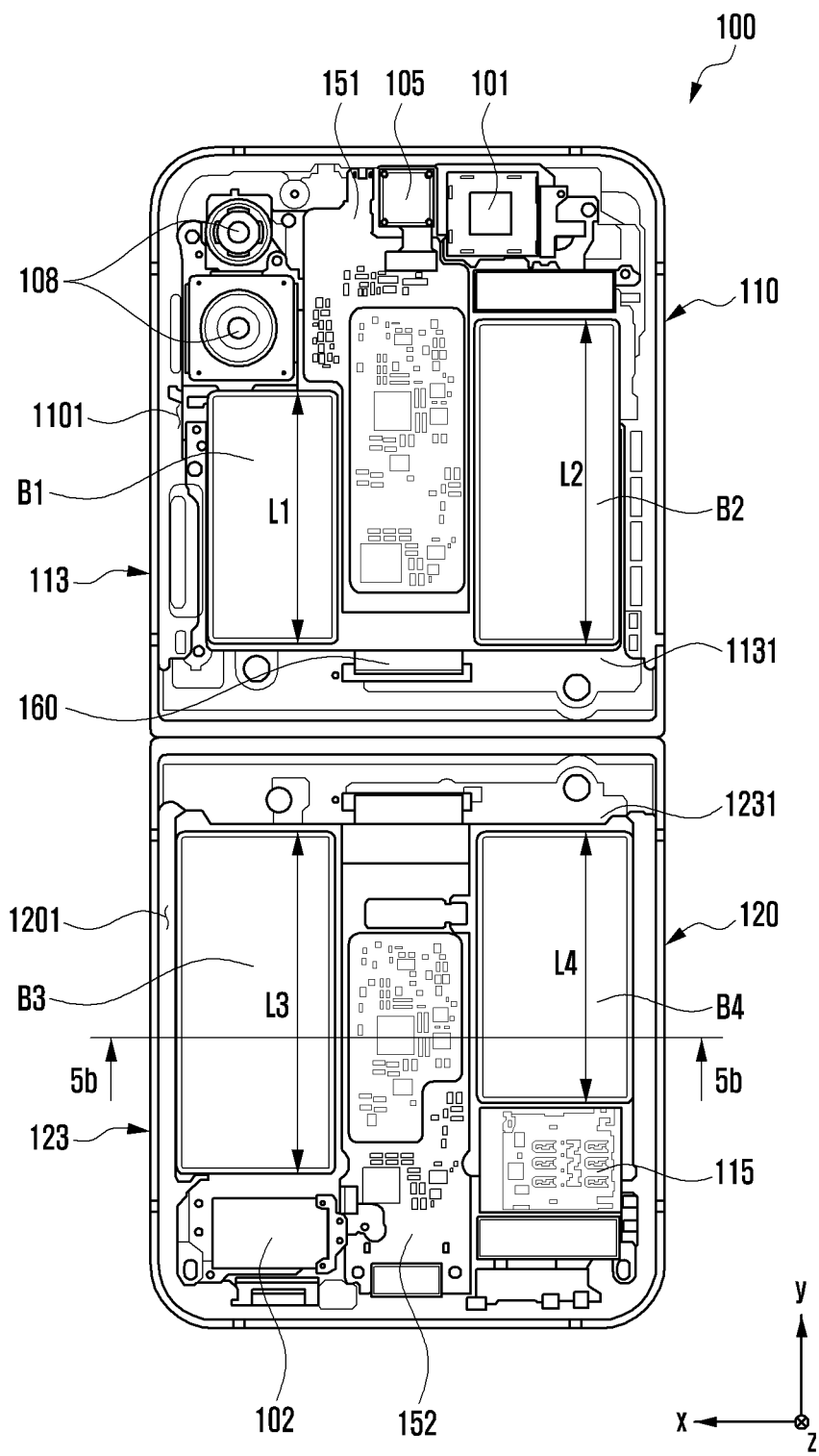
FIG. 4 is a view illustrating a plan view of the electronic device according to various embodiments of the present disclosure.

FIG. 4 is a view illustrating a plan view of the electronic device according to various embodiments of the present disclosure.

FIG. 4 is a view illustrating a rear surface of the electronic device 100 with the first rear surface cover (e.g., the first rear surface cover 114 in FIG. 3) and the second rear surface cover (e.g., the second rear surface cover 124 in FIG. 3) including the second display (e.g., the second display 131 in FIG. 3) removed.

With reference to FIG. 4, the electronic device 100 may include a first housing 110 including the first lateral member 113 (e.g., the first side surface frame or first side surface bezel), a second housing 120 foldably connected with the first housing 110 by means of the hinge device (e.g., the hinge device 140 in FIG. 1B) and including the second lateral member 123 (e.g., the second side surface frame or second side surface bezel), and the first display 130 (e.g., a flexible display) disposed to be supported by the first housing 110 and the second housing 120. In an embodiment, the electronic device 100 may include a first support member 1131 (e.g., a first support plate) extending at least partially from the first lateral member 113 into the first space 1101, and a second support member 1231 (e.g., a second support plate) extending at least partially from the second lateral member 123 into the second space 1201.

According to various embodiments, the electronic device 100 may include the first printed circuit board 151 disposed in the first space 1101, and the first battery B1 and the second battery B2 disposed on either side of the first printed circuit board 151, respectively, along the x-axis direction. In an embodiment, the first printed circuit board 151 may be disposed to have a length in the longitudinal direction (e.g., in the y-axis direction) of the first housing 110, and extend from the first housing 110, to be near the hinge device (e.g., the hinge device 140 in FIG. 1B). In an embodiment, the first and second batteries B1 and B2 may be disposed side by side with the first printed circuit board 151. In an embodiment, the first and second batteries B1 and B2 may be disposed not to be overlapped with the first printed circuit board 151 when the first display 130 is viewed from above in the unfolded state (e.g., in a plan view).

In an embodiment, the first battery B1 and the second battery B2 may have different sizes in a planar direction. For example, the first battery B1 may have a size corresponding to or defined with a first length L1 in the longitudinal direction (e.g., in the y-axis direction) of the electronic device. In an embodiment, the second battery B2 may have a size corresponding to a second length L2 that is longer than (e.g., greater than) the first length L1 in the longitudinal direction (e.g., in the y-axis direction) of the electronic device 100.

In an embodiment, the electronic device 100 may include at least one electronic component disposed in a portion of the first space 1101 corresponding to an omitted length of the first battery B1. An omitted length of the first battery B1 may include a planar area or planar dimension which is unoccupied by the first battery B1. In an embodiment, the at least one electronic component may include a second camera module 108. The illustrated reference numeral, 105, may include a first camera module, and the illustrated reference numeral, 101, may include a receiver. In an embodiment, the first battery B1 may be formed with a larger size (e.g., a larger planar size or a larger planar area) than the second camera module 108 disposed in a direction of a side surface of the first battery B1. For example, the first battery B1 may have a size corresponding to the first length L1, which is longer than the second camera module 108 in the longitudinal direction (e.g., in the y-axis direction) of the electronic device.

According to various embodiments, the electronic device 100 may include the second printed circuit board 152 disposed in the second space 1201, and the third battery B3 and the fourth battery B4 disposed on either side of the second printed circuit board 152, respectively. In an embodiment, the second printed circuit board 152 may be disposed to have a length in the longitudinal direction (e.g., in the y-axis direction) of the second housing 120, and extend from the second housing 120, to be near the hinge device (e.g., the hinge device 140 in FIG. 1B). In an embodiment, the third and fourth batteries B3 and B4 may be disposed side by side with the second printed circuit board 152, along the x-axis direction. In an embodiment, the third and fourth batteries B3 and B4 may be disposed not to be overlapped with the second printed circuit board 152 when the first display 130 is viewed from above in the unfolded state.

In an embodiment, the third battery B3 and the fourth battery B4 may have different sizes. For example, the third battery B3 may have a size corresponding to the third length L3 in the longitudinal direction (e.g., in the y-axis direction) of the electronic device 100. In an embodiment, the fourth battery B4 may have a size corresponding to a fourth length L4 that is longer than the third length L3 in the longitudinal direction (e.g., in the y-axis direction) of the electronic device 100.

In an embodiment, the electronic device 100 may include at least one electronic component disposed in a portion of the second space 1201 corresponding to an omitted length of the fourth battery B4. In an embodiment, the at least one electronic component may include the socket module 115. The illustrated reference numeral, 102, may include a speaker.

In an embodiment, the first through fourth batteries B1, B2, B3, and B4 may have different sizes or different planar dimensions. In some embodiments, at least some batteries of the first through fourth batteries B1, B2, B3, and B4 may be formed to be the same size as each other. In an embodiment, the fourth battery B4 may be formed with or have a larger size than the socket module 115 disposed in a direction of a side surface of the fourth battery B4. For example, the fourth battery B4 may have a size corresponding to the fourth length L4, which is longer than the socket module 115 in the longitudinal direction (e.g., in the y-axis direction) of the electronic device.

According to various embodiments, the electronic device 100 may include a flexible printed circuit board 160 that electrically connects the first printed circuit board 151 and the second printed circuit board 152 to each other. In an embodiment, the flexible printed circuit board 160 is disposed to electrically connect the first printed circuit board 151, at a portion thereof which is adjacent to (or closest to) the hinge device (e.g., the hinge device 140 in FIG. 1B) and a the second printed circuit board 152 at a portion thereof which is adjacent to (or closest to) the hinge device (e.g., the hinge device 140 in FIG. 1B). Therefore, the flexible printed circuit board 160 is applied to have the shortest length between the circuit boards, which may contribute to the slimming of the electronic device 100. In addition, the batteries B1, B2, B3, and B4 may ensure capacity (e.g., a planar space or volume dimension) within the limited space of the electronic device 100 by means of an efficient layout design along a planar dimension that takes into account the surrounding electronic components.

Figure 5A:
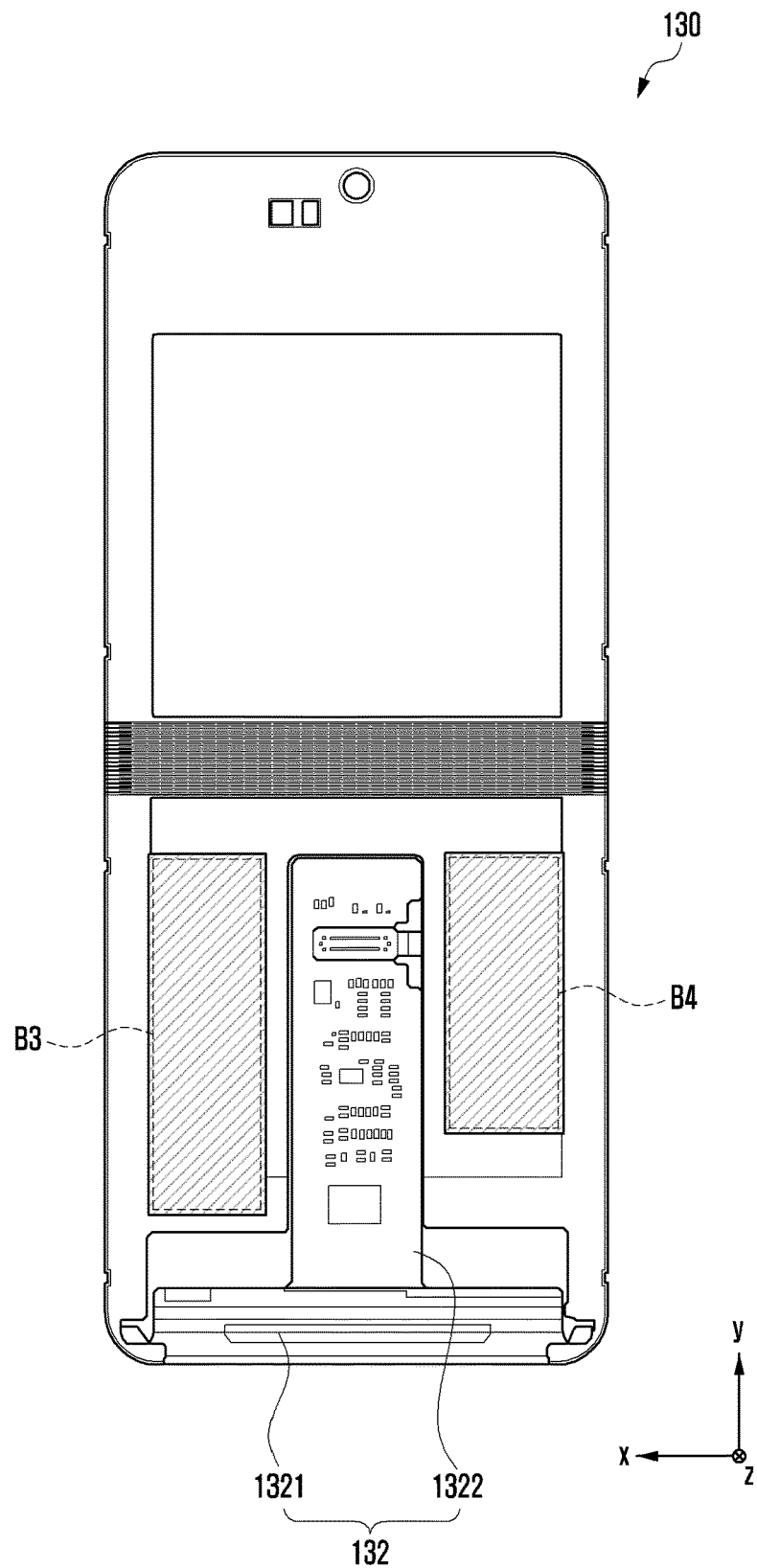
FIG. 5A is a view illustrating a plan view of a rear surface of a flexible display according to various embodiments of the present disclosure.
Figure 5B:
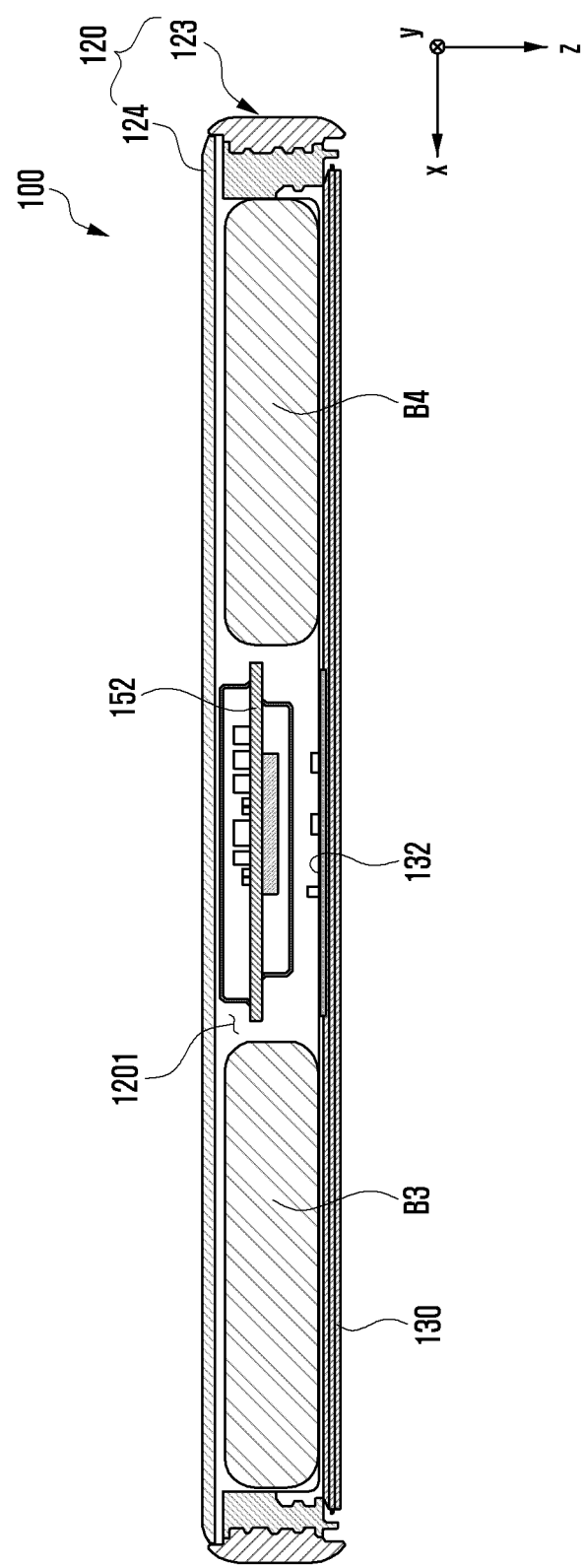
FIG. 5B is a cross-sectional view illustrating the electronic device that is viewed along lines 5b-5b in FIG. 4 according to various embodiments of the present disclosure.

FIG. 5A is a view illustrating a rear surface of a flexible display according to various embodiments of the present disclosure. FIG. 5B is a cross-sectional view illustrating the electronic device that is viewed along lines 5b-5b in FIG. 4 according to various embodiments of the present disclosure.

With reference to FIGS. 5A and 5B, the first display 130 (e.g., the flexible display) may include a bending portion 132 disposed in a manner such that the first display 130 is bendable to be bent toward a rear surface of the electronic device 100 from at least a portion of (or a remaining portion of) the first display 130. In an embodiment, the bending portion 132 may include a connection portion 1321 and a display printed circuit board 1322 (e.g., a flexible printed circuit board, FPCB) which is disposed at an end of the connection portion 1231. In an embodiment, the bending portion 132 may include a control circuit (e.g., DDI, display driver IC) disposed on the connection portion 1321 and/or on the display printed circuit board 1322.

According to various embodiments, when the first display 130 is disposed to be supported by the first support member 1131 extending from the first lateral member 113 of the first housing 110 and by the second support member 1231 extending from the second lateral member 123 of the second housing 120, the bending portion 132 being disposed in an area corresponding to the second printed circuit board 152 may be advantageous for electrical connection. According to an embodiment of the present disclosure, the bending portion 132 of the first display 130 is centrally disposed with respect to the width direction (e.g., ±x-axis direction) of the electronic device 100, such that the bending portion 132 may avoid being overlapped with the batteries B3 and B4, and the bending portion 132 may be easily electrically connected to the second printed circuit board 152, which may help to slim down the electronic device 100.

Figure 6:
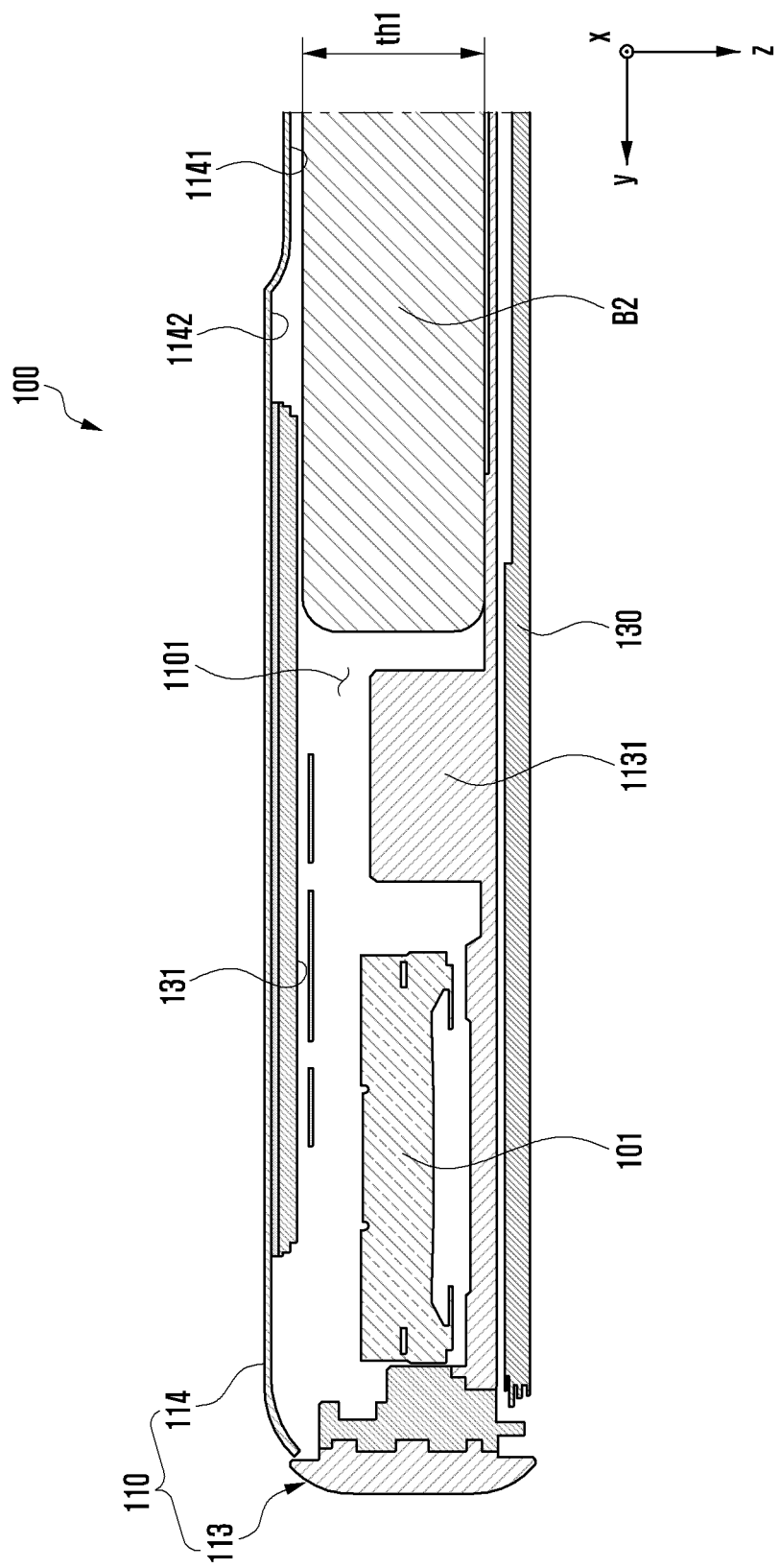
FIG. 6 is a partial cross-sectional view illustrating the electronic device that is viewed along lines 6-6 in FIG. 1C according to various embodiments of the present disclosure.

FIG. 6 is a partial cross-sectional view illustrating the electronic device that is viewed along lines 6-6 in FIG. 1C according to various embodiments of the present disclosure.

With reference to FIG. 6, the electronic device 100 may include the second display 131 disposed in the first space 1101 in a manner that the second display 131 is attached to a rear surface of the first rear surface cover 114. The rear surface may be exposed to an inner area of the electronic device 100, such as to the first space 1101. In an embodiment, the second display 131 may be overlapped with a portion of the second battery B2 when the first rear surface cover 114 is viewed from above (e.g., in a plan view or a view along the thickness direction). In some embodiments, the second display 131 may be overlapped with a portion of the first battery B1 or disposed to be at least partially overlapped with the first and second batteries B1 and B2, when the first rear surface cover 114 is viewed from above. In an embodiment, the first rear surface cover 114 may include a first inner surface 1141 and a second inner surface 1142 which extends from the first inner surface 1141. The first inner surface 1141 and the second inner surface 1142 may be portions of the rear surface of the first rear surface cover 114.

The rear surface of the first rear surface cover 114 may be stepped. In an embodiment, the second inner surface 1142 may be stepped further away from the first inner surface 1141 in an outward direction (e.g., in the −z-axis direction) to help ensure capacity or volume at the first space 1101, by ensuring a thickness th1 of the second battery B2 that is overlapped with the second display 131. The electronic device 100 and various components or layers thereof may have a thickness along the z-axis direction (e.g., a thickness direction).

Figure 7A:
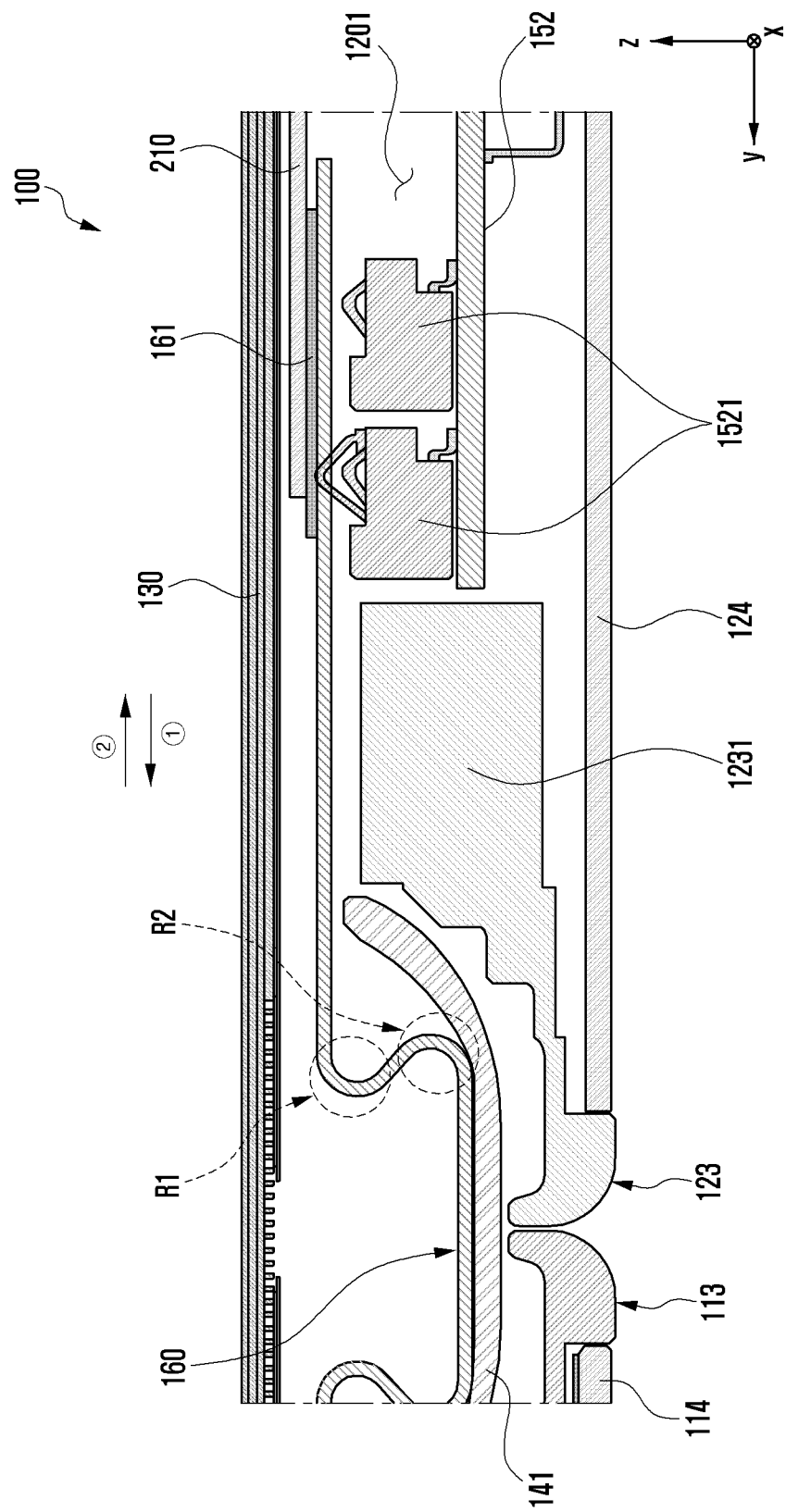
FIG. 7A is an enlarged partial cross-sectional view illustrating the electronic device that is viewed along lines 7a-7a in FIG. 1B according to various embodiments of the present disclosure.
Figure 7B:
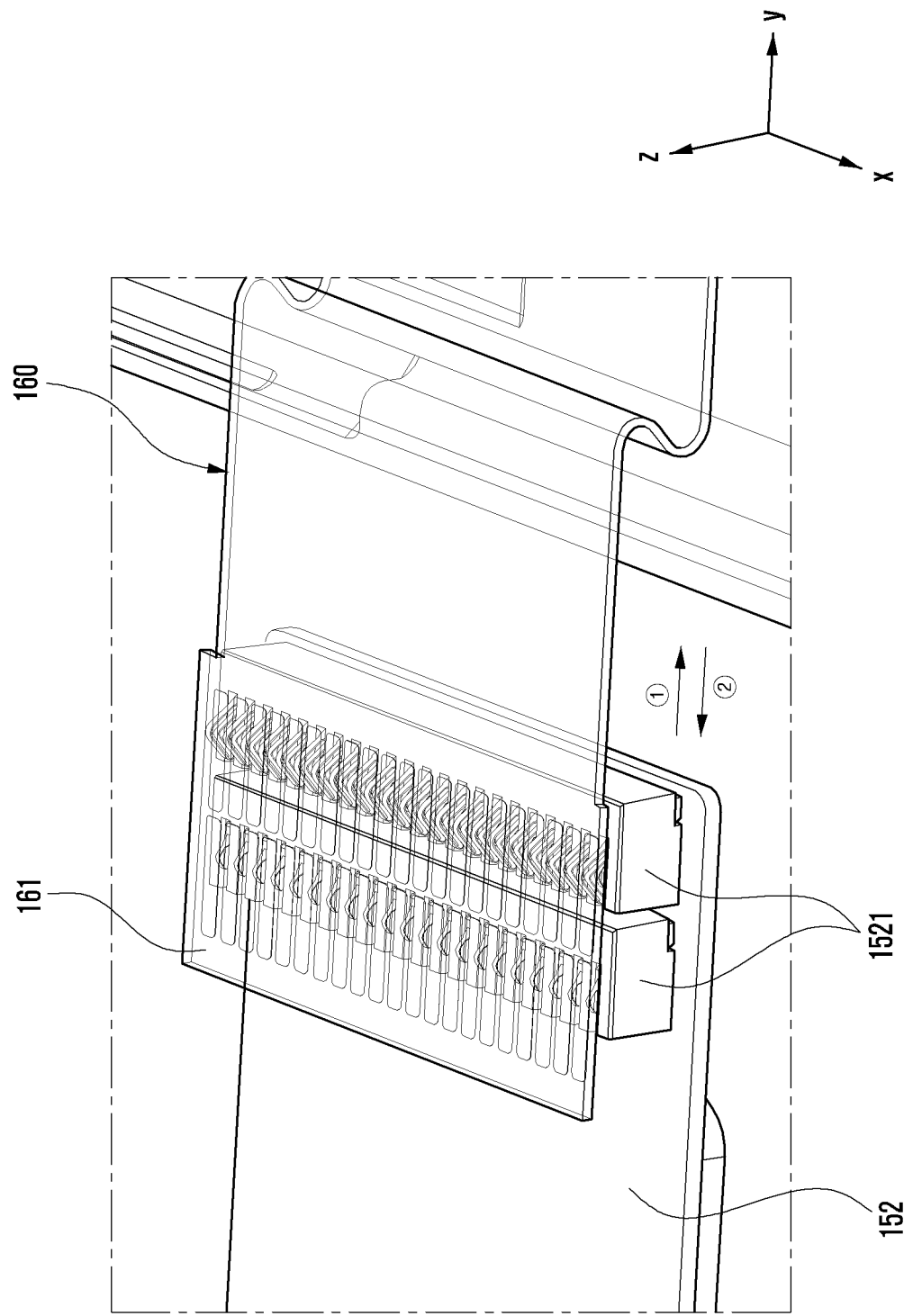
FIG. 7B is an enlarged perspective view schematically illustrating a connection relationship between a second printed circuit board and a flexible printed circuit board according to various embodiments of the present disclosure.
Figure 7C:
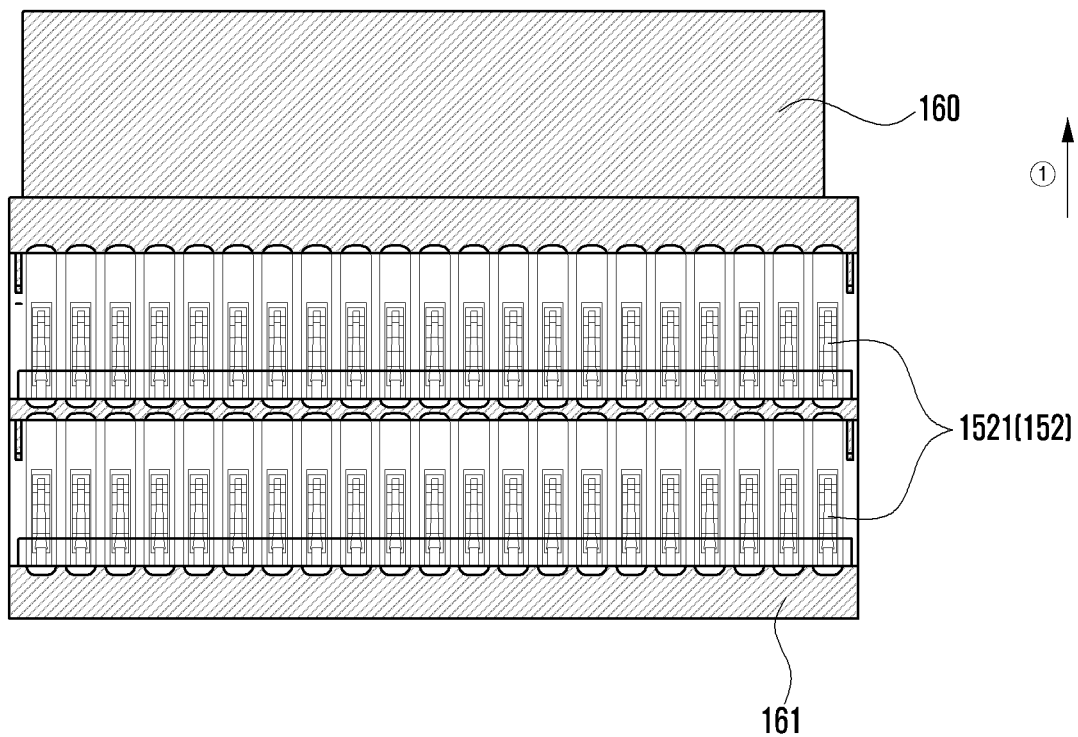
FIGS. 7C and 7D are views schematically illustrating positions of the flexible printed circuit board in the unfolded and folded states of the electronic device according to various embodiments of the present disclosure.
Figure 7D:
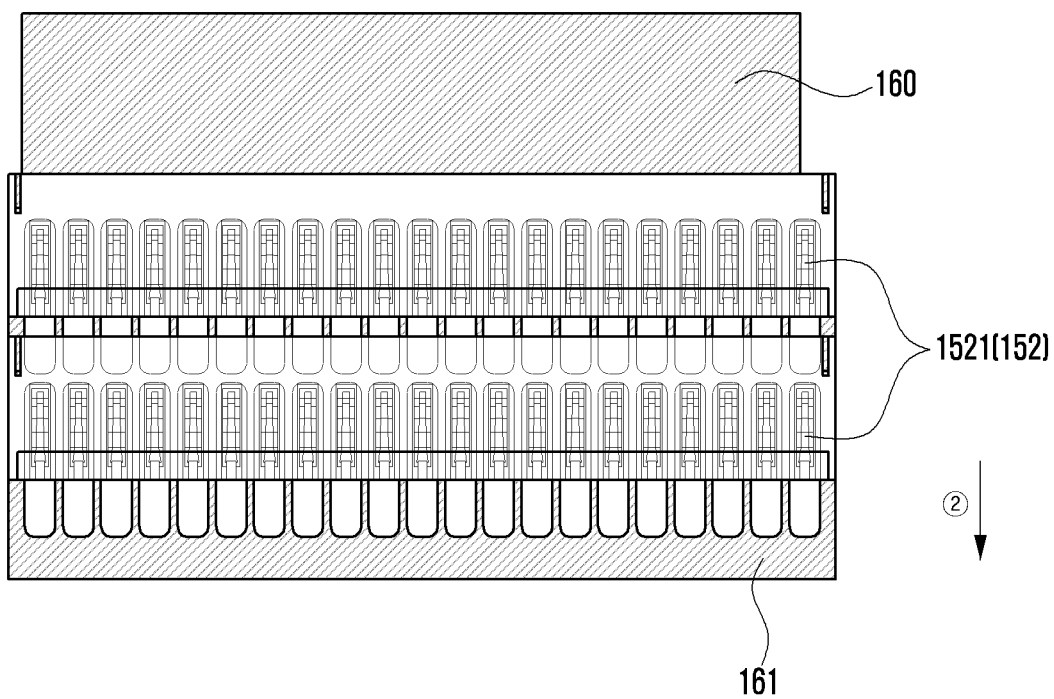

FIG. 7A is a partial cross-sectional view illustrating the electronic device that is viewed along lines 7a-7a in FIG. 1B according to various embodiments of the present disclosure. FIG. 7B is a perspective view schematically illustrating a connection relationship between the second printed circuit board and the flexible printed circuit board according to various embodiments of the present disclosure. FIGS. 7C and 7D are views schematically illustrating positions of the flexible printed circuit board in the unfolded and folded states of the electronic device according to various embodiments of the present disclosure.

With reference to FIGS. 7A to 7D, the electronic device 100 may include the first housing 110, the second housing 120 foldably connected to the first housing 110 by means of the hinge device (e.g., the hinge device 140 in FIG. 1B), and the first display 130 disposed to be supported by the first housing 110 together with the second housing 120. In an embodiment, the electronic device 100 may include the first printed circuit board (e.g., the first printed circuit board 151 in FIG. 3) disposed in the first space (e.g., the first space 1101 in FIG. 3) of the first housing (e.g., the first housing 110 in FIG. 3) and the second printed circuit board 152 disposed in the second space 1201 of the second housing 120. In an embodiment, the electronic device 100 may include the flexible printed circuit board 160 such that one end (e.g., a first end or a distal end) thereof is electrically connected to the first printed circuit board 151 in the first space 1101, and the other end thereof (e.g., a second end opposite to the first end) is electrically connected to the second printed circuit board 152 in the second space 1201, across the hinge device 140. That is, the flexible printed circuit board 160 is electrically connected to a respective circuit board, at a respective end of the flexible printed circuit board 160.

In an embodiment, the flexible printed circuit board 160 may be disposed to have a shape that is bent at least once in the inner space of the hinge housing 141 for accommodating the hinge device 140, such that the flexible printed circuit board 160 may have a free length which is moveable and/or bendable to accommodate changes in length in response to the folding motion of the electronic device 100. For example, the flexible printed circuit board 160 may include a first bending portion R1 bent in one direction (e.g., a −y-axis direction) and a second bending portion R2 bent in a direction opposite to the first bending portion R1 (e.g., in the y-axis direction), with an inflection point therebetween. The flexible printed circuit board 160 may be elastically bent to be curved, and resilient to accommodate changes in length caused by the folding motion of the electronic device 100. That is, a length of the flexible printed circuit board 160 along the y-axis direction may be increased or decreased.

In an embodiment, the flexible printed circuit board 160 may include a terminal portion 161 (e.g., a first terminal portion) at which the flexible printed circuit board 160 is connected to a connector 1521 of the second printed circuit board 152. Although not illustrated, the flexible printed circuit board 160 may also include a terminal portion that is connected to a connector of the first printed circuit board 151.

According to various embodiments of the present disclosure, the first bending portion R1 and/or the second bending portion R2 of the flexible printed circuit board 160, by being accommodated in a space that shrinks or decreases in volume as the electronic device 100 is slimmed down along the thickness direction (e.g., a space that reduces the thickness of the electronic device 100), may have a small curvature, and be subject to stress concentration and eventual breakage due to frequent folding motion. To solve these problems, one or more embodiment includes the flexible printed circuit board 160 slidably disposed with the terminal portion 161 in the inner space 1201 of the second housing 120, by means of a slide structure (e.g., a slide structure 200 in FIG. 8A), in the longitudinal direction (e.g., in the ±y-axis direction as a sliding direction) of the electronic device 100. In an embodiment, the terminal portion 161 of the flexible printed circuit board 160 remains connected to the connector 1521 of the second printed circuit board 152, for example, by means of a slide bracket of the slide structure 200 (e.g., a slide bracket 210 in FIG. 8A), together with being slidable in the longitudinal direction of the electronic device 100 (e.g., in the ±y-axis direction), thereby flexibly changing the curvature of the first bending portion R1 and/or the second bending portion R2, thereby reducing the occurrence of breakage.

Referring to FIG. 7A, for example, the terminal portion 161 of the flexible printed circuit board 160 may be moveable so as to move in a first direction along the sliding direction (in the ② direction) (e.g., in the direction of the hinge device) to provide the electronic device 100 in the folded state, while remaining in electrical connection with the connector 1521 of the second printed circuit board 152. That is, the electronic device 100 which is folded may include movement of the flexible printed circuit board 160 which is in electrical connection with the second printed circuit board 152, along the sliding direction, toward the first printed circuit board 151. Referring to FIG. 7B, the terminal portion 161 of the flexible printed circuit board 160 may be moveable so as to move in a second direction (in the ② direction) opposite the first direction (e.g., in a direction away from the hinge device) to provide the electronic device 100 in the unfolded state. That is, the electronic device 100 which is unfolded may include movement of the flexible printed circuit board 160 which is in electrical connection with the second printed circuit board 152, along the sliding direction, in a direction away from the first printed circuit board 151.

In some embodiments, the terminal portion 161 of the flexible printed circuit board may be implemented to move in the second direction (in the ② direction) in case that the electronic device is in the folded state and move in the first direction (in the ① direction) when the electronic device is in the unfolded state, depending on the shape of the first bending portion R1 and the second bending portion R2. For example, the terminal portion 161 of the flexible printed circuit board 160 slides in response to the folding motion of the electronic device 100, thereby minimizing the change in curvature of the first bending portion R1 and/or the second bending portion R2 and reducing excessive stress concentration. In some embodiments, a second terminal portion of the flexible printed circuit board 160 at which the flexible printed circuit board 160 is connected to the first printed circuit board 151 may also have substantially the same constitution as that of the terminal portion 161 described above.

Figure 8A:
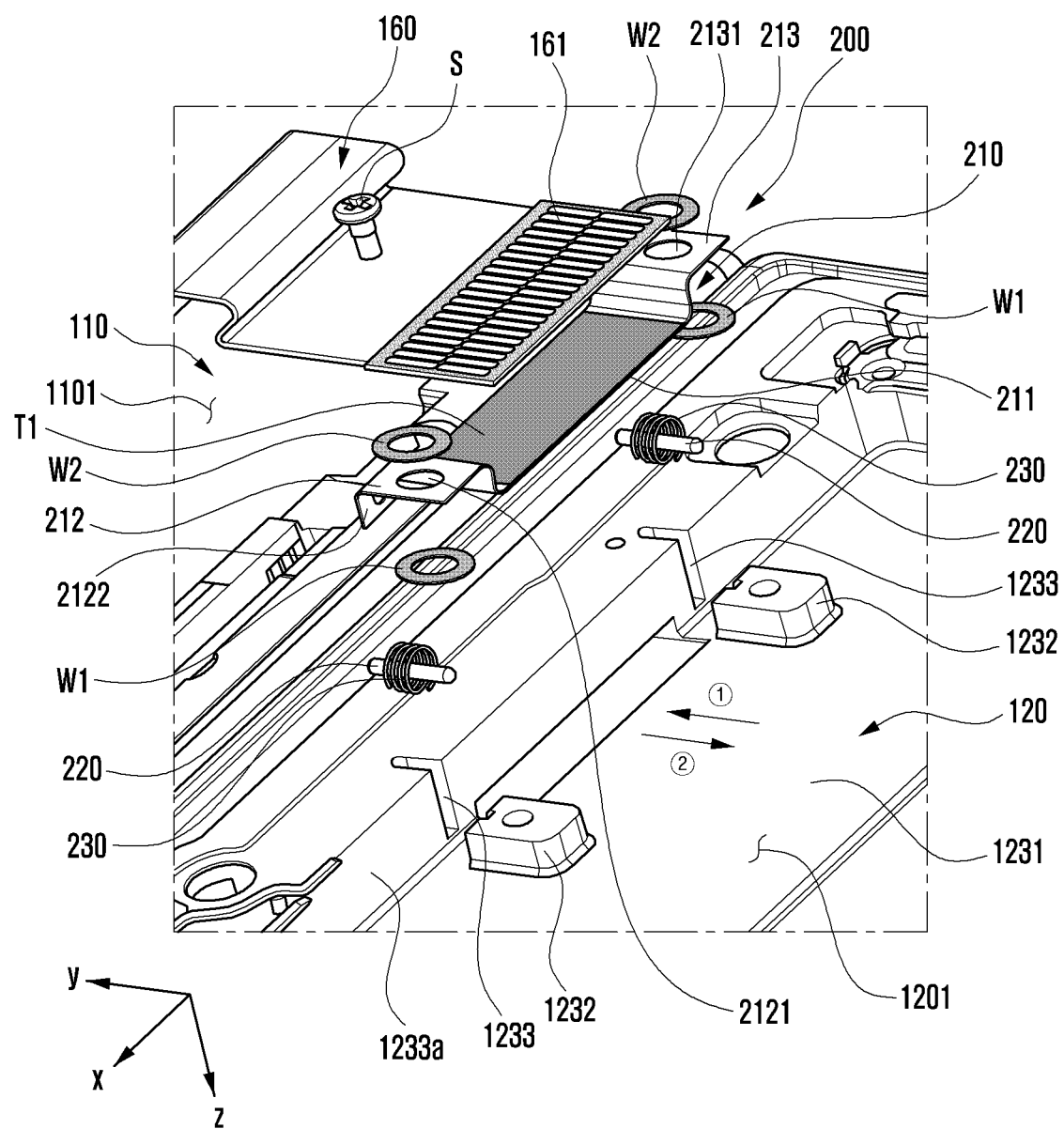
FIG. 8A is an enlarged partial exploded perspective view illustrating the electronic device including a slide structure according to various embodiments of the present disclosure.

Referring to FIGS. 7A and 8A, the terminal portion 161 may be a pad or protruded portion of the flexible printed circuit board 160 which protrudes from a main body thereof, may be connected to other components or layers within the main body of the flexible printed circuit board 160, at which the flexible printed circuit board 160 is in electrical connection with a connected or a respective circuit board. The terminal portion 161 may also refer to a length of the flexible printed circuit board 160 which includes the pad or protruded portion.

Figure 8B:
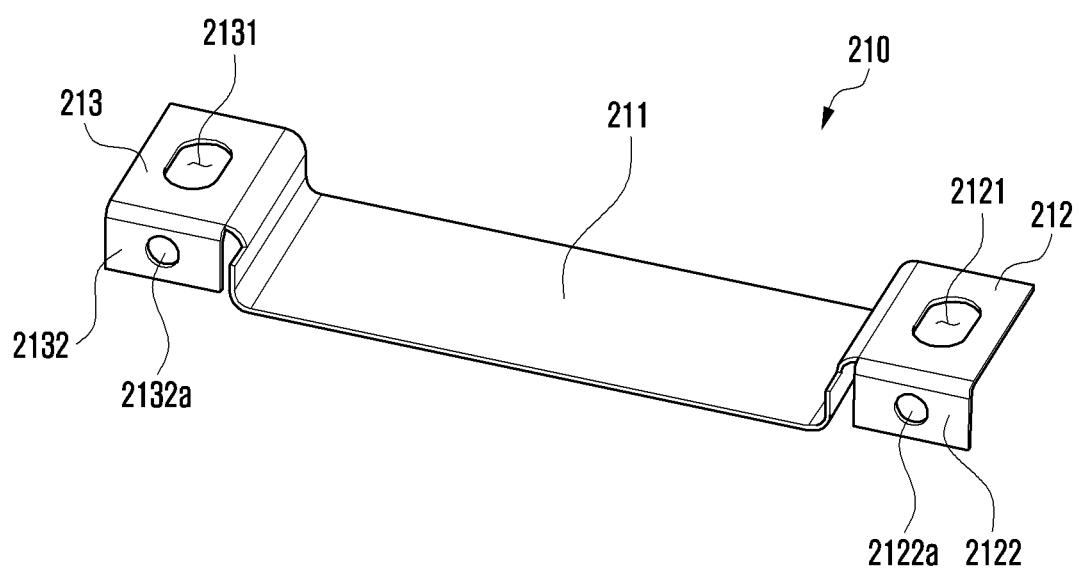
FIG. 8B is a perspective view illustrating a slide bracket according to various embodiments of the present disclosure.
Figure 8C:
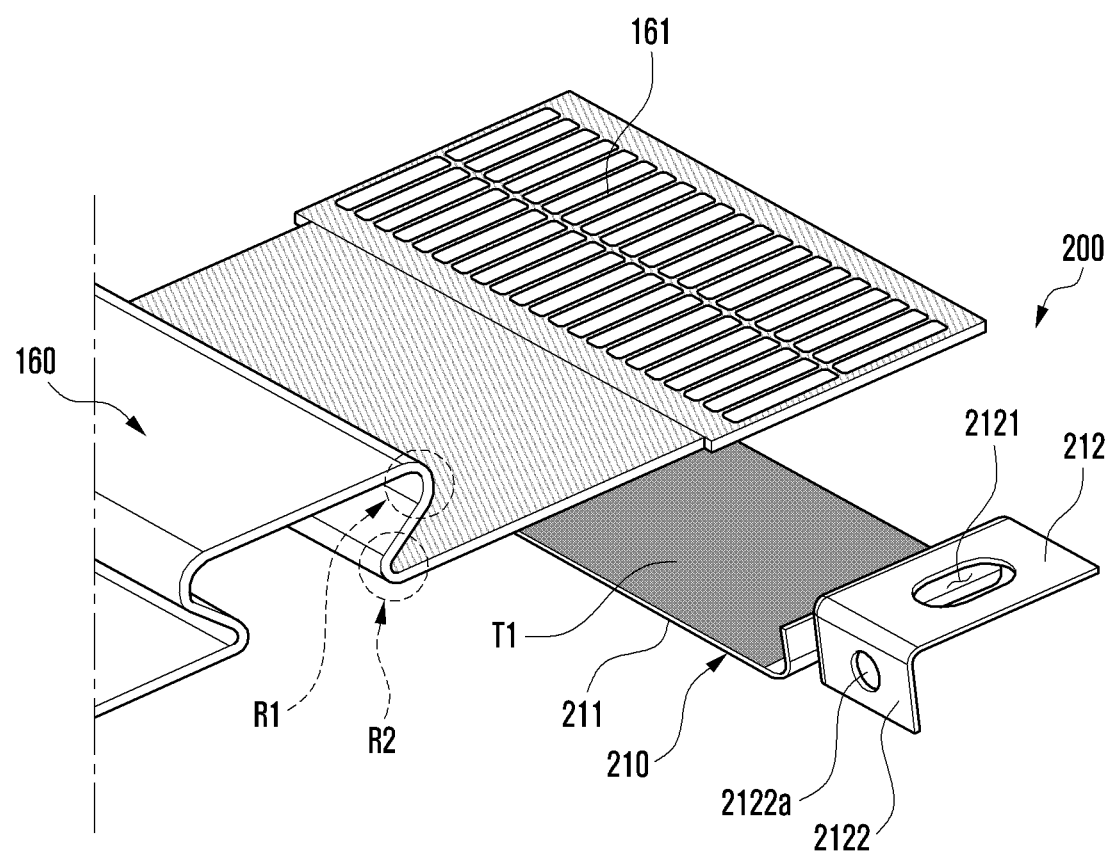
FIG. 8C is a perspective view illustrating a state in which a terminal portion of the flexible printed circuit board is fixed to the slide bracket according to various embodiments of the present disclosure.
Figure 8D:
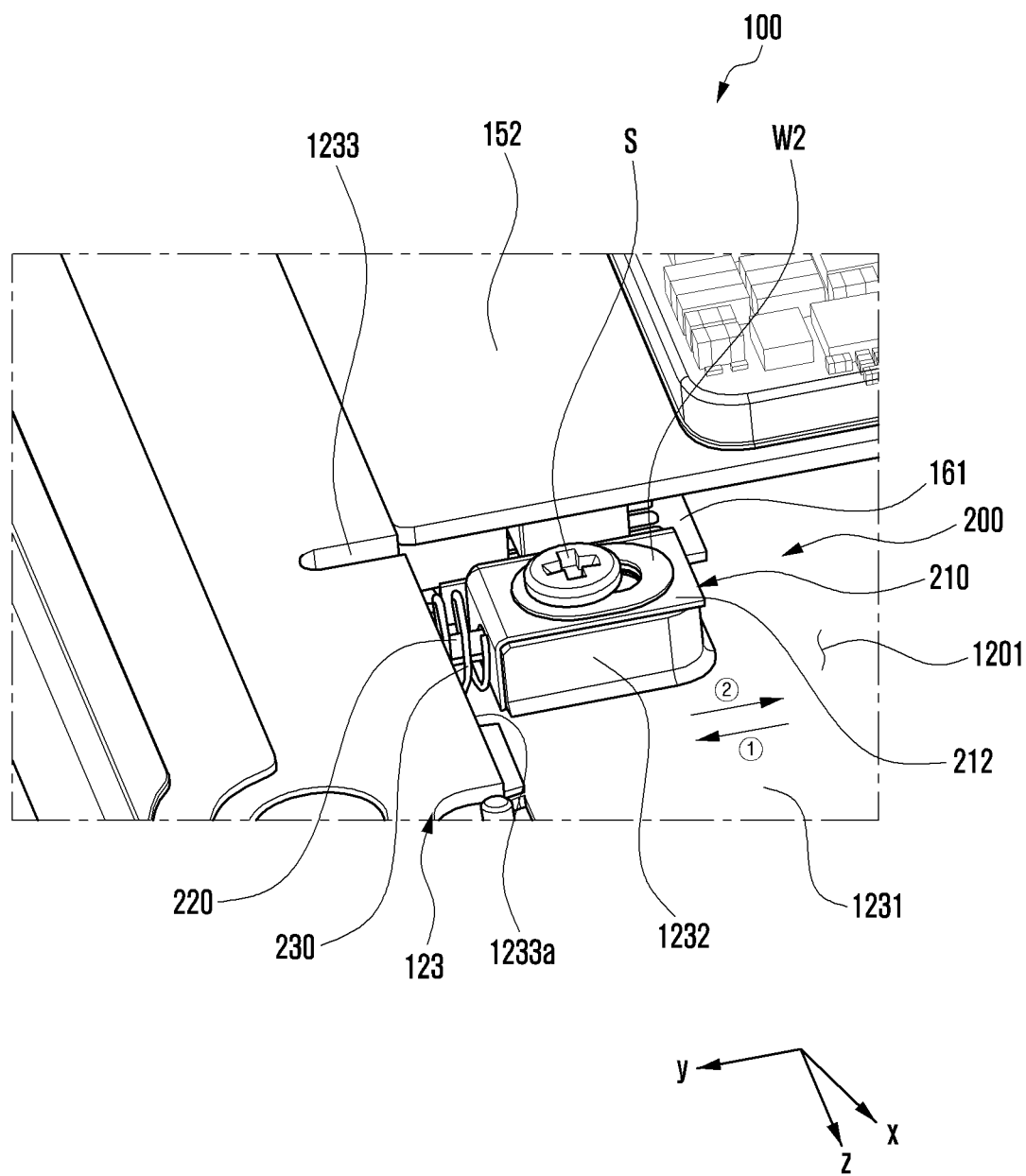
FIG. 8D is an enlarged perspective view illustrating a state in which the slide bracket is coupled with a second housing according to various embodiments of the present disclosure.

FIG. 8A is a partial exploded perspective view illustrating the electronic device including the slide structure according to various embodiments of the present disclosure. FIG. 8B is a perspective view illustrating the slide bracket according to various embodiments of the present disclosure. FIG. 8C is a perspective view illustrating a state in which the terminal portion of the flexible printed circuit board is fixed to the slide bracket according to various embodiments of the present disclosure. FIG. 8D is a perspective view illustrating a state in which the slide bracket is coupled with the second housing according to various embodiments of the present disclosure.

While these drawings illustrate and describe the slide structure 200 (e.g., the slide structure 200 in FIG. 3) coupled to the flexible printed circuit board at a second terminal end thereof and operated in the second housing 120, a slide structure coupled to the flexible printed circuit board 160 at a first terminal end thereof and operated in the first housing 110 (e.g., the slide structure 200-1 in FIG. 3) may have substantially the same constitution. In some embodiments, any one of the two slide structures 200 and 200-1 may be omitted.

With reference to FIGS. 8A to 8D, the electronic device 100 may include the first housing 110, the second housing 120 foldably connected to the first housing 110 by means of the hinge device (e.g., the hinge device 140 in FIG. 1B), and the first display 130 disposed to be supported by the first housing 110 and the second housing 120. In an embodiment, the electronic device 100 may include the first printed circuit board (e.g., the first printed circuit board 151 in FIG. 3) disposed in the first space (e.g., the first space 1101 in FIG. 3) of the first housing (e.g., the first housing 110 in FIG. 3) and the second printed circuit board 152 disposed in the second space 1201 of the second housing 120. In an embodiment, the electronic device 100 may include the flexible printed circuit board 160 such that one end thereof is electrically connected to the first printed circuit board 151 in the first space 1101 and the other end thereof is electrically connected to the second printed circuit board 152 in the second space 1201, across the hinge device 140.

According to various embodiments, the electronic device 100 may include the slide structure 200 to slidably guide the terminal portion 161 of the flexible printed circuit board 160 in the second space 1201. In an embodiment, the slide structure 200 may include the slide bracket 210 slidably coupled by means of the second support member 1231 in the second space 1201 of the second housing 120. In an embodiment, the slide bracket 210 may include a printed circuit board fixing portion 211 to which the terminal portion 161 of the flexible printed circuit board 160 is attached by means of an adhesive member T1 (e.g., double-sided tape), and first and second extending portions 212 and 213 that extend to define both ends of the printed circuit board fixing portion 211, and include long holes 2121 and 2131, respectively.

In an embodiment, the first and second extending portions 212 and 213 may be respectively coupled to bosses 1232, which protrude into the second space 1201 by the second support member 1231, by means of washer members W1 and W2. In an embodiment, the slide bracket 210 may be slidably disposed in the first direction (the ① direction) or the second direction (the ② direction) by being coupled to the second housing 120 in a manner such that a screw S penetrates the washer members W1 and W2 and the long holes 2121 and 2131 of the first and second extending portions 212 and 213, and is then fastened to the bosses 1232. The long holes 2121 and 2131 may be extended to have a major dimension along the sliding direction (e.g., the ① direction or the ② direction).

According to various embodiments, the electronic device 100 may include a guide pin 220 fixed in a pin fixing groove 1233 formed in a sidewall 1233a which is provided by changing the shape of the second support member 1231 of the second housing 120, and a spring 230 coupled to the guide pin 220 in a manner through which the guide pin 220 penetrates. In an embodiment, the spring 230 is disposed so that one end thereof is supported by the sidewall 1233a and the other end thereof is supported by the spring support portions 2122 and 2132 each extending from the first and second extending portions 212 and 213, thereby allowing the slide bracket 210 to remain pressurized or biased in the second direction (the ② direction) at all times. Accordingly, the slide bracket 210, together with the terminal portion 161 of the flexible printed circuit board 160 which is fixed to the printed circuit board fixing portion 211, may move together in the second direction (the ② direction) while being pressurized or biased by the spring 230, or may move together in the first direction (the ① direction) while compressing the spring. In some embodiments, the pressurization structure of the slide bracket 210 by means of the spring 230 may be omitted. In an embodiment, at least a part of the guide pin 220 is accommodated in the pin fixing groove 1233 in a manner that penetrates a through-holes 2122a, 2132a formed at the spring support portions 2122 and 2132 each.

Figure 9A:
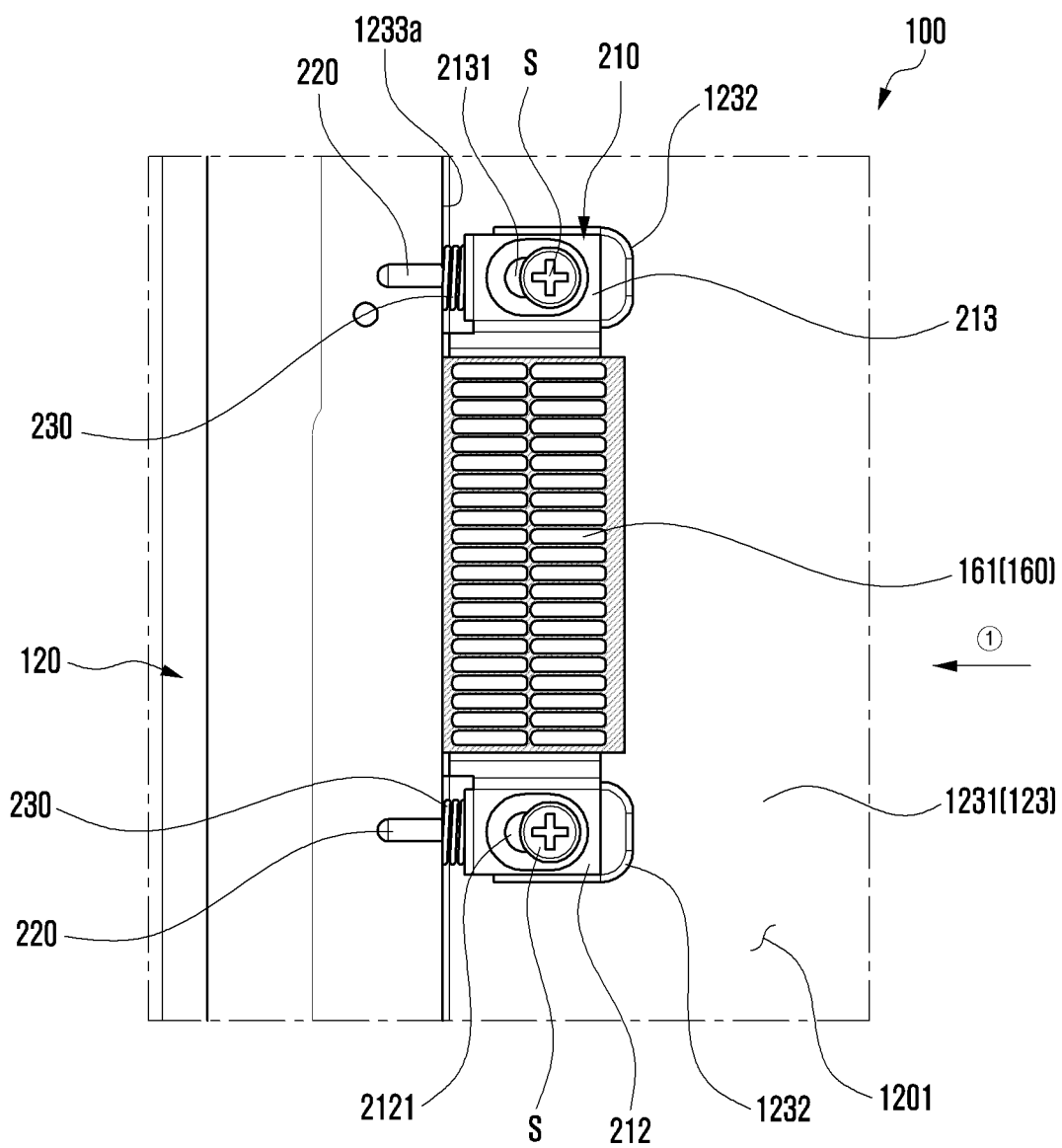
FIGS. 9A and 9B are enlarged views illustrating positions of the flexible printed circuit board when the electronic device, according to various embodiments of the present disclosure, is in the folded state.
Figure 9B:
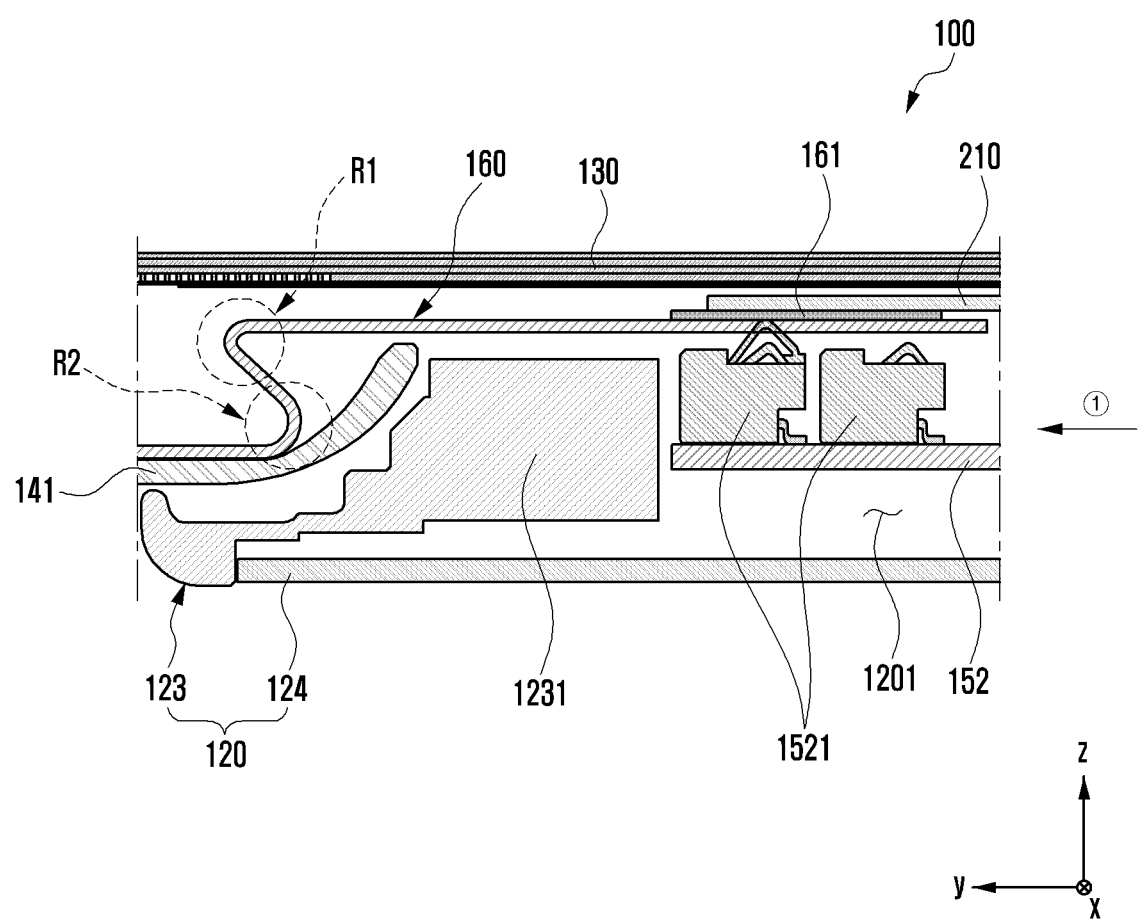

FIGS. 9A and 9B are views illustrating positions of the flexible printed circuit board when the electronic device, according to various embodiments of the present disclosure, is in the folded state. The terminal portion 161 of the flexible printed circuit board 160 may be attached by means of an adhesive member T1 (e.g., double-sided tape), to the printed circuit board fixing portion 211 of the slide bracket 210.

With reference to FIGS. 9A and 9B, in case that the electronic device 100 is in the folded state, the terminal portion 161 of the flexible printed circuit board 160 may have moved in the first direction along with (or together with) the slide bracket 210. In this case, the spring 230 is compressed and pressurizes the slide bracket 210 in the second direction (the ② direction). In an embodiment, the bending portions R1 and R2 of the flexible printed circuit board 160 may be formed such that, when the electronic device 100 is in the folded state, the curvature of the bending portions R1 and R2 is determined or defined. Therefore, in the folded state of the electronic device 100, the bending portions R1 and R2 may remain in a state that is not overstressed.

Figure 10A:
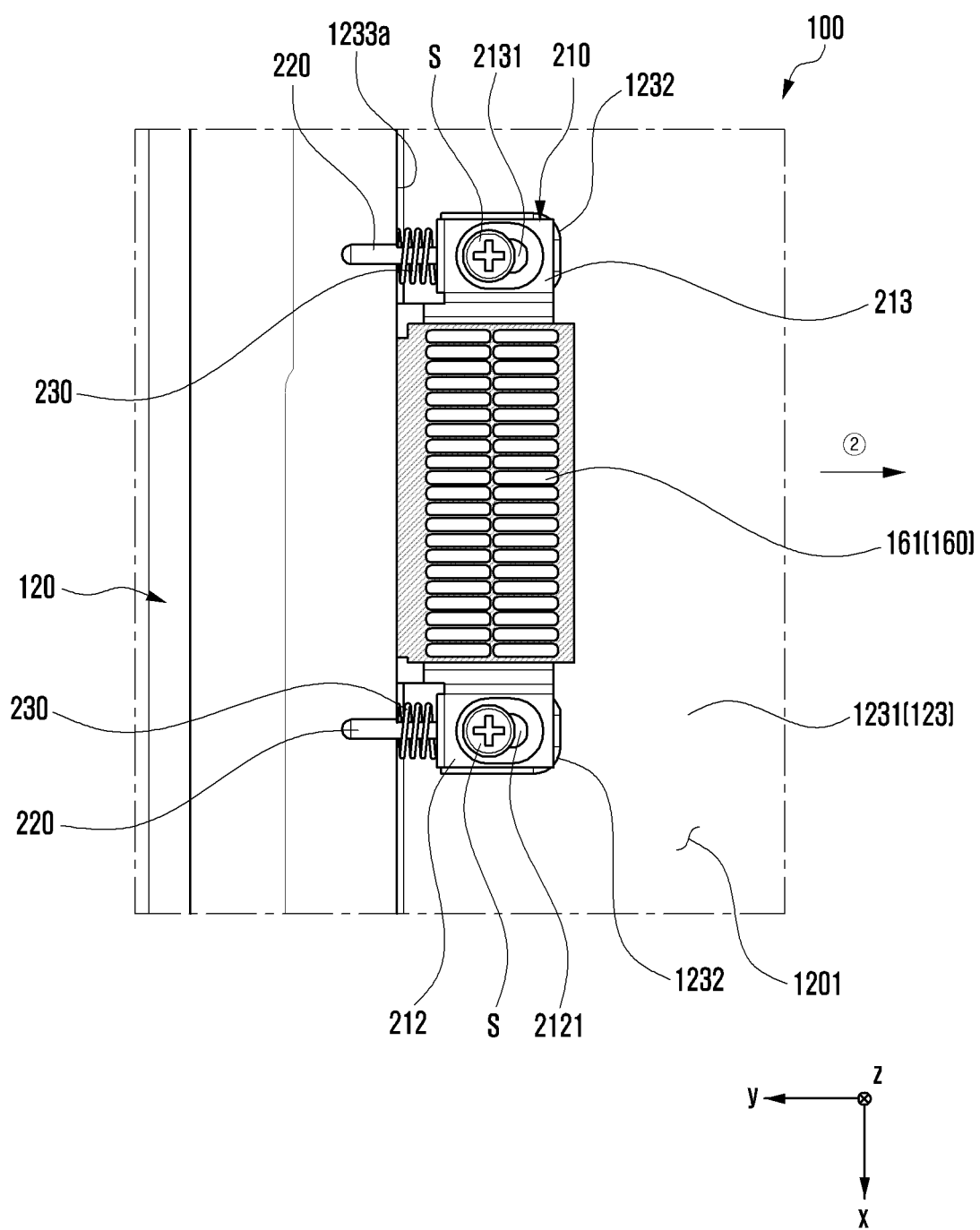
FIGS. 10A and 10B are enlarged views illustrating positions of the flexible printed circuit board when the electronic device, according to various embodiments of the present disclosure, is in the unfolded state.
Figure 10B:
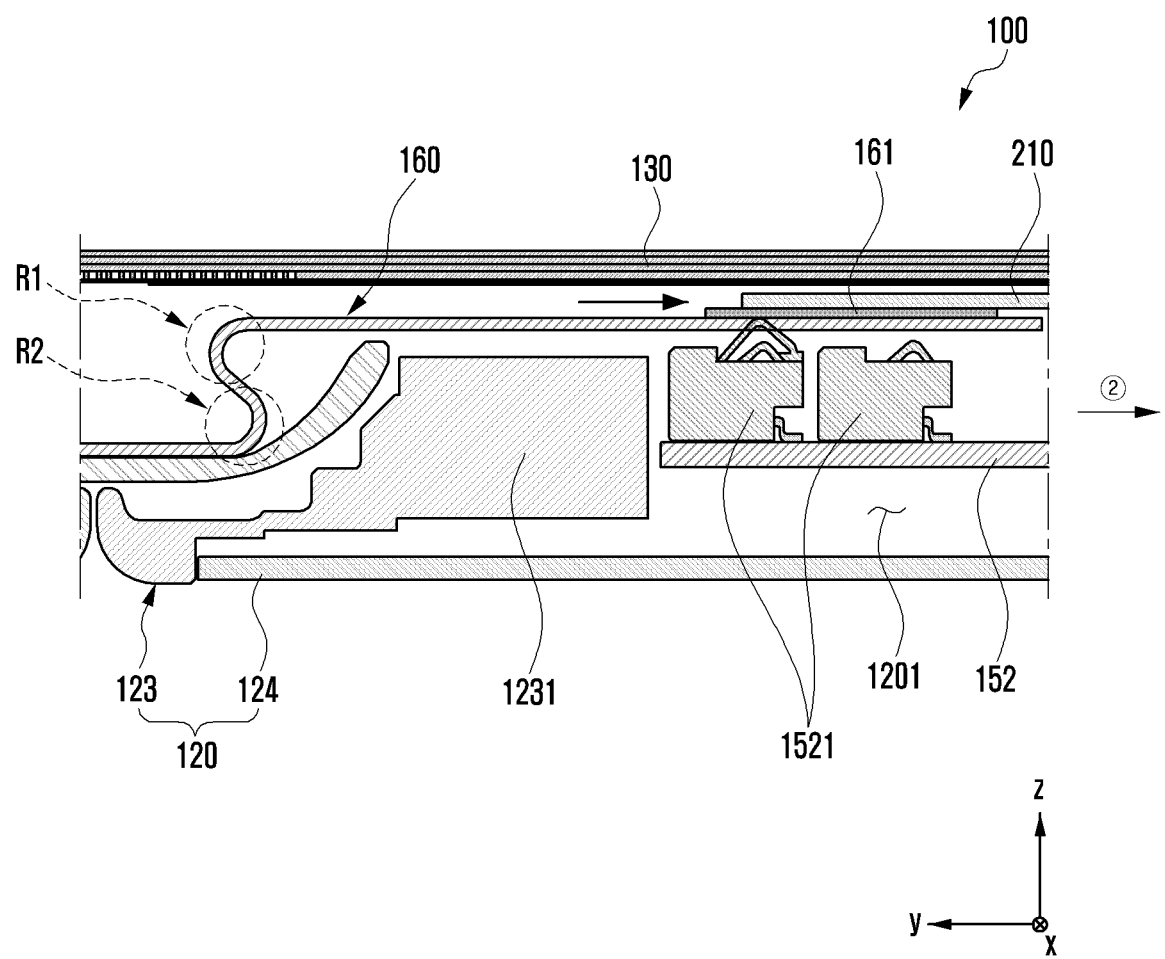

FIGS. 10A and 10B are views illustrating positions of the flexible printed circuit board when the electronic device, according to various embodiments of the present disclosure, is in the unfolded state.

With reference to FIGS. 10A and 10B, in case that the electronic device 100 is transitioned from the folded state (of FIGS. 9A and 9B) to the unfolded state, the bending portions R1 and R2 of the flexible printed circuit board 160 may experience a phenomenon in which the curvature gradually becomes smaller, and stresses are concentrated within a limited accommodation space.

In this case, according to an embodiment of the present disclosure, the terminal portion 161 of the flexible printed circuit board 160 may have moved in the second direction (the ② direction) using the resilience or bias of the spring 230 in the ② direction in conjunction with movement of the slide bracket 210, and the change in curvature of the bending portions R1 and R2 may be reduced, thereby reducing stress concentration. Accordingly, even when the flexible printed circuit board 160 is in the unfolded state of the electronic device 100, the slide structure 200 may help to reduce the likelihood of breakage of the flexible printed circuit board 160 by reducing the stress concentration at the bending portions R1 and R2. In some embodiments, the terminal portion 1610 of the flexible printed circuit board 160 may move with the slide bracket 210 in the second direction (the ②direction) by means of the elastic force and/or resilience of the bending portions R1 and R2, in case that the spring support structure is omitted.

In FIG. 9A, the long holes 2121 and 2131 are disposed at a maximum position in the ① direction together with the spring 230 being compressed, whereas in FIG. 10A, the long holes 2121 and 2131 are disposed at a maximum position in the ② direction together with the spring 230 being uncompressed. In FIG. 9B, a first length of the terminal portion 161 extends further than the connector 1521 in the ② direction, whereas in FIG. 10B, a second length of the terminal portion 161 which is greater than the first length extends further than the connector 1521 in the ② direction (see also FIGS. 7C and 7D).

In FIG. 9B, the inflection points of the bending portions R1 and R2 may be disposed at a first distance along the y-axis direction. The bending portions R1 and R2 in the electronic device 100 which is unfolded (FIGS. 10A and 10B) may respectively have a second curvature less than the first curvature. In FIG. 10B, the inflection points of the bending portions R1 and R2 may be disposed at a second distance along the y-axis direction which is smaller than the first distance.

Figure 11A:
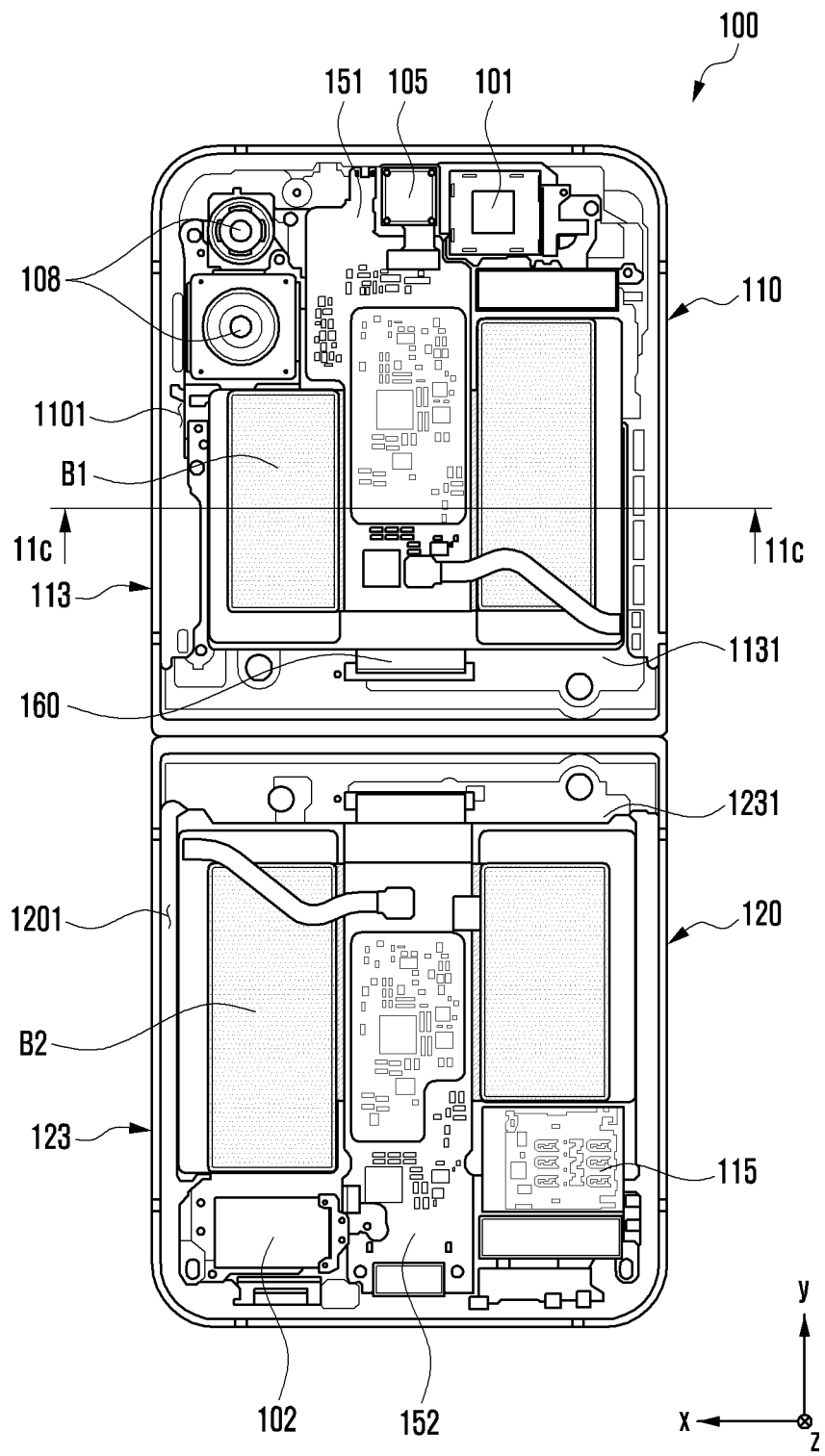
FIG. 11A is a constitutional view of the electronic device according to various embodiments of the present disclosure.
Figure 11B:
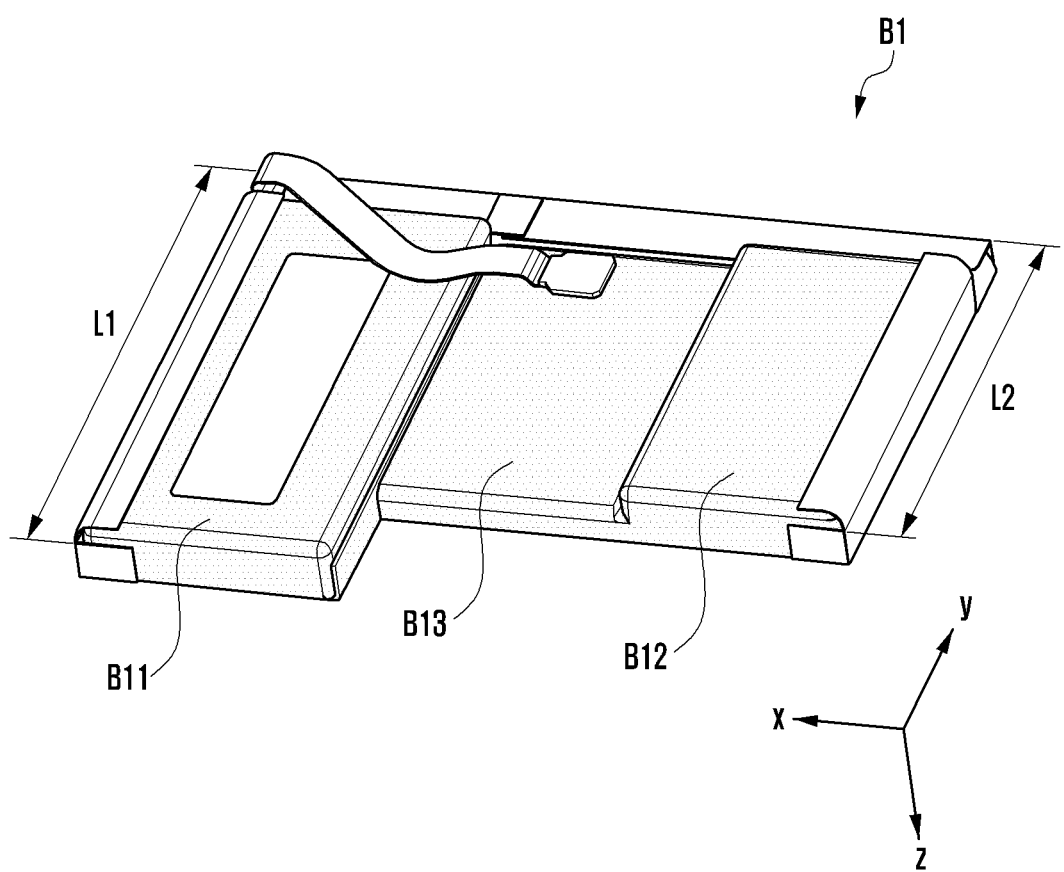
FIG. 11B is a perspective view of a first battery applied to the electronic device of FIG. 11A according to various embodiments of the present disclosure.
Figure 11C:
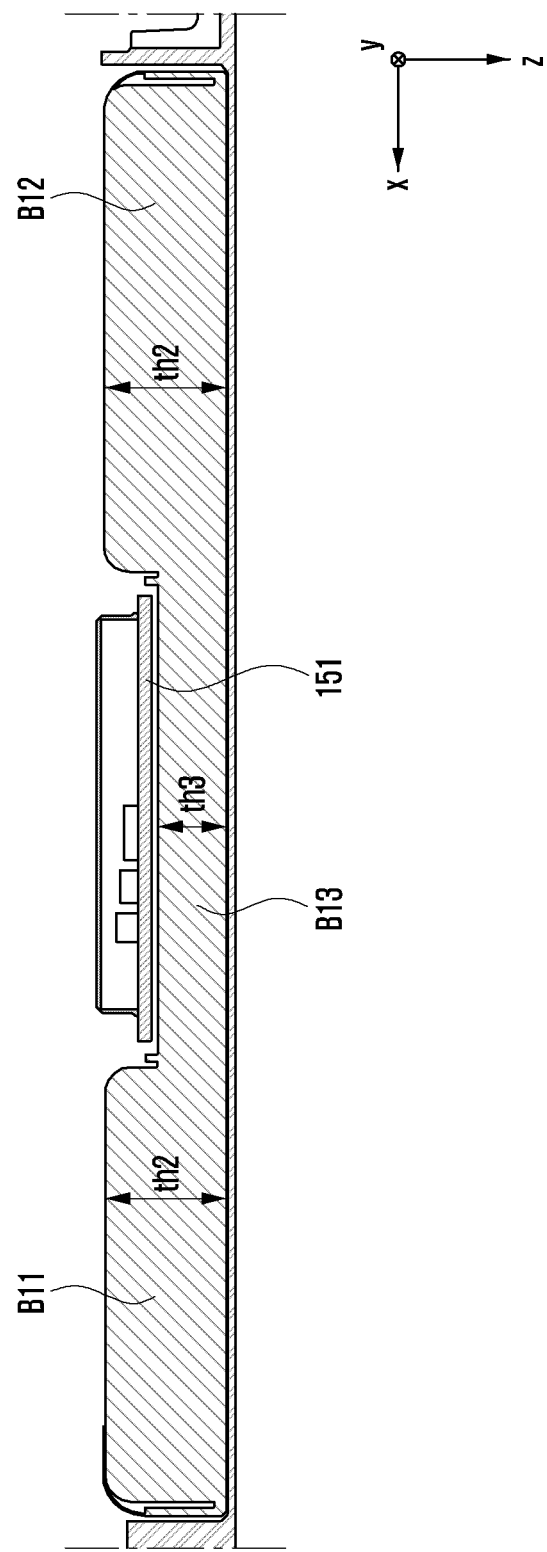
FIG. 11C is a cross-sectional view of the electronic device that is viewed along lines 11c-11c in FIG. 11A according to various embodiments of the present disclosure.

FIG. 11A is a constitutional view of the electronic device according to various embodiments of the present disclosure. FIG. 11B is a perspective view of the first battery applied to the electronic device of FIG. 11A according to various embodiments of the present disclosure. FIG. 11C is a cross-sectional view of the electronic device that is viewed along lines 11c-11c in FIG. 11A according to various embodiments of the present disclosure.

In describing the electronic device 100 of FIG. 11A, the constituent elements that are substantially identical to the electronic device 100 of FIG. 4 are assigned the same reference numerals, and a detailed description thereof may be omitted.

With reference to FIGS. 11A to 11C, the electronic device 100 may include a first housing 110 including the first lateral member 113, a second housing 120 foldably connected with the first housing 110 by means of the hinge device (e.g., the hinge device 140 in FIG. 1B) and including the second lateral member 123, and the first display 130 (e.g., a flexible display) disposed to be supported by the first housing 110 and the second housing 120. In an embodiment, the electronic device 100 may include a first support member 1131 (e.g., a first support plate) extending at least partially from the first lateral member 113 into the first space 1101, and a second support member 1231 (e.g., a second support plate) extending at least partially from the second lateral member 123 into the second space 1201.

According to various embodiments, the electronic device 100 may include the first printed circuit board 151 disposed in the first space 1101 and the first battery B1 at least partially disposed below or beneath the first printed circuit board 151. In an embodiment, the first printed circuit board 151 may be disposed to have a length in the longitudinal direction (e.g., in the y-axis direction) of the first housing 110, and extend from the first housing 110, to be near the hinge device (e.g., the hinge device 140 in FIG. 1B). In an embodiment, the first battery B1 may be disposed to be at least partially overlapped with the first printed circuit board 151 when the flexible display 130 is viewed from above.

According to various embodiments, the first battery B1 may include a first battery portion B11 disposed on one side of the first printed circuit board 151, a second battery portion B12 disposed on the other side (e.g., an opposing side) of the first printed circuit board 151, and a third battery portion B13 that is overlapped with the first printed circuit board 151 and connects the first battery portion B11 and the second battery portion B12 to each other. In an embodiment, the first battery B1 may be formed or provided such that a thicknesses th2 of the first battery portion B11 and the second battery portion B12 are relatively greater than a thickness th3 of the third battery portion B13. In an embodiment, the thickness th3 of the third battery portion B13 is formed relatively thin, and the first printed circuit board 151 is disposed to be overlapped thereon, which may help to slim down the electronic device 100 along the thickness direction (e.g., the z-axis direction). In an embodiment, a thickness of combining the thickness th3 of the third battery portion B13 and the thickness of the first printed circuit board 151 (e.g., a sum or total of the thickness th3 and the thickness of the first printed circuit board 151) may be formed equal to or smaller than the thickness th2 of the first battery portion B11 or the second battery portion B12, thereby helping to slim down the electronic device 100. In some embodiments, the thicknesses of the first battery portion B11 and the second battery portion B12 may be substantially the same. In some embodiments, the thicknesses th2 of the first battery portion B11 and the second battery portion B12 may be different from each other, in the range of being greater than the thickness of the total of the thickness th3 of the third battery portion B13 and the thickness of the first printed circuit board 151. In an embodiment, the first battery portion B11, the second battery portion B12, or the third battery portion B13 may have different sizes in the planar direction (e.g., along the plane defined by the x-axis direction and the y-axis direction which cross each other, depending on the layout design of the surrounding electronic components.

According to various embodiments, the electronic device 100 may include the second printed circuit board 152 disposed in the second space 1201 and the second battery B2 at least partially disposed below or beneath the second printed circuit board 152. In an embodiment, the second printed circuit board 152 may be disposed to have a length in the longitudinal direction (e.g., in the y-axis direction) of the second housing 120, and extend from the second housing 120, to be near the hinge device (e.g., the hinge device 140 in FIG. 1B). In an embodiment, the second battery B2 may be disposed to be at least partially overlapped with the second printed circuit board 152 when the flexible display 130 is viewed from above. In an embodiment, a layout structure of the second battery B2 and the second printed circuit board 152 may be substantially the same as a layout structure of the first battery B1 and the first printed circuit board 151. In an embodiment, the batteries B1 and B2 may ensure capacity within the limited space of the electronic device 100 by means of an efficient layout design that takes into account the surrounding electronic components. In some embodiments, the layout structure of the first battery B1 and the first printed circuit board 151 or the layout structure of the second battery B2 and the second printed circuit board 152 may be replaced with the layout structure of the batteries B1, B2, B3, and B4 and the printed circuit boards 151 and 152 in FIG. 4.

Figure 12A:
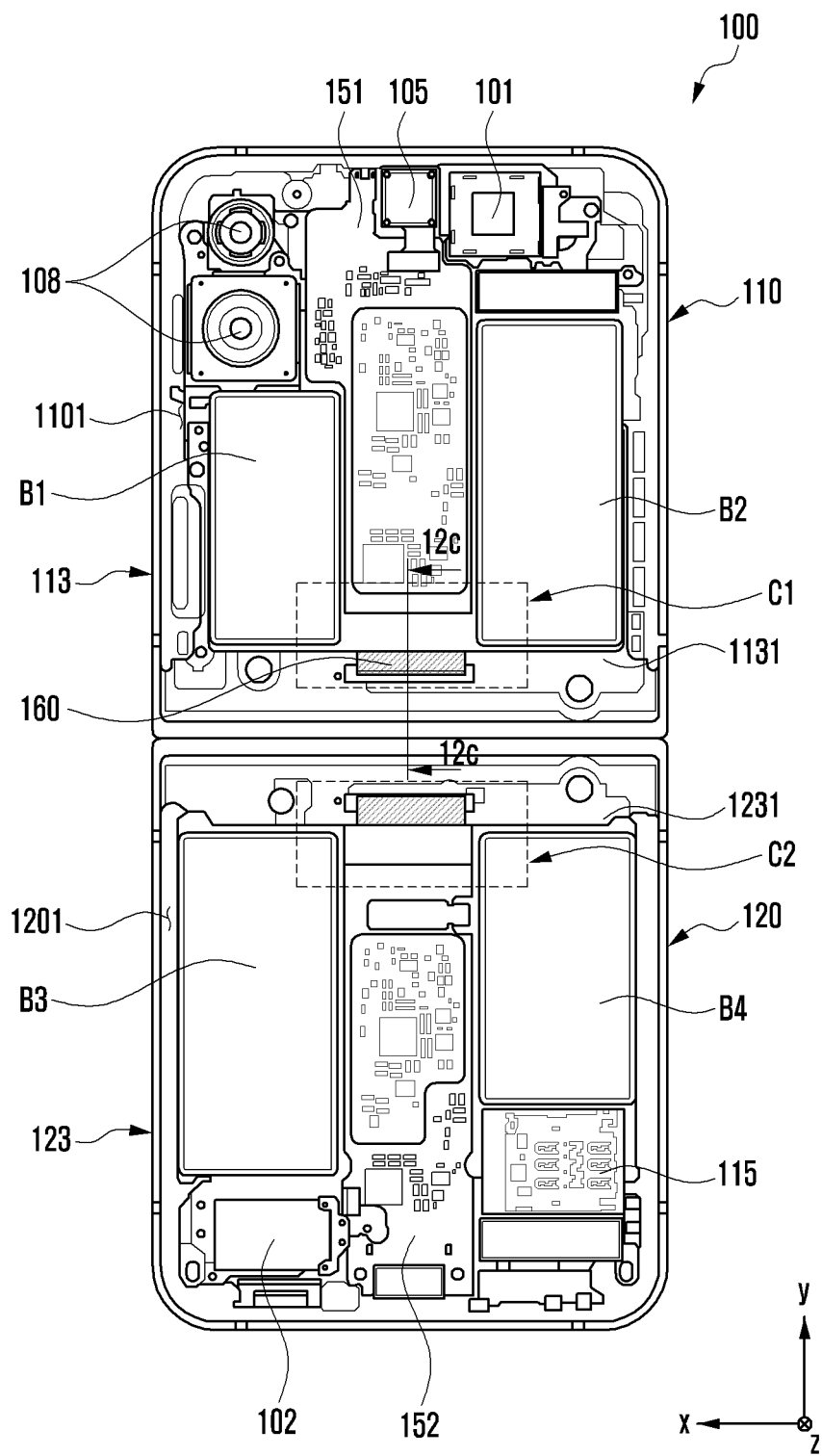
FIG. 12A is a plan view of the electronic device according to various embodiments of the present disclosure.

FIG. 12A is a constitutional view of the electronic device according to various embodiments of the present disclosure.

In describing the electronic device 100 of FIG. 12A, the constituent elements that are substantially identical to the electronic device 100 of FIG. 4 are assigned the same reference numerals, and a detailed description thereof may be omitted.

With reference to FIG. 12A, the electronic device 100 may include a first housing 110 including the first lateral member 113, a second housing 120 foldably connected with the first housing 110 by means of the hinge device (e.g., the hinge device 140 in FIG. 1B) and including the second lateral member 123, and the first display 130 (e.g., a flexible display) disposed to be supported by the first housing 110 and the second housing 120. In an embodiment, the electronic device 100 may include a first support member 1131 extending at least partially from the first lateral member 113 into the first space 1101, and a second support member 1231 extending at least partially from the second lateral member 123 into the second space 1201.

According to various embodiments, the electronic device 100 may include the first printed circuit board 151 disposed in the first space 1101, and the first battery B1 and the second battery B2 disposed side by side with the first printed circuit board 151 interposed therebetween. In an embodiment, the electronic device 100 may include the second printed circuit board 152 disposed in the second space 1201, and the third battery B3 and the fourth battery B4 disposed side by side with the second printed circuit board 152 interposed therebetween.

According to various embodiments, the electronic device 100 may include the flexible printed circuit board 160 that is electrically connected from the first printed circuit board 151 to the second printed circuit board 152 across the hinge device (e.g., the hinge device 140 in FIG. 1B). In an embodiment, the electronic device 100 may include a first fixing structure C1 that supports an electrical connection between the flexible printed circuit board 160 and the first printed circuit board 151 and a second fixing structure C2 that supports an electrical connection between the flexible printed circuit board 160 and the second printed circuit board 152. In an embodiment, the first fixing structure C1 and the second fixing structure C2 may help to improve the operational reliability of the electronic device 100 by supporting electrical connections between the flexible printed circuit board 160, which flows with the frequent folding motion of the electronic device 100, and the first and second printed circuit boards 151 and 152. In an embodiment, the first fixing structure C1 and the second fixing structure C2 may be substantially identical. In some embodiments, the first fixing structure C1 and the second fixing structure C2 may be different.

Figure 12B:
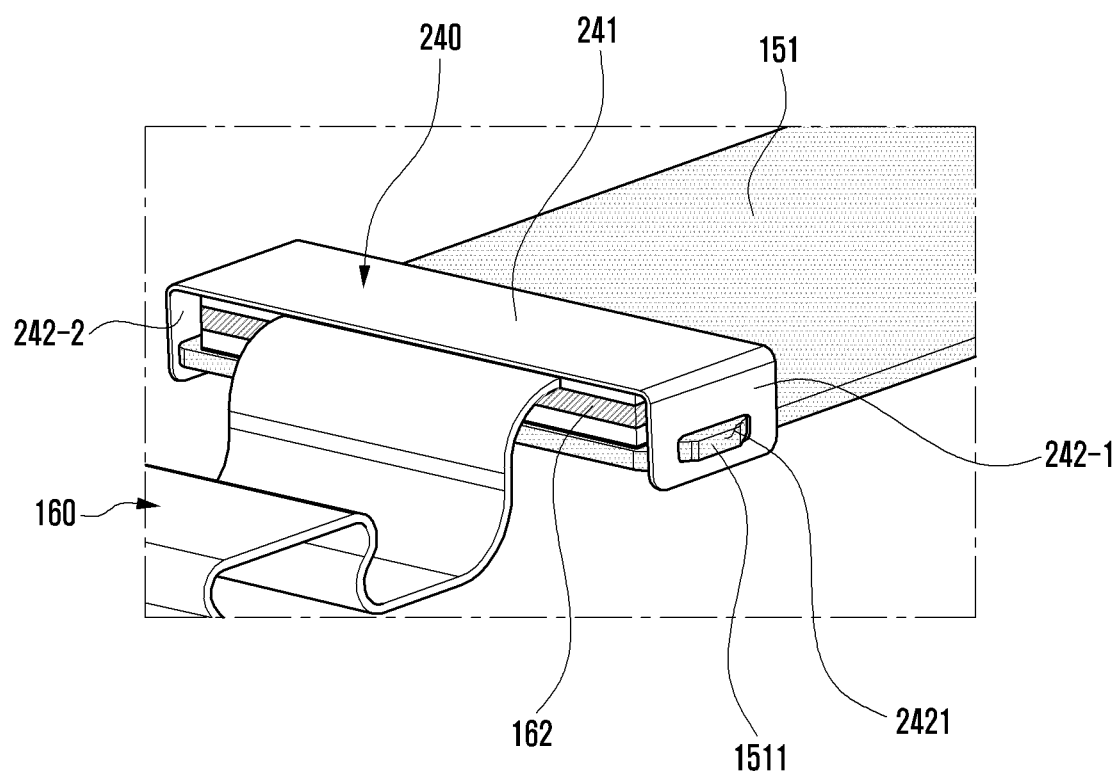
FIG. 12B is an enlarged perspective view illustrating a state in which the flexible printed circuit board is fixed to the printed circuit board by means of a fixing bracket according to various embodiments of the present disclosure.
Figure 12C:
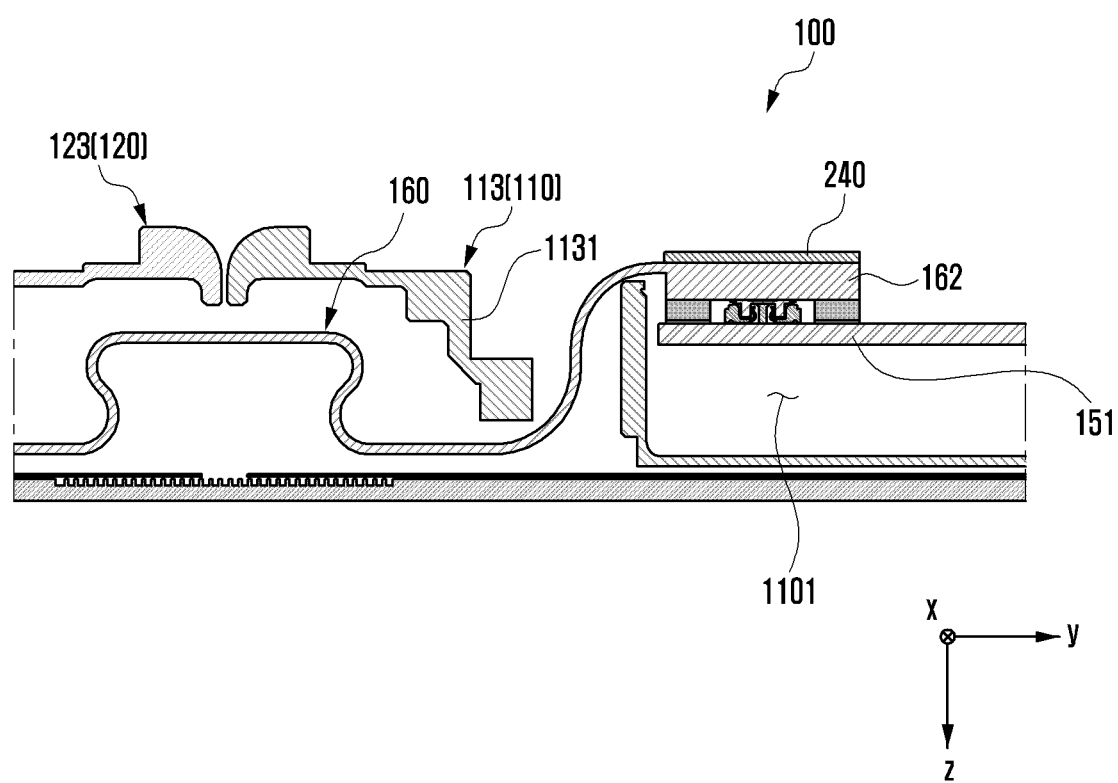
FIG. 12C is a partial cross-sectional view illustrating the electronic device that is viewed along lines 12c-12c in FIG. 12A according to various embodiments of the present disclosure.

FIG. 12B is a perspective view illustrating a state in which the flexible printed circuit board is fixed to the printed circuit board by means of a fixing bracket according to various embodiments of the present disclosure. FIG. 12C is a partial cross-sectional view illustrating the electronic device that is viewed along lines 12c-12c in FIG. 12A according to various embodiments of the present disclosure.

With reference to FIGS. 12B and 12C, the flexible printed circuit board 160 may be electrically connected to the first printed circuit board 151 by means of a terminal portion 162. FIG. 12B shows the terminal portion 162 as a multi-layer structure between the support portion 241 and the first printed circuit board 151. In an embodiment, the electronic device 100 may include a fixing bracket 240 disposed on top of the terminal portion 162 and fixed to both sides of the first printed circuit board 151 as the first fixing structure C1 in FIG. 12A. In an embodiment, the fixing bracket 240 may include a support portion 241 that supports the terminal portion 162 of the flexible printed circuit board 160, and a pair of extending portions 242-1 and 242-2 that are respectively bent from the opposing ends of the support portion 241 and in a direction toward the first printed circuit board 151. Each of the extending portions 242-1 and 242-2 may include a catching groove 2421.

In an embodiment, the first printed circuit board 151 may include, on both sides thereof, catching protrusions 1511 that engage with the catching grooves 2421 and protrude at positions corresponding to the catching grooves 2421 by engagement with the catching grooves 2421. Therefore, electrical connection of the flexible printed circuit board 160 to the first printed circuit board 151 may benefit from a tight fit of the catching protrusions 1511 of the first printed circuit board 151 in the catching grooves 2421 of the fixing bracket 240 to maintain a firm electrical connection with the first printed circuit board 151. In addition, the fixing bracket 240 may be constituted to have a width similar to a width of the first printed circuit board 151, which may assist in expanding the size of the first and second batteries B1 and B2.

In some embodiments, the second fixing structure C2 in FIG. 12A may be constituted substantially identical to the first fixing structure C1 in FIG. 12B. In some embodiments, the catching protrusion 1511 may be formed in a structure, such as a housing of the electronic device 100 adjacent to the first printed circuit board 151 (e.g., the first housing 110 and/or the second housing 120) or a bracket disposed therein, rather than in the first printed circuit board 151.

Figure 13:
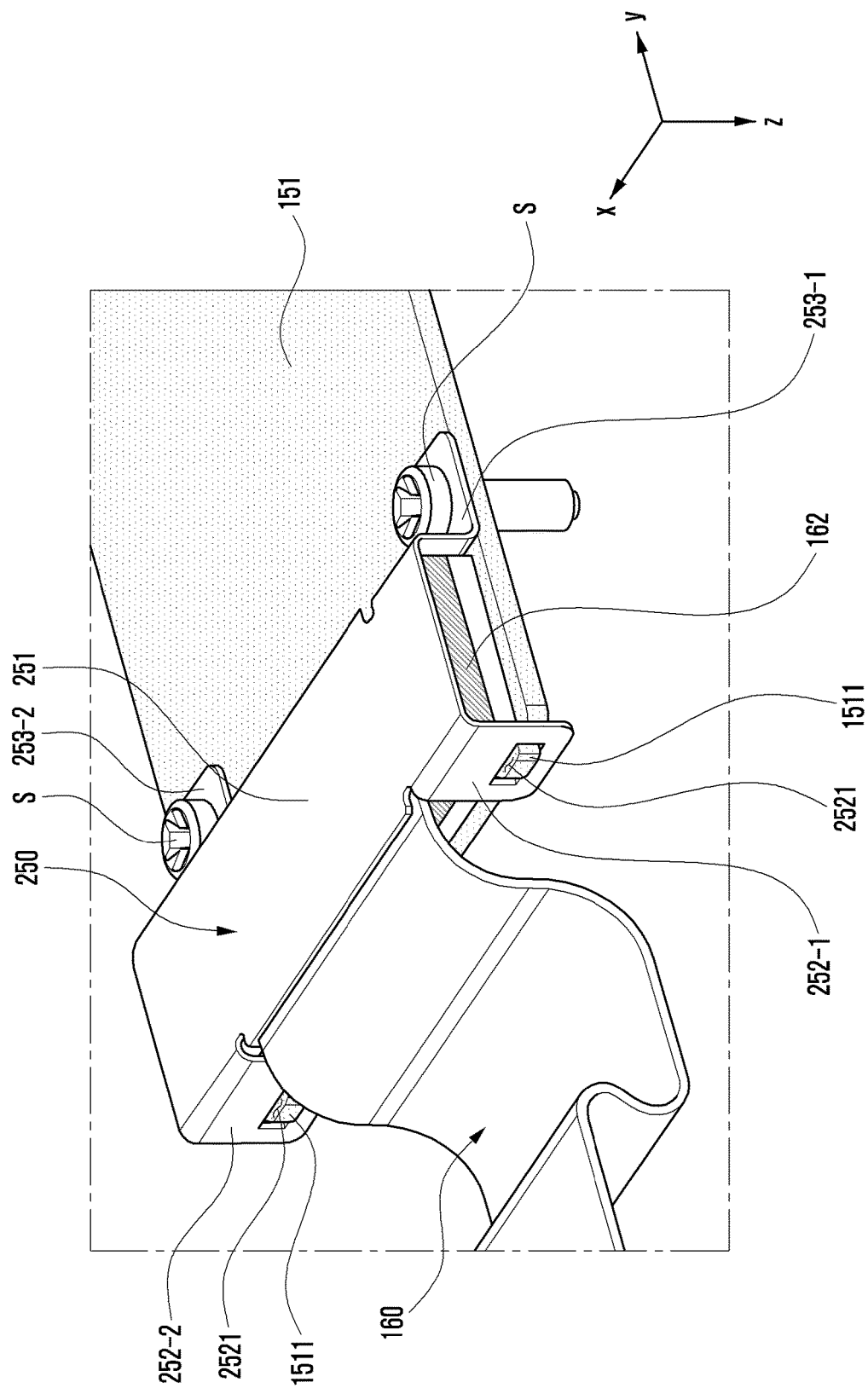
FIG. 13 is an enlarged perspective view illustrating a state in which the flexible printed circuit board is fixed to the printed circuit board by means of the fixing bracket according to various embodiments of the present disclosure.

FIG. 13 is a perspective view illustrating a state in which the flexible printed circuit board is fixed to the printed circuit board by means of the fixing bracket according to various embodiments of the present disclosure.

With reference to FIG. 13, the flexible printed circuit board 160 may be electrically connected to the first printed circuit board 151 by means of a terminal portion 162. In an embodiment, the electronic device 100 may include a fixing bracket 250 disposed on top of the terminal portion 162 and fixed to both sides of the first printed circuit board 151 as the first fixing structure C1 in FIG. 12A. In an embodiment, the fixing bracket 250 may include a support member 251 that supports the terminal portion 162 of the flexible printed circuit board 160, a pair of first extending portions 252-1 and 252-2 that are bent in a direction toward the first printed circuit board 151 from opposing ends of the support member 251 and define catching grooves 2521, and a pair of second extending portions 253-1 and 253-2 extending in a direction opposite to the pair of the first extending portions 252-1 and 252-2 from opposing ends of the support member 251.

In an embodiment, the first printed circuit board 151 may include or define, at opposing sides thereof, catching protrusions 1511 that protrude at positions corresponding to the catching grooves 2521. Therefore, electrical connection of the flexible printed circuit board 160 to the first printed circuit board 151 may benefit from a tight engagement of the catching protrusions 1511 of the first printed circuit board 151 in the catching grooves 2521 of the fixing bracket 250, together with the second extending portions 253-1 and 253-2 being fixed to the first printed circuit board 151 by fastening a screw S, thereby maintaining a firm electrical connection with the first printed circuit board 151. In some embodiments, the second fixing structure C2 in FIG. 12A may be constituted substantially identical to the first fixing structure C1 in FIG. 13.

Figure 14A:
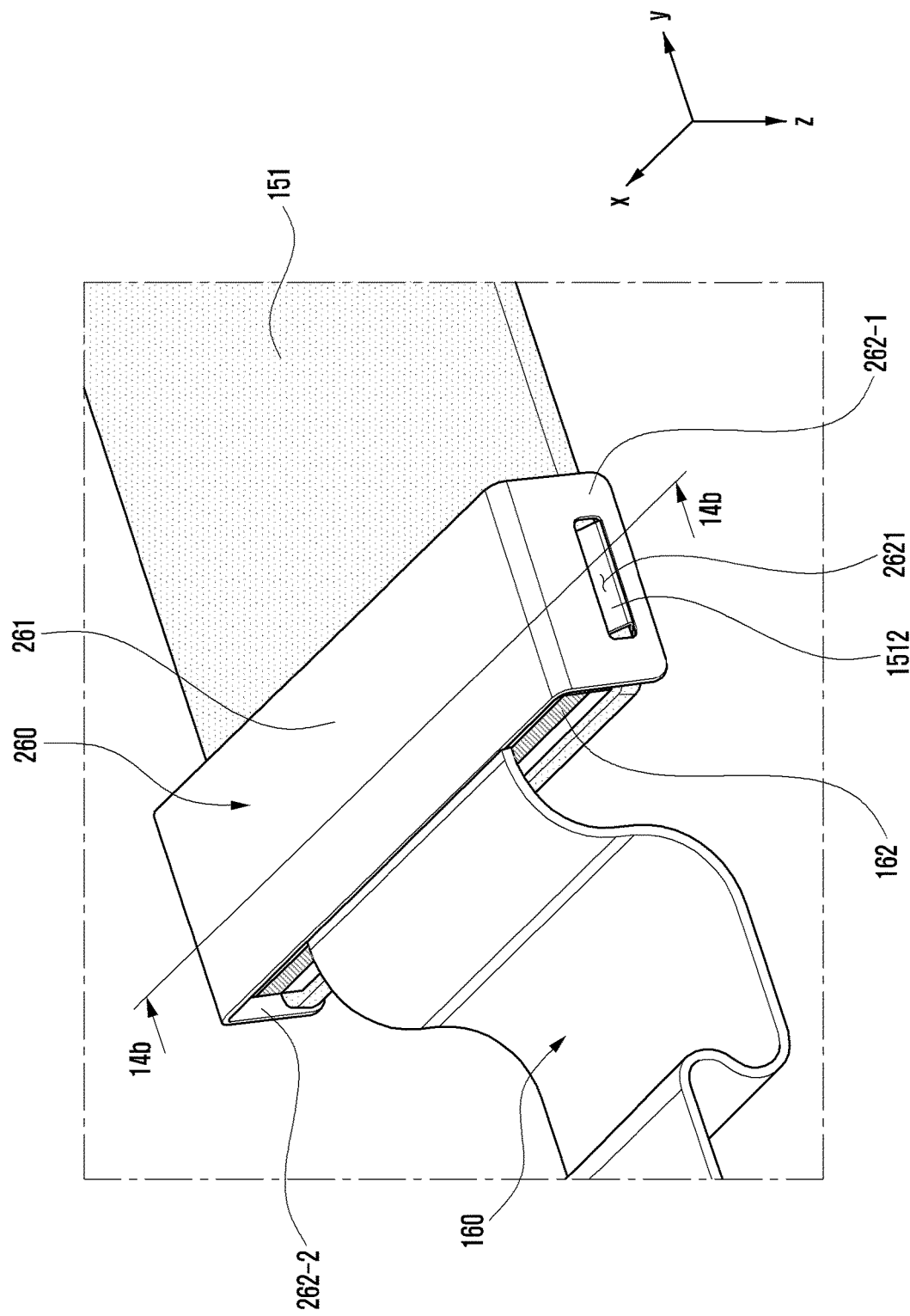
FIG. 14A is an enlarged perspective view illustrating a state in which the flexible printed circuit board is fixed to the printed circuit board by means of a fixing bracket according to various embodiments of the present disclosure.
Figure 14B:
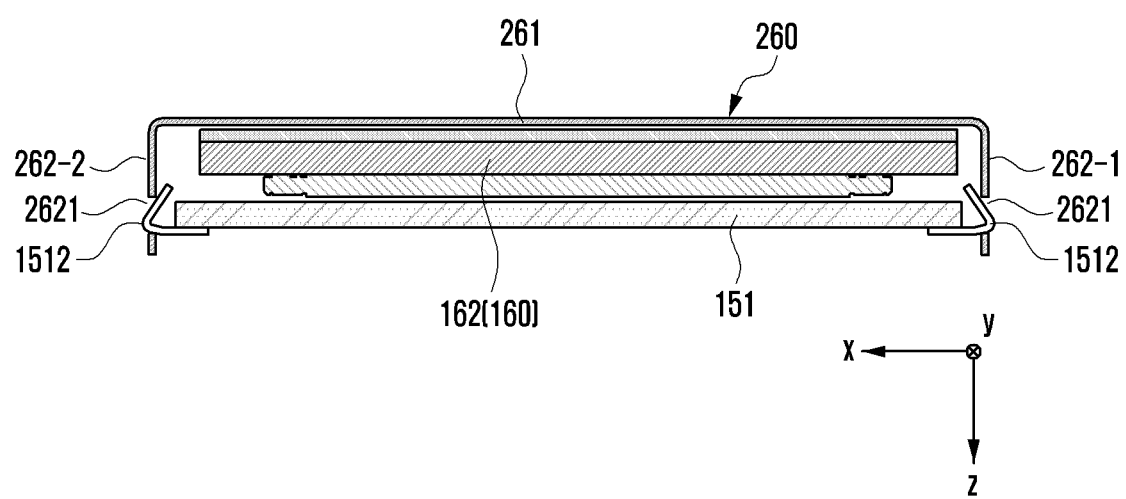
FIG. 14B is an enlarged partial cross-sectional view along lines 14b-14b in FIG. 14A according to various embodiments of the present disclosure.

FIG. 14A is a perspective view illustrating a state in which the flexible printed circuit board is fixed to the printed circuit board by means of the fixing bracket according to various embodiments of the present disclosure. FIG. 14B is a partial cross-sectional view along lines 14b-14b in FIG. 14A according to various embodiments of the present disclosure.

With reference to FIGS. 14A and 14B, the flexible printed circuit board 160 may be electrically connected to the first printed circuit board 151 by means of the terminal portion 162. In an embodiment, the electronic device 100 may include a fixing bracket 260 disposed on top of the terminal portion 162 and fixed to both sides of the first printed circuit board 151 as the first fixing structure C1 in FIG. 12A. In an embodiment, the fixing bracket 260 may include a support portion 261 that supports the terminal portion 162 of the flexible printed circuit board 160 and a pair of extending portions 262-1 and 262-2 that are bent in a direction toward the first printed circuit board 151 from opposing ends of the support portion 261 and includes or defines a catching groove 2621.

In an embodiment, the first printed circuit board 151 may include, at opposing sides thereof, catching pieces 1512 that are disposed at positions corresponding to the catching grooves 2521. In an embodiment, the catching pieces 1512 may be elastic pieces fixed to both sides of the first printed circuit board 151 by means of soldering or structural coupling. Therefore, electrical connection of the flexible printed circuit board 160 to the first printed circuit board 151 may benefit from a tight engagement of the catching pieces 1512 of the first printed circuit board 151 with the catching grooves 2621 of the fixing bracket 260 to maintain a firm electrical connection with the first printed circuit board 151.

The first fixing structure C1 and/or the second fixing structure C2 in FIG. 12A according to embodiments of the present disclosure, may utilize at least one of the fixing brackets 240 in FIG. 12B, the fixing bracket 250 in FIG. 13, or the fixing bracket 260 in FIG. 14A, or may be used in combination.

Figure 15:
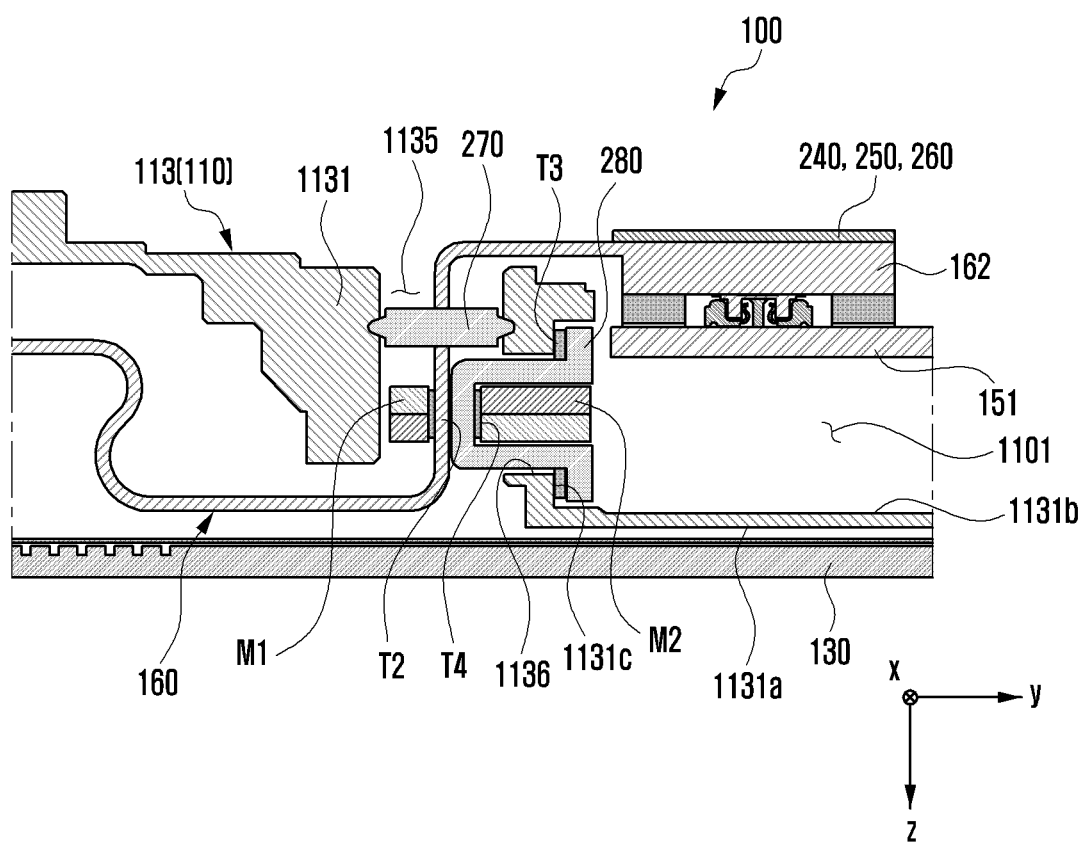
FIG. 15 is an enlarged partial cross-sectional view illustrating the electronic device according to various embodiments of the present disclosure.

FIG. 15 is a partial cross-sectional view illustrating the electronic device according to various embodiments of the present disclosure.

Figure 16A:
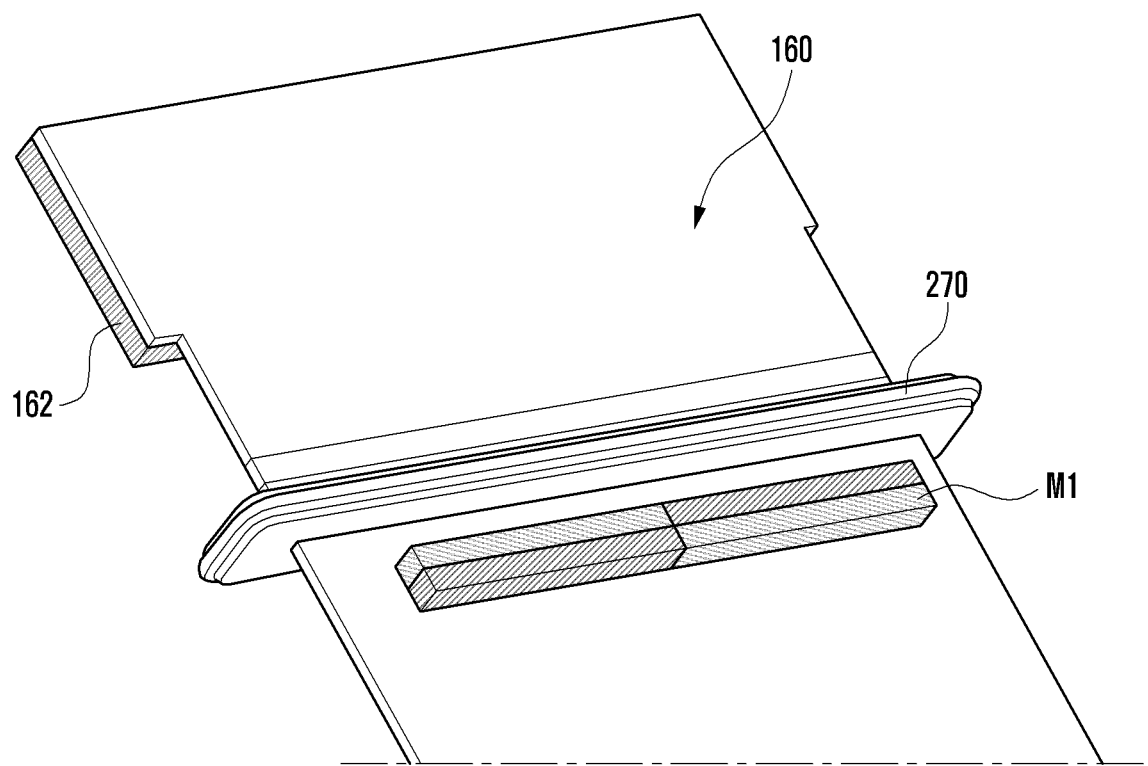
FIGS. 16A and 16B are enlarged views illustrating the flexible printed circuit board to which a first magnet is attached according to various embodiments of the present disclosure.
Figure 16B:
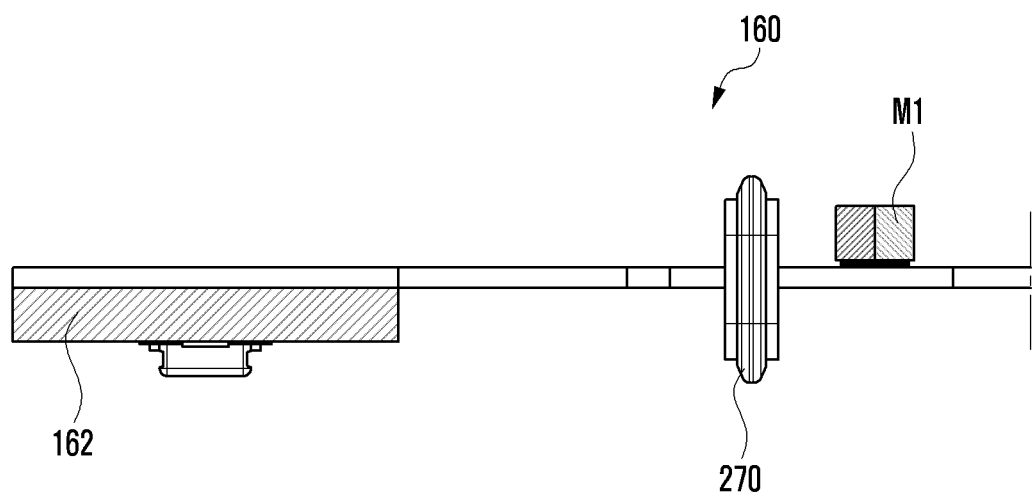
Figure 16C:
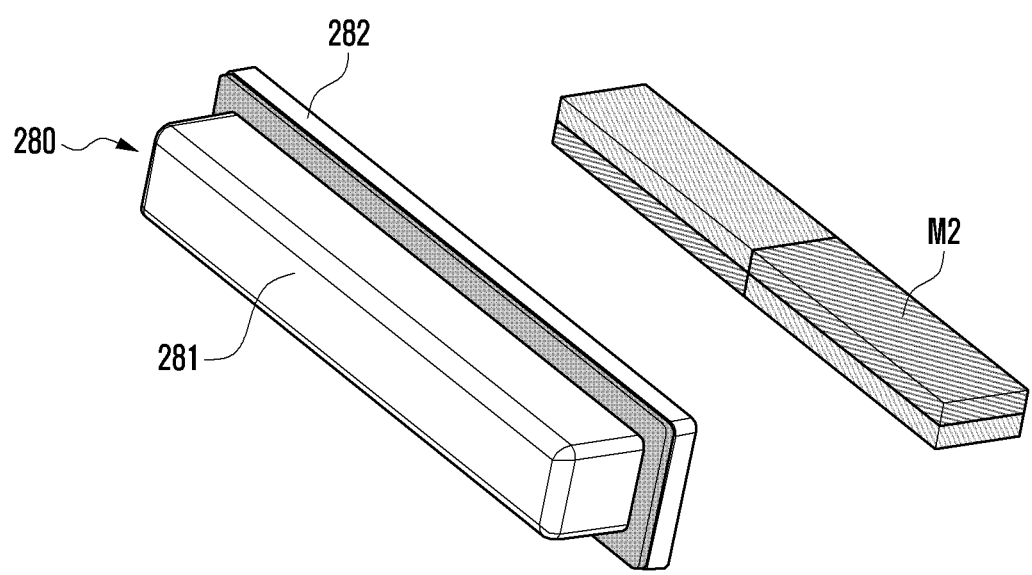
FIGS. 16C and 16D are enlarged views illustrating a magnetic bracket to which a second magnet is attached according to various embodiments of the present disclosure.
Figure 16D:
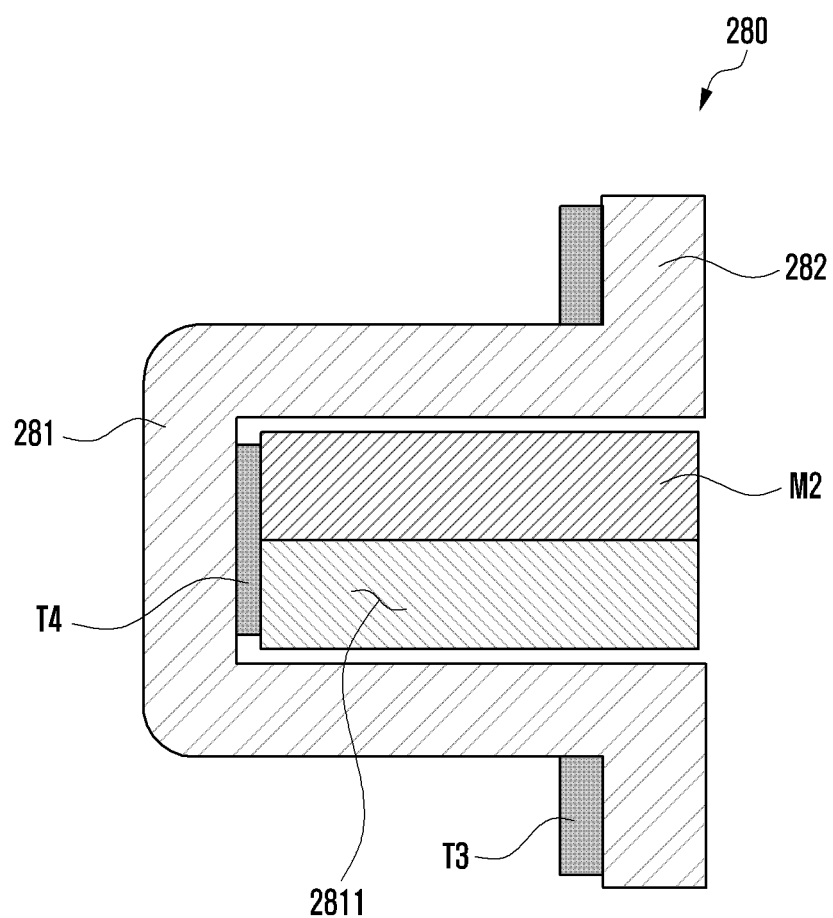

FIGS. 16A and 16B are views illustrating the flexible printed circuit board to which a first magnet is attached according to various embodiments of the present disclosure. FIGS. 16C and 16D are views illustrating a magnetic bracket to which a second magnet is attached according to various embodiments of the present disclosure.

With reference to FIGS. 15 to 16D, the electronic device 100 may include the first housing 110 including the first lateral member 113, the second housing (e.g., the second housing 120 in FIG. 3) that is foldably connected with the first housing 110 by means of the hinge device (e.g., the hinge device 140 in FIG. 1B) and includes the second lateral member (e.g., the second lateral member 123 in FIG. 3), and the first display 130 (e.g., a flexible display) disposed to be supported by the first housing 110 and the second housing 120. In an embodiment, the electronic device 100 may include the first support member 1131 extending at least partially from the first lateral member 113 into the first space 1101, and the second support member (the second support member 1231 in FIG. 3) extending at least partially from the second lateral member 123 into the second space 1201.

According to various embodiments, the electronic device 100 may include the first printed circuit board 151 disposed in the first space 1101 and the second printed circuit board 152 disposed in the second space 1201. In an embodiment, the electronic device 100 may include the flexible printed circuit board 160 electrically connected to the first printed circuit board 151 and to the second printed circuit board 152 and extending therebetween to be disposed across the hinge device 140.

In an embodiment, the electronic device 100 may include the waterproof member 270 disposed in a receiving path of the first housing 110 in which the flexible printed circuit board 160 is accommodated, as the flexible printed circuit board 160 is accommodated into the first space 1101 from the outside of the housing by means of the hinge device 140 and is electrically connected to the first printed circuit board 151 by means of the terminal portion 162. In an embodiment, the waterproof member 270 may be fixed to surround at least a portion of the flexible printed circuit board 160. In an embodiment, the flexible printed circuit board 160 is accommodated in the first space 1101 in a manner that penetrates a through-hole 1135 formed from a first surface 1131$a$ (e.g., a front surface supporting the first display 130) to a second surface 1131$b$ (e.g., a rear surface opposite the front surface) of the first support member 1131, and the waterproof member 270 seals the through-hole 1135, such that a waterproof structure may be implemented. In an embodiment, the waterproof member 270 may include at least one of silicone, urethane, rubber, or a cure in place gasket (CIPG) having an elasticity capable of fitting tightly into the through-hole 1135.

According to various embodiments, the waterproof member 270 may fail to maintain a tight fit with the through-hole 1135 due to a motion of the flexible printed circuit board 160 within the through-hole 1135 caused by the frequent folding motion of the electronic device 100, and the waterproof function may be degraded. To solve these problems, the electronic device 100 may include a support structure to support the tight fit of the waterproof member 270. In an embodiment, the electronic device 100, as a support structure, may include a magnet bracket 280 which includes a first magnet M1 disposed near a waterproof member 270 for the flexible printed circuit board 160 by means of an adhesive member T2 (e.g., double-sided tape), and a second magnet M2 protruding onto the flexible printed circuit board 160 through an opening 1136 formed from the first space 1101 to the through-hole 1135, and being responsive to a magnetic force (e.g., attraction) from the first magnet M1. The first magnet M1 and the second magnet M2 may be coplanar with each other and be magnetically attracted to each other along the y-axis direction.

In an embodiment, the opening 1136 may be formed using a sidewall 1131$c$ provided by structural modifications to the first support member 1131, and the magnetic bracket 280 may be fixed to the sidewall 1131$c$ so as to partially protrude into the through-hole 135 in a manner that seals the opening 1136 by means of the adhesive member T3 (e.g., double-sided tape). In an embodiment, at least a portion of the magnetic bracket 280 protruding into the through-hole 1135 may induce the flexible printed circuit board 160 to be continuously in contact, by means of the attraction of the first magnet M1 and the second magnet M2.

According to various embodiments, the magnet bracket 280 may include an insertion portion 281 that inserts or extends into the opening 1136 and includes a magnet receiving portion 2811 that receives the second magnet M2, and a flange 282 formed along a rim of the insertion portion 281 and fixed to the first support member 1131. In an embodiment, the second magnet M2 may be fixed to the magnet receiving portion 2811 by means of an adhesive member T4. Although not illustrated, the other end of the flexible printed circuit board may be fixed in substantially the same manner in the second space 1201 of the second housing 120, by means of the aforementioned waterproof member 270 and the support structure (e.g., the support structure of the flexible printed circuit board 160 by means of the magnetic force of the first and second magnets M1 and M2).

Figure 17A:
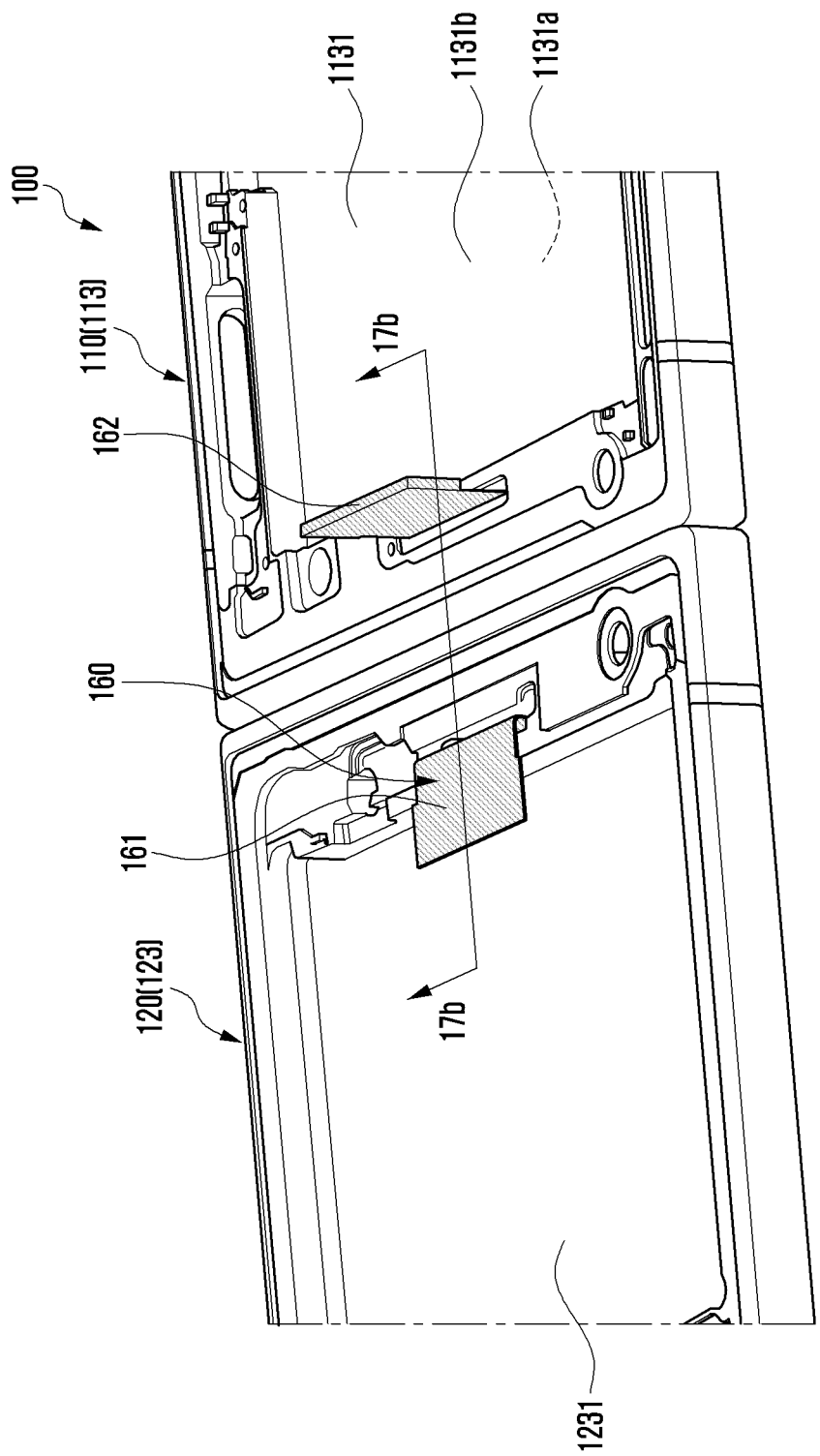
FIG. 17A is an enlarged partial perspective view of the electronic device illustrating a state in which the flexible printed circuit board, according to various embodiments of the present disclosure, penetrates a first housing and the second housing.
Figure 17B:
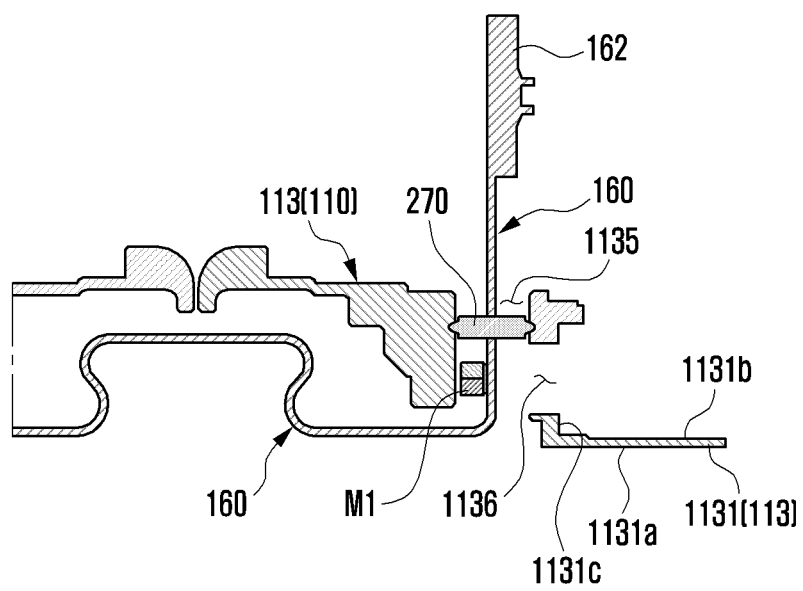
FIG. 17B and FIG. 17C are views illustrating an assembly process of the flexible printed circuit board according to various embodiments of the present disclosure.
Figure 17C:
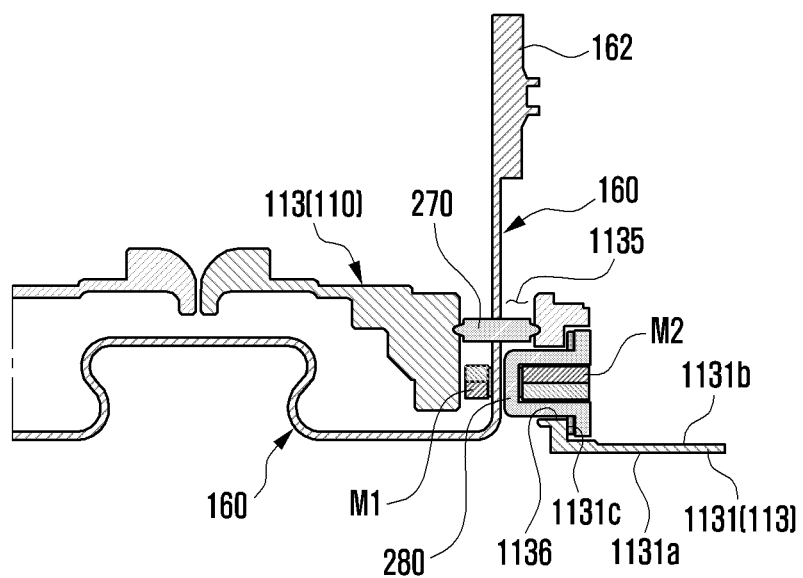
Figure 17D:
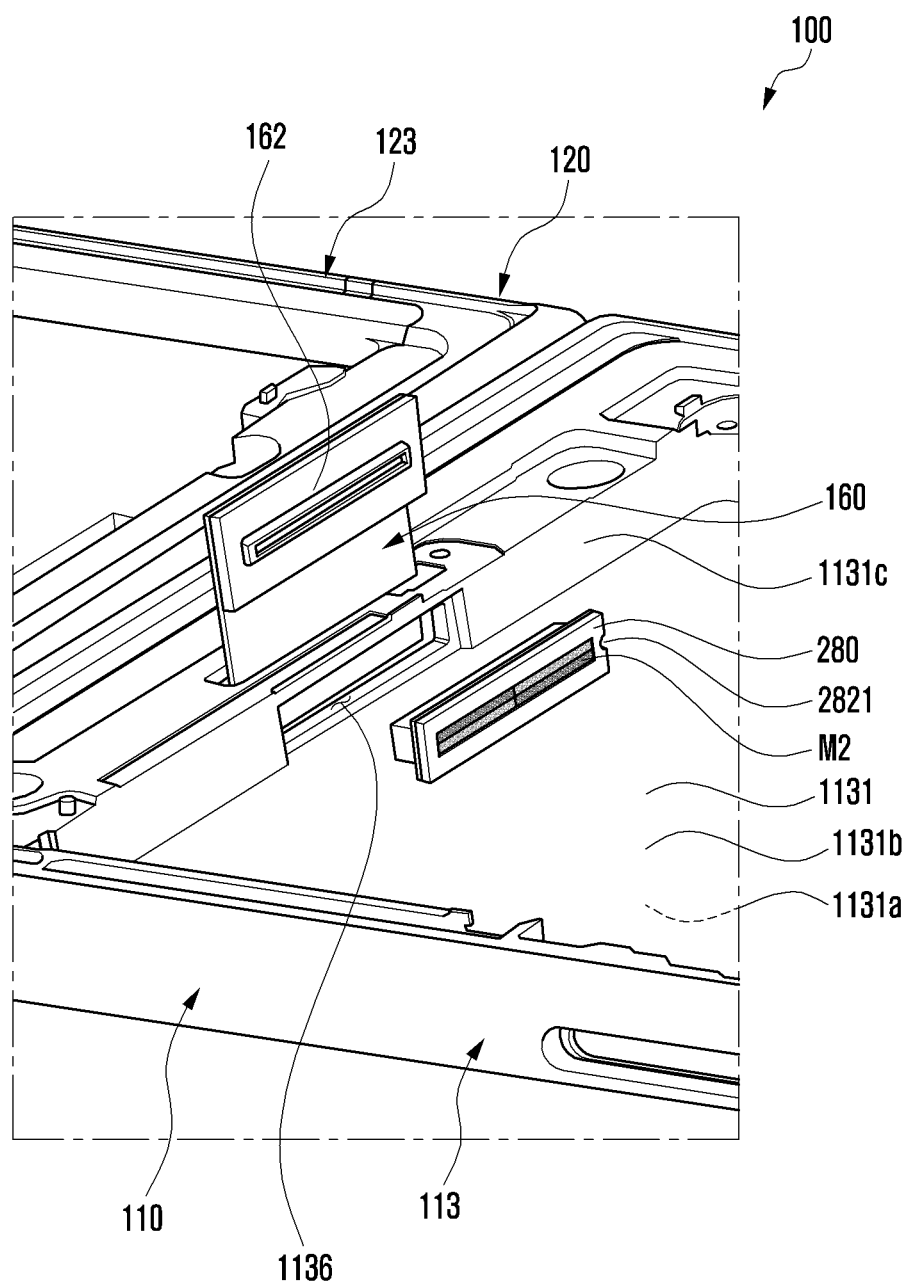
FIGS. 17D and 17E are enlarged views illustrating a state in which the magnetic bracket, according to various embodiments of the present disclosure, is assembled to the housing.
Figure 17E:
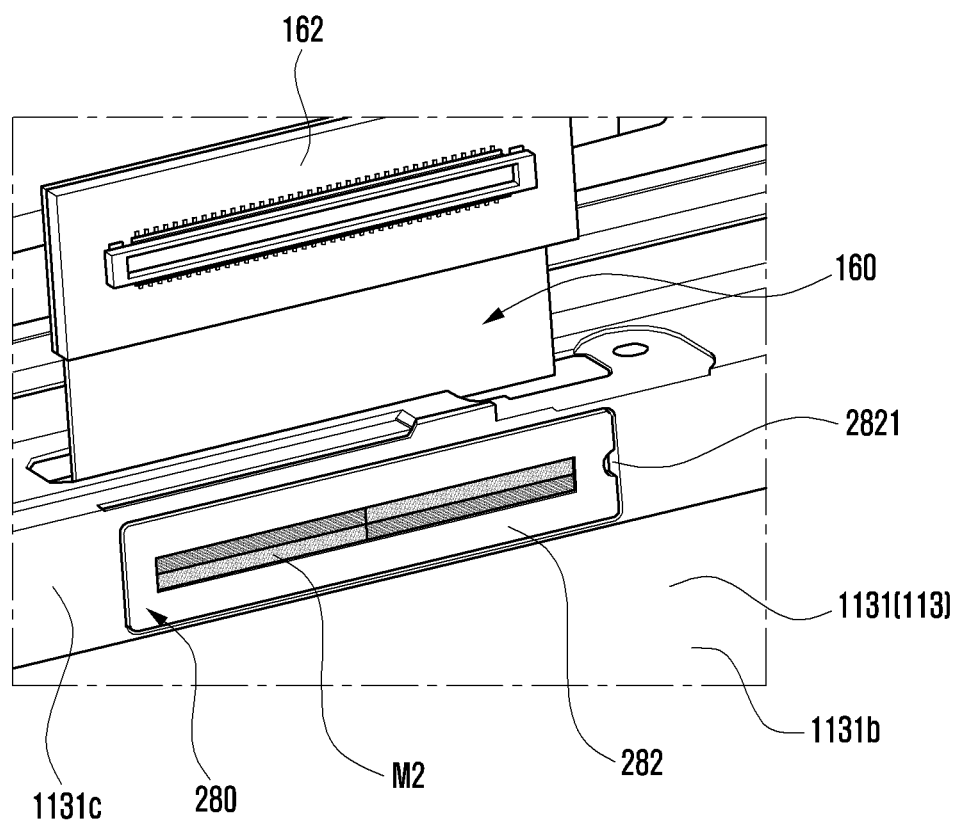

FIG. 17A is a partial perspective view of the electronic device illustrating a state in which the flexible printed circuit board, according to various embodiments of the present disclosure, penetrates the first housing and the second housing. FIGS. 17B and 17C are views illustrating an assembly process of the flexible printed circuit board according to various embodiments of the present disclosure. FIGS. 17D and 17E are views illustrating a state in which the magnetic bracket, according to various embodiments of the present disclosure, is assembled to the housing.

While these drawings illustrate and describe an arrangement of the terminal portion 162 of the flexible circuit board 160 accommodated in the first housing 110, an arrangement of the terminal portion 161 of the flexible circuit board 160 accommodated in the second housing 120 may have substantially the same constitution.

With reference to FIGS. 17A to 17E, the flexible printed circuit board 160 may be disposed in a manner that one end of the flexible printed circuit board 160 penetrates or extends through the through hole 1135 formed from a first surface 1131a to a second surface 1131b of the first support member 1131 (e.g., FIG. 17B). In this case, the waterproof member 270 disposed on the flexible printed circuit board 160 may seal the through-hole 1135 having the flexible printed circuit board 160 extended therethrough, and the first magnet M1 may be positioned near the waterproof member 270 on the flexible printed circuit board 160. Thereafter, the magnetic bracket 280 may be partially inserted into the opening 1136 formed in the sidewall 1131c of the first support member 1131, thereby sealing the opening 1136 (e.g., FIG. 17C). In this case, the first magnet M1 may respond to the magnetic force (e.g., attraction) of the second magnet M2 by the proximity of the magnet bracket 280, thereby maintaining the flexible printed circuit board 160 in contact with the magnet bracket 280. Therefore, even with frequent folding motion of the electronic device 100, a portion of the flexible printed circuit board 160 may remain in contact with the magnetic bracket by means of the magnetic forces of the first magnet M1 and the second magnet M2, and have a reduced movement along the through-hole 1135, which may help to reduce the phenomenon of poor waterproofing in which the peripherally disposed waterproofing member 270 is lifted or misaligned from the through-hole 1135.

According to various embodiments, at least a portion of the flange 282 may include at least one disassembly guiding groove 2821 formed to facilitate removal of the magnetic bracket 280 in case that the magnetic bracket 280 penetrates the opening 1136, is fixed to the first support member 1131, and needs to be removed for maintenance. In an embodiment, the disassembly guiding groove 2821 may be disposed in a manner that recesses inwardly from the flange 282.

According to various embodiments, electronic device 100 may include at least one of the slide structures 200, 200-1 including the slide bracket 210, the fixing structures C1, C1 including the fixing brackets 240, 250, 260 and the waterproof structure including the magnetic bracket 280.

According to various embodiments, an electronic device (e.g., the electronic device 100 in FIG. 4) may include: a first housing (e.g., the first housing 110 in FIG. 4) including a first printed circuit board (e.g., the first printed circuit board 151 in FIG. 4) disposed in a first space (e.g., the first space 1101 in FIG. 4); a second housing (e.g., the second housing 120 in FIG. 4) including a second printed circuit board (e.g., the second printed circuit board 152 in FIG. 4) rotatably connected with the first housing with respect to a folding axis (e.g., the folding axis F in FIG. 1B) by means of a hinge device (e.g., the hinge device 140 in FIG. 1B) and disposed in a second space (e.g., the second space 1201 in FIG. 4); a flexible display (e.g., the flexible display 130 in FIG. 3) disposed to be supported by the first housing and the second housing; a flexible printed circuit board (e.g., the flexible printed circuit board 160 in FIG. 4) electrically connected from the first printed circuit board to the second printed circuit board across the hinge device; and a slide structure (e.g., the slide structure 200 in FIG. 8A) configured to slidably connect one end and/or both ends of the flexible printed circuit board in the first space and/or in the second space in response to folding and unfolding motions of the electronic device.

According to various embodiments, the electronic device may further include a first battery B1 (e.g., the first battery B1 in FIG. 4) and a second battery B2 (e.g., the second battery B2 in FIG. 4) disposed side by side with the first printed circuit board in the first space, in which the first printed circuit board may extend to be near the hinge device between the first battery and the second battery.

According to various embodiments, the electronic device may include a third battery B3 (e.g., the third battery B3 in FIG. 4) and a fourth battery B4 (e.g., the fourth battery B4 in FIG. 4) disposed side by side with the second printed circuit board in the second space, in which the second printed circuit board may extend to be near the hinge device between the third battery and the fourth battery.

According to various embodiments, the first battery and the second battery may have different sizes, and the third battery and the fourth battery may have different sizes.

According to various embodiments, the electronic device may include at least one electronic component disposed side by side with the first printed circuit board near a battery having a relatively smaller size of the first battery and the second battery and disposed side by side with the second printed circuit board near a battery having a relatively smaller size of the third battery and the fourth battery.

According to various embodiments, the at least one electronic component includes at least one of a camera module, a speaker, a receiver, or a socket module.

According to various embodiments, the electric device may include a first battery B1 (e.g., the first battery B1 in FIG. 11A) disposed to be at least partially overlapped with the first printed circuit board in the first space, in which the first battery B1 includes: a first battery portion B11 (e.g., the first battery portion B11 in FIG. 11B) disposed on one side of the first printed circuit board; a second battery portion (e.g., the second battery portion B12 in FIG. 11B) disposed on the other side of the printed circuit board; and a third battery portion (e.g., the third battery portion B13 in FIG. 11B) overlapped with the first printed circuit board and configured to connect the first battery portion to the second battery portion when the flexible display is viewed from above, and in which a thickness including a thickness of the first printed circuit board and a thickness of the third battery portion is formed at least not to be thicker than the thickness of the first battery portion and/or the second battery portion.

According to various embodiments, the first battery portion and the second battery portion may be formed with different sizes.

According to various embodiments, the slide structure may include a slide bracket (e.g., the slide bracket 210 in FIG. 8A) slidably disposed in the first space in a direction perpendicular to the folding axis, in which a terminal portion (e.g., the terminal portion 161 in FIG. 8A) of the flexible printed circuit board is fixed to the slide bracket, and in which the terminal portion is disposed to move with the slide bracket while maintaining an electric connection with a connector of the first printed circuit board.

According to various embodiments, the electronic device may further include a spring (e.g., the spring 230 in FIG. 8A) disposed to apply pressure to the slide bracket in a first direction perpendicular to the folding axis.

According to various embodiments, the terminal portion of the flexible printed circuit board is disposed to move in a second direction opposite to the first direction when the electronic device is in a folded state, and to move in the first direction when the electronic device is in an unfolded state.

According to various embodiments, the slide bracket may include: a printed circuit board fixing portion (e.g., the printed circuit board fixing portion 211 in FIG. 8A) to which the terminal portion is fixed; and a pair of extending portions (e.g., the pair of extending portions 212 and 213 in FIG. 8A) extending from both ends of the printed circuit board fixing portion, and in which the slide bracket is disposed in a manner that the pair of extending portions are movably coupled to a pair of bosses (e.g., the pair of bosses 1232 in FIG. 8A) disposed to be spaced apart in the first space in a designated reciprocating distance.

According to various embodiments, the electronic device may include: a first housing (e.g., the first housing 110 in FIG. 12A) including a first printed circuit board (e.g., the first printed circuit board 151 in FIG. 12A) disposed in a first space (e.g., the first space 1101 in FIG. 12A); a second housing (e.g., the second housing 120 in FIG. 12A) including a second printed circuit board (e.g., the second printed circuit board 152 in FIG. 12A) rotatably connected with the first housing by means of a hinge device (e.g., the hinge device 140 in FIG. 1B) and disposed in a second space (e.g., the second space 1201 in FIG. 12A); a flexible display (e.g., the flexible display 130 in FIG. 12A) disposed to be supported by the first housing and the second housing; a flexible printed circuit board (e.g., the flexible printed circuit board 160 in FIG. 12A) electrically connected from the first printed circuit board to the second printed circuit board across the hinge device; and a fixing bracket (e.g., the fixing bracket 240 in FIG. 12B) disposed to maintain an electric connection of the first printed circuit board (e.g., the first printed circuit board 151 in FIG. 12B) with a terminal portion (e.g., the terminal portion 162 in FIG. 12B) of the flexible printed circuit board.

According to various embodiments, the fixing bracket may include a support portion (e.g., the support portion 241 in FIG. 12B) facing the terminal portion; and a pair of first extending portions (e.g., the pair of first extending portions 242 in FIG. 12B) bent in a direction toward the first printed circuit board from both ends of the support portion, and in which the fixing bracket is coupled to the first printed circuit board in a manner that catching grooves (e.g., the catching grooves 2421 in FIG. 12B) formed in the first extending portions catch catching protrusions (e.g., the catching protrusions 1511 in FIG. 12B) formed on both sides of the first printed circuit board.

According to various embodiments, the electronic device may further include a pair of second extending portions (e.g., the pair of second extending portions 253 in FIG. 13) extending in a direction opposite to the first extending portions from both ends of the support portion, in which the second extending portions are fastened to the first printed circuit board by means of a screw (e.g., the screw S in FIG. 12B).

According to various embodiments, the electronic device may include: a first housing (e.g., the first housing 110 in FIG. 4) including a first space (e.g., the first space 1101 in FIG. 4) formed by a first lateral member (e.g., the first lateral member 113 in FIG. 4) and a first support member (e.g., the first support member 1131 in FIG. 4) extending from the first lateral member, and a first printed circuit board (e.g., the first printed circuit board 151 in FIG. 4) disposed in the first space; a second housing (e.g., the second housing 120 in FIG. 4) including a second printed circuit board (e.g., the second printed circuit board 152 in FIG. 4) rotatably connected to the first housing by means of a hinge device (e.g., the hinge device 140 in FIG. 1B) and disposed in a second space (e.g., the second space 1201 in FIG. 4); a flexible display (e.g., the flexible display 130 in FIG. 3) disposed to be supported by the first housing and the second housing; and a flexible printed circuit board (e.g., the flexible printed circuit board 160 in FIG. 4) electrically connected from the first printed circuit board to the second printed circuit board across the hinge device, in which one end of the flexible printed circuit board is electrically connected to the first printed circuit board in a manner such that one end of the flexible printed circuit board penetrates a through-hole (e.g., the through-hole 1135 in FIG. 15) formed to connect the outside of the electronic device to the first space through the first support member.

According to various embodiments, the electronic device may further include a waterproof member (e.g., the waterproof member 270 in FIG. 15) disposed to surround the flexible printed circuit board, in which the waterproof member is disposed in a manner to seal the through hole.

According to various embodiments, the electronic device may include an opening (e.g., the opening 1136 in FIG. 15) formed through the first support member and configured to connect the first space and the through-hole, in which the electronic device further includes a magnetic bracket (e.g., the magnetic bracket 280 in FIG. 15) disposed to at least partially be exposed to the through-hole through the opening from the first space, and in which at least a portion of the flexible printed circuit board is disposed to maintain a first magnet (e.g., the first magnet M1 in FIG. 15) fixed to the flexible printed circuit board being in contact with a second magnet (e.g., the second magnet M2 in FIG. 15) disposed on the magnet bracket, in response to a magnetic force from the second magnet M2 disposed on the magnet bracket.

According to various embodiments, the first magnet may be disposed such that the flexible printed circuit board is positioned between the first magnet and the magnet bracket.

According to various embodiments, the magnet bracket may further include: an insertion portion (e.g., the insertion portion 281 in FIG. 16D) inserted into the opening and including a space in which the second magnet is accommodated; and a flange (e.g., the flange 282 in FIG. 16D) formed along a rim of the insertion portion and coupled to the first support member, and in which at least a portion of the flange further includes a disassembly guiding groove (e.g., the disassembly guiding groove 2821 in FIG. 17D) recessed inwardly.

The embodiments of the present disclosure disclosed in the present disclosure and illustrated in the drawings are provided as particular examples for more easily explaining the technical contents according to the present disclosure and helping understand the embodiments of the present disclosure, but not intended to limit the scope of the embodiments of the present disclosure. Accordingly, the scope of the various embodiments of the present disclosure should be interpreted to include, in addition to the embodiments disclosed herein, all alterations or modifications derived from the technical ideas of the various embodiments of the present disclosure.

What is claimed is:
1. An electronic device comprising:
a hinge;
a first housing and a second housing rotatably connected to each other by the hinge;
a flexible display disposed in the first housing and the second housing;
a first circuit board disposed in the first housing;
a flexible circuit board which is electrically connected to the first circuit board and extends from the first housing and across the hinge; and
a slide structure which is connected to the flexible circuit board and is slidably connected with the first housing, wherein the slide structure slides together with a portion of the flexible circuit board in the first housing while the electronic device is being folded or unfolded via the hinge.

2. The electronic device of claim 1, further comprising a first battery and a second battery in the first housing,
wherein the hinge is extended along a first direction, and
wherein the first battery, the first circuit board and the second battery are arranged in the first housing and in order along the first direction.

3. The electronic device of claim 2, further comprising:
a third battery, a second circuit board and a fourth battery in the second housing, and
the flexible circuit board further connected to the second circuit board and extending from the first housing, across the hinge, and into the second housing,
wherein the third battery, the second circuit board and the fourth battery are arranged in the second housing and in order along the first direction.

4. The electronic device of claim 2, wherein the first battery and the second battery have different sizes from each other.

5. The electronic device of claim 4, further comprising an electronic component in the first housing, wherein:
each of the first battery and the second battery has a size, one battery having a smaller size among the first battery and the second battery, and
along a direction orthogonal to the first direction and crossing the one battery having the smaller size, the electronic component is adjacent to the one battery having the smaller size.

6. The electronic device of claim 5, wherein the electronic component comprises at least one camera module.

7. The electric device of claim 1, further comprising a first battery in the first housing and overlapped with the first circuit board,
wherein:
each of the first circuit board and the first battery has a thickness,
the first battery comprises arranged along the hinge, a first battery portion, a second battery portion and a third battery portion which is overlapped with the first circuit board and connects the first battery portion to the second battery portion, and
a sum of the thickness of the first circuit board and the third battery portion is equal to or smaller than the thickness of the first battery portion or the thickness of the second battery portion.

8. The electronic device of claim 7, wherein the first battery portion and the second battery portion have different sizes from each other.

9. The electronic device of claim 1, wherein:
the first housing and the second housing are rotatable with respect to a folding axis,
the slide structure comprises a slide bracket slidably connected with the first housing, the slide bracket slidable along a direction crossing the folding axis,
the flexible circuit board comprises a terminal portion at which the flexible circuit board is both fixed to the slide bracket and electrically connected to a connector of the first circuit board, and
sliding of the slide bracket along the first housing slides the terminal portion of the flexible circuit board together with maintaining electric connection with the connector of the first circuit board.

10. The electronic device of claim 9, wherein the slide structure further comprises a spring which biases the slide bracket in a first direction along the direction crossing the folding axis, the first direction being toward the first circuit board.

11. The electronic device of claim 10, wherein:
the folding of the electronic device includes movement of the terminal portion of the flexible circuit board in a second direction opposite to the first direction, and
the unfolding of the electronic device includes movement of the terminal portion of the flexible circuit board in the first direction.

12. The electronic device of claim 9, wherein:
the first housing comprises a pair of bosses, and
the slide bracket comprises:
a circuit board fixing portion to which the terminal portion of the flexible circuit board is fixed; and
a pair of extending portions respectively extending from opposing ends of the circuit board fixing portion,
wherein the slide bracket is slidably connected to the bosses of the first housing, at the pair of extending portions.

13. An electronic device comprising:
a hinge;
a first housing and a second housing rotatably connected to each other by the hinge;
a flexible display corresponding to the first housing and the second housing;
a first circuit board which is in the first housing;
a flexible circuit board which is connected to the first circuit board and extends from the first housing and across the hinge, the flexible circuit board comprising a terminal portion at which the flexible circuit board is electrically connected to the first circuit board; and
a fixing bracket which fixes the flexible circuit board at the terminal portion, to the first circuit board, and maintains electric connection between the terminal portion and the first circuit board.

14. The electronic device of claim 13, wherein:
the first circuit board includes a pair of catching protrusions;
the fixing bracket comprises:
a support portion facing the terminal portion; and
a pair of first extending portions respectively bent from opposing ends of the support portion toward the first circuit board, and
each first extending portion among the pair of first extending portions defines a catching groove of the each first extending portion with which a respective catching protrusion engages to couple the first circuit board to the fixing bracket and maintain the electric connection between the terminal portion of the flexible circuit board and the first circuit board.

15. The electronic device of claim 14, the fixing bracket further comprises a pair of second extending portions respectively bent from the opposing ends of the support portion, at a side of the support portion different from the side at which the first extending portions are bent, and toward the first circuit board,
wherein the second extending portions of the fixing bracket are fastened to the first circuit board by fastening members respectively penetrating the second extending portions and engaging with the first circuit board.

16. An electronic device comprising:
a hinge;
a first housing and a second housing rotatably connected to each other by the hinge;

a housing among the first housing and the second housing which includes a support member and defines a through-hole of the housing which extends through the support member from a front side of the support member to a rear side of the support member;

a flexible display corresponding to the first housing and the second housing, the flexible display extended along the front side of the support member;

a first circuit board which extends along the rear side of the support member; and a flexible circuit board which is electrically connected to the first circuit board, at the rear side of the support member, and extends across the hinge.

17. The electronic device of claim 16, further comprising a waterproof member which surrounds the flexible circuit board at the through-hole and seals the through-hole.

18. The electronic device of claim 17, further comprising a magnetic fixing member which fixes the flexible circuit board at a position in the through-hole, wherein:
the housing further includes a sidewall which defines the through-hole, the sidewall defining an opening connecting the through-hole to the rear side of the support member, and the magnetic fixing member comprises:
a magnetic bracket which extends through the opening of the sidewall, from the rear side of the support member, and into the through-hole,
a first magnet in the through-hole, and
a second magnet which is in the magnetic bracket, faces the first magnet with the flexible circuit board therebetween, and fixes the position of the flexible circuit board in the through-hole by magnetic force between the first magnet and the second magnet.

19. The electronic device of claim 17, wherein the flexible circuit board is between the magnetic bracket and the first magnet.

20. The electronic device of claim 19, wherein the magnet bracket comprises:
an insertion portion which extends through the opening of the sidewall and defines a space in which the second magnet is accommodated;
a flange extending along a rim of the insertion portion and coupled to the sidewall of the housing, and
the flange further defining a disassembly guiding groove recessed inwardly.

* * * * *